(12) United States Patent
Satou et al.

(10) Patent No.: US 9,182,870 B2
(45) Date of Patent: Nov. 10, 2015

(54) TOUCH PANEL AND ELECTRONIC DEVICE

(71) Applicant: PANASONIC INTELLECTUAL PROPERTY CORPORATION OF AMERICA, Torrance, CA (US)

(72) Inventors: Mitsuru Satou, Kanagawa (JP); Yasuyuki Hirouchi, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 14/535,961

(22) Filed: Nov. 7, 2014

(65) Prior Publication Data
US 2015/0062084 A1 Mar. 5, 2015

Related U.S. Application Data

(63) Continuation of application No. 14/235,823, filed as application No. PCT/JP2012/007604 on Nov. 27, 2012.

(30) Foreign Application Priority Data

| Dec. 16, 2011 | (JP) | 2011-276175 |
| Mar. 28, 2012 | (JP) | 2012-074721 |
| Apr. 4, 2012 | (JP) | 2012-085750 |
| Apr. 19, 2012 | (JP) | 2012-095879 |
| Jun. 4, 2012 | (JP) | 2012-127290 |

(51) Int. Cl.
*G06F 3/041* (2006.01)
*G06F 3/045* (2006.01)
(Continued)

(52) U.S. Cl.
CPC ............ *G06F 3/045* (2013.01); *G02F 1/13338* (2013.01); *G02F 1/133308* (2013.01);
(Continued)

(58) Field of Classification Search
CPC ....... G06F 3/045; G06F 3/044; G06F 3/0416; G06F 3/0412; G06F 1/1643; G06F 3/03547; G06F 2203/04101; G02F 1/133308; G02F 1/13338
USPC .......................................................... 345/173
See application file for complete search history.

(56) References Cited

U.S. PATENT DOCUMENTS 5,717,610 A * 2/1998 Baba ............................ 702/150
2002/0149561 A1 10/2002 Fukumoto et al.
(Continued)

FOREIGN PATENT DOCUMENTS

JP 11-272789 10/1999
JP 2002-149312 5/2002
(Continued)

OTHER PUBLICATIONS

International Search report and Written Opinion (ISR/WO) for PCT/JP2012/007604, mail date is Apr. 2, 2013, together with English translation of ISR.

*Primary Examiner* — Jonathan Boyd
(74) *Attorney, Agent, or Firm* — Greenblum & Bernstein, P.L.C.

(57) ABSTRACT

An electronic device includes a display device; a touch panel overlaid on the display device and including at least a predetermined side; a conductive member provided along the predetermined side; and a variable resistor having one end which is electrically connected to the conductive member and another end which is electrically connected to a predetermined potential. A resistance of the variable resistor is switchable.

15 Claims, 44 Drawing Sheets

(51) Int. Cl.
*G06F 3/044* (2006.01)
*G06F 1/16* (2006.01)
*G06F 3/023* (2006.01)
*G06F 3/0488* (2013.01)
*G02F 1/1333* (2006.01)
*G06F 3/0354* (2013.01)

(52) U.S. Cl.
CPC .............. *G06F1/169* (2013.01); *G06F 1/1626* (2013.01); *G06F 1/1643* (2013.01); *G06F 1/1694* (2013.01); *G06F 3/0236* (2013.01); *G06F 3/03547* (2013.01); *G06F 3/044* (2013.01); *G06F 3/0412* (2013.01); *G06F 3/0416* (2013.01); *G06F 3/0418* (2013.01); *G06F 3/04886* (2013.01); *G02F 2001/133331* (2013.01); *G06F 2203/0339* (2013.01); *G06F 2203/04101* (2013.01)

(56) References Cited

U.S. PATENT DOCUMENTS

| | | |
|---|---|---|
| 2003/0223024 A1 | 12/2003 | Ogawa |
| 2006/0197750 A1 | 9/2006 | Kerr et al. |
| 2006/0197753 A1 | 9/2006 | Hotelling |
| 2006/0238517 A1 | 10/2006 | King et al. |
| 2007/0103454 A1 | 5/2007 | Elias |
| 2008/0088602 A1 | 4/2008 | Hotelling |
| 2009/0117944 A1 | 5/2009 | Lee et al. |
| 2009/0140996 A1* | 6/2009 | Takashima et al. ........... 345/173 |
| 2009/0295753 A1 | 12/2009 | King et al. |
| 2010/0033447 A1 | 2/2010 | Horie |
| 2010/0127970 A1 | 5/2010 | Oba et al. |
| 2010/0283752 A1 | 11/2010 | Maeda |
| 2011/0018560 A1 | 1/2011 | Kurashima |
| 2011/0069034 A1 | 3/2011 | Yokota et al. |
| 2011/0102341 A1 | 5/2011 | Imai et al. |
| 2011/0102342 A1 | 5/2011 | Iwawaki et al. |
| 2011/0102343 A1 | 5/2011 | Imai et al. |
| 2011/0141052 A1* | 6/2011 | Bernstein et al. ............. 345/174 |
| 2011/0227870 A1* | 9/2011 | Kim ............................... 345/174 |
| 2011/0291945 A1 | 12/2011 | Ewing, Jr. et al. |
| 2013/0063385 A1 | 3/2013 | Nishio |

FOREIGN PATENT DOCUMENTS

| | | |
|---|---|---|
| JP | 2003-344830 | 12/2003 |
| JP | 2004-280432 | 10/2004 |
| JP | 2004-284341 | 10/2004 |
| JP | 2004-355593 | 12/2004 |
| JP | 2005-209868 | 8/2005 |
| JP | 2005-222091 | 8/2005 |
| JP | 2005-332063 | 12/2005 |
| JP | 2008-532185 | 8/2008 |
| JP | 2008-210348 | 9/2008 |
| JP | 2009-116861 | 5/2009 |
| JP | 2009-199558 | 9/2009 |
| JP | 2010-128545 | 6/2010 |
| JP | 2010-154090 | 7/2010 |
| JP | 2010-244132 | 10/2010 |
| JP | 2010-262460 | 11/2010 |
| JP | 2011-28535 | 2/2011 |
| JP | 2011-34196 | 2/2011 |
| JP | 2011-65575 | 3/2011 |
| JP | 2011-090575 | 5/2011 |
| JP | 2011-113461 | 6/2011 |
| JP | 2011-170784 | 9/2011 |
| JP | 2011-215867 | 10/2011 |
| JP | 2011-249857 | 12/2011 |
| JP | 2011-253468 | 12/2011 |
| WO | 2011/008610 | 1/2011 |
| WO | 2011/142151 | 11/2011 |

* cited by examiner

FIG.30

| DETECTION METHOD | HOLDING-HAND STATE | | | |
|---|---|---|---|---|
| | TWO-HAND OPERATION | LEFT HAND OPERATION | RIGHT HAND OPERATION | PLACED |
| APPROACHING TOUCH PANEL/ CAPACITANCE CHANGE | WHEN CAPACITANCE CHANGE CAUSED BY CONTACT OF FINGER IS SYMMETRIC IN LEFT AND RIGHT, TWO-HAND OPERATION IS CONCLUDED | WHEN (LEFT CAPACITANCE) > (RIGHT CAPACITANCE), LEFT HAND OPERATION IS CONCLUDED | WHEN (RIGHT CAPACITANCE) > (LEFT CAPACITANCE), RIGHT HAND OPERATION IS CONCLUDED | WHEN CAPACITANCE CHANGE DOES NOT OCCUR IN LEFT AND RIGHT, PLACED STATE IS CONCLUDED |
| ACCELERATION SENSOR | SITUATION THAT LOWER PART OF HOUSING GOES DOWN IS DETECTED | SITUATION THAT HOUSING GOES DOWN RIGHTWARD IS DETECTED | SITUATION THAT HOUSING GOES DOWN LEFTWARD IS DETECTED | SITUATION HOUSING IS IN FLAT ORIENTATION IS DETECTED |

FIG.31

| STATE | TWO-HAND OPERATION | LEFT HAND OPERATION | RIGHT HAND OPERATION | PLACED |
|---|---|---|---|---|
| | | | | |
| RL | 1MΩ | 0Ω | 1MΩ | HIGH IMPEDANCE |
| RR | 1MΩ | 1MΩ | 0Ω | HIGH IMPEDANCE |
| | INFLUENCE BY SET GRASPING IS SUPPRESSED | AT THE TIME OF LEFT HAND OPERATION, LEFT THUMB AFFECTS APPROACHING TOUCH PANEL. THUS, HOVERING DISTANCE ON LEFT SIDE OF SET IS REDUCED | AT THE TIME OF RIGHT HAND OPERATION, RIGHT THUMB AFFECTS APPROACHING TOUCH PANEL. THUS, HOVERING DISTANCE ON RIGHT SIDE OF SET IS REDUCED | IN OPERATION IN PLACED STATE, NO INFLUENCE IS CAUSED BY GRASPING FINGERS. THUS, HOVERING DISTANCE IN PERIPHERY IS INCREASED |

TOUCH PANEL AND ELECTRONIC DEVICE

This application is a continuation of pending U.S. patent application Ser. No. 14/235,823, filed Jan. 29, 2014, which is the National Stage of International Application No. PCT/JP2012/007604, filed Nov. 27, 2012, which claims priority to Japanese Application Nos. 2011-276175, filed Dec. 16, 2011; 2012-074721, filed Mar. 28, 2012; 2012-085750, filed Apr. 4, 2012; 2012-095879; filed Apr. 19, 2012; 2012-127290, filed on Jun. 4, 2012. The entire disclosures of the above-identified applications, including the specifications, drawings and claims are incorporated herein by reference in their entirety.

TECHNICAL FIELD

The present invention relates to a touch panel and an electronic device employing this touch panel.

BACKGROUND ART

An example of an electronic device employing a touch panel is described in Patent Documents 1 and 2. As known widely, a touch panel is overlaid on a display device (e.g., a liquid crystal display) for displaying an image. Here, in the touch panel, an integrated construction consisting of a protection glass, a sensor (glass, film), and a touch panel controller is referred to as a touch panel module. Further, a construction consisting of a touch panel module and a display device is referred to as a touch panel unit.

In a portable phone described in Patent Document 1, in order that when a user grasps the device in whatever manner, key operation should be achieved easily, the part of the device grasped by the user is detected by a sensor and then the display region is shifted depending on the situation. On the other hand, in a display apparatus with touch panel described in Patent Document 2, in order that erroneous detection in the touch panel caused by driving of the display apparatus should be avoided, each sensor electrode of the touch panel is selected one by one and then contact of a conductor (a finger) at the position corresponding to the selected sensor electrode is judged.

PRIOR ART REFERENCES

Patent Documents

Patent Document 1: JP-A-2010-154090
Patent Document 2: JP-A-2011-170784

DISCLOSURE OF THE INVENTION

Problems to be Solved by the Invention

Meanwhile, touch panels have a problem that when a person's finger goes into contact, dirt such as a fingerprint adheres. In this case, when wearing a glove avoids adhesion of a fingerprint. Nevertheless, the wearing of a glove degrades the operability. These problems can be resolved by employing a touch panel of capacitive sensing type in which operation is achieved in a state that a finger is maintained at a height within a predetermined range without the necessity of contact to the touch panel (this approaching operation is referred to as "hovering operation", hereinafter). Nevertheless, when hovering operation is performed in a state that the device is held by the hand, the touch panel respond to approaching of the holding hand to the touch panel.

Here, the touch panel of capacitive sensing type is described below. FIG. 42 is a diagram showing an outline configuration of a touch panel of capacitive sensing type. In this figure, a transmission electrode 101 and a receiving electrode 102 are arranged apart from each other on the lower surface of a plate-shaped dielectric material 100. Then, a driving pulse is applied on the transmission electrode 101 from a driving buffer 103. When the driving pulse is applied, an electric field is generated. When a hand enters this electric field, the number of lines of electric force between the transmission electrode 101 and the receiving electrode 102 decreases. The change in the number of lines of electric force appears as a change in the electric charge on the receiving electrode 102. The change in the electric charge on the receiving electrode 102 permits detection of approaching of the hand to the touch panel.

FIG. 43 is a diagram showing a situation of detecting a finger when a hand gradually approaches the touch panel. In this figure, FIG. 43(*a*) shows a state that the hand is apart from the electric field. FIG. 43(*b*) shows a finger-hovering detection state at the time that a finger enters the electric field. FIG. 43(*c*) shows a finger touching detection state that the finger has completely entered the electric field and then touches the touch panel. When the finger touches the touch panel with an intention of operation, this is not erroneous operation. Nevertheless, when the finger touches the touch panel at the time that the device body is simply held by the hand, this becomes erroneous operation.

The present invention has been devised in view of such situations. An object thereof is to provide: a touch panel of capacitive sensing type in which the influence of a hand to a hand-held part at the time that the device body is held; and an electronic device employing this touch panel.

Means for Solving the Problem

The touch panel of the present invention is a touch panel comprising: a first sensor panel including at least one receiving electrode; a second sensor panel including at least one transmission electrode and overlaid on the first sensor panel; and a third sensor panel including a predetermined electrode at least a part of which overlaps with the one transmission electrode and overlaid on the second sensor panel, wherein a transmission signal identical to that for the one transmission electrode can be applied on the predetermined electrode. Here, at least one transmission electrode may be provided on the surface of the first sensor panel. Here, a receiving electrode may be provided on the rear face and a transmission electrode may be provided on the rear face of the second sensor panel.

According to the above-mentioned configuration, when the present touch panel is employed in an electronic device, a situation that the electronic device is grasped by a person can be detected.

In the above-mentioned configuration, the first sensor panel serves also as the third sensor panel.

According to the above-mentioned configuration, since the first sensor panel serves also as the third sensor panel, cost reduction is achieved in the present touch panel.

In the above-mentioned configuration, the predetermined electrode can be set at a predetermined constant potential.

According to the above-mentioned configuration, the predetermined electrode can be set at a ground potential or a potential of Low level.

In the above-mentioned configuration, 90% or more of the area of the first sensor panel overlaps with the second sensor panel.

In the above-mentioned configuration, 90% or more of the area of the third sensor panel overlaps with the second sensor panel.

In the above-mentioned configuration, the predetermined electrode is arranged in a periphery of the touch panel.

According to the above-mentioned configuration, when the present touch panel is employed in an electronic device, a situation that the electronic device is grasped by a person can be detected.

In the above-mentioned configuration, a part of the predetermined electrode is arranged between an edge of the touch panel and a point that internally divides the edge of the touch panel and the center into a ratio of 1 to 4 along a line passing through the center of the touch panel.

According to the above-mentioned configuration, when the present touch panel is employed in an electronic device, a situation that the electronic device is grasped by a person can be detected.

In the above-mentioned configuration, the center is the center of gravity of the touch panel.

In the above-mentioned configuration, the predetermined electrode is arranged in an outermost periphery of a response region in the third sensor panel.

According to the above-mentioned configuration, when the present touch panel is employed in an electronic device, a situation that the electronic device is grasped by a person can be detected.

In the above-mentioned configuration, the third sensor panel is quadrangular and the predetermined electrode is arranged along at least one side of the quadrangle.

According to the above-mentioned configuration, when the present touch panel is employed in an electronic device, a situation that the electronic device is grasped by a person can be detected.

In the above-mentioned configuration, the quadrangle is a rectangle and the predetermined electrode is arranged along each of two opposite sides of the rectangle.

According to the above-mentioned configuration, when the present touch panel is employed in an electronic device, a situation that the electronic device is grasped by a person can be detected.

In the above-mentioned configuration, the two opposite sides are the longer sides.

The touch panel unit of the present invention is a touch panel unit comprising: a touch panel module including a protection glass, a touch panel described above, and a board on which a touch panel controller is mounted; and a display device overlaid on the touch panel module.

According to the above-mentioned configuration, when the present touch panel unit is employed in an electronic device, a situation that the electronic device is grasped by a person can be detected.

The electronic device of the present invention is an electronic device including a touch panel unit described above, wherein when in a state that a transmission signal identical to that for the one transmission electrode is applied on the predetermined electrode, a predetermined condition is detected, application of the transmission signal identical to that for the one transmission electrode onto the predetermined electrode is stopped.

According to the above-mentioned configuration, a situation that the present electronic device is grasped by a person can be detected.

In the above-mentioned configuration, when in a state that a transmission signal identical to that for the one transmission electrode is applied on the predetermined electrode, a predetermined condition is detected, the predetermined electrode is set at a predetermined constant potential.

In the above-mentioned configuration, the predetermined condition is to detect grasping by a person.

In the above-mentioned configuration, in a state that a transmission signal identical to that for the one transmission electrode is applied on the predetermined electrode, the display device performs predetermined display. Further, in a state that a transmission signal identical to that for the one transmission electrode is not applied on the predetermined electrode, the display device does not perform the predetermined display.

The above-mentioned configuration permits visual recognition of a state that a situation that the present electronic device is grasped by a person is detectable.

The transmission signal application method of the present invention is a transmission signal application method employable in a touch panel including: a first sensor panel including at least one receiving electrode; a second sensor panel including at least one transmission electrode and overlaid on the first sensor panel; and a third sensor panel including a predetermined electrode at least a part of which overlaps with the one transmission electrode and overlaid on the second sensor panel, wherein a transmission signal identical to that for the one transmission electrode can be applied on the predetermined electrode.

According to the above-mentioned method, when the present touch panel is employed in an electronic device, a situation that the electronic device is grasped by a person can be detected.

The touch panel of the present invention is a touch panel comprising at least one sensor panel including: a first surface including at least one receiving electrode; a second surface including at least one transmission electrode and overlaid on the first surface; and a third surface including a predetermined electrode at least a part of which overlaps with the one transmission electrode and overlaid on the second surface, wherein a transmission signal identical to that for the one transmission electrode can be applied on the predetermined electrode.

According to the above-mentioned configuration, when the present touch panel is employed in an electronic device, a situation that the electronic device is grasped by a person can be detected.

In the above-mentioned configuration, the first surface and the third surface are an identical surface.

According to the above-mentioned configuration, the sensor panel for the first surface and the sensor panel for the third surface need not be provided independently. This permits cost reduction of the present touch panel.

The transmission signal application method of the present invention is a transmission signal application method employable in a touch panel provided with at least one sensor panel including: a first surface including at least one receiving electrode; a second surface including at least one transmission electrode and overlaid on the first surface; and a third surface including a predetermined electrode at least a part of which overlaps with the one transmission electrode and overlaid on the second surface, wherein a transmission signal identical to that for the one transmission electrode can be applied on the predetermined electrode.

According to the above-mentioned method, when the present touch panel is employed in an electronic device, a situation that the electronic device is grasped by a person can be detected.

The electronic device of the present invention is an electronic device comprising: a display device; and a touch panel overlaid on the display device, wherein when an instructing body is not in contact with the touch panel, the touch panel can detect at least a distance between the instructing body and the touch panel, and wherein the display device performs display in a manner of switching at least three kinds of characters in predetermined order in response to an increase in the distance.

According to the above-mentioned configuration, in response to an increase in the distance between the instructing body (e.g., a finger and a pen tip) and the touch panel, display is performed in a manner of switching at least three kinds of characters in predetermined order. Thus, a desired character can be selected by easy operation and hence operability improvement in character selection is achieved.

In the above-mentioned configuration, the display device performs display in a manner of switching the three kinds of characters in order reverse to the predetermined order in response to a decrease in the distance.

According to the above-mentioned configuration, a desired character can be selected by bringing the instructing body close to or apart from the touch panel. This improves operability in character selection.

In the above-mentioned configuration, the display device includes a predetermined display region. Then, when the instructing body is not in contact with the touch panel, the touch panel can detect at least a distance between the instructing body and the touch panel and coordinates of the instructing body on the touch panel surface. Further, when the instructing body is not in contact with the touch panel and the coordinates correspond to an inside of the predetermined display region, in response to an increase in the distance, the display device performs display in a manner of switching at least three kinds of characters in predetermined order.

According to the above-mentioned configuration, when the instructing body is not in contact with the touch panel and the coordinates of the instructing body on the touch panel surface correspond to the inside of the predetermined display region, in response to an increase in the distance between the instructing body and the touch panel, display is performed in a manner of switching at least three kinds of characters in predetermined order. Thus, a desired character can be selected by easy operation and hence operability improvement in character selection is achieved.

In the above-mentioned configuration, after display is performed in a manner of switching the character, when the coordinates exit the predetermined display region, predetermined operation is performed.

According to the above-mentioned configuration, operation relevant to switching of the character is allowed.

In the above-mentioned configuration, the predetermined operation is operation of selecting a character displayed in a manner of being switched.

According to the above-mentioned configuration, as operation relevant to switching of the character, selection of a character is allowed.

In the above-mentioned configuration, the predetermined display region is adopted as a first display region, the display device includes a second display region, the first display region is provided in a number of at least one, the second display region is provided in a number of at least two, and the two second display regions respectively perform display in a manner of switching the at least three kinds of characters in predetermined order.

According to the above-mentioned configuration, in each of at least two display regions, display is performed in a manner of switching at least three kinds of characters in predetermined order. Thus, a desired character can be selected by easy operation and hence operability improvement in character selection is achieved.

In the above-mentioned configuration, when the coordinates fall at least within the first display region, in response to an increase in the distance, the display device performs display in a manner of switching at least three kinds of characters in predetermined order. Further, when the coordinates exit the first display region and/or fall within the second display region, even when the distance varies, the display device does not perform display in a manner of switching the character.

According to the above-mentioned configuration, when the coordinates of the instructing body on the touch panel surface exit the first display region or alternatively enter the second display region, even in a case that a change occurs in the distance with the instructing body, display with changing the character is not performed. This reduces erroneous operation and improves operability in character selection.

In the above-mentioned configuration, when the coordinates fall at least within the first display region, in response to an increase in the distance, the display device performs display in a manner of switching at least three kinds of characters in predetermined order. Further, when the coordinates fall outside the first display region and/or fall within the second display region, the second display region continues displaying the displayed character and does not switch the character even when the distance varies.

According to the above-mentioned configuration, when the coordinates of the instructing body on the touch panel surface exit the first display region or alternatively enter the second display region, the character displayed in the second display region is displayed continuously. That is, even in a case that a change occurs in the distance with the instructing body, the character is not switched. This reduces erroneous operation and improves operability in character selection.

In the above-mentioned configuration, the touch panel can detect contact of the instructing body and, in a case that the instructing body goes into contact with the touch panel, coordinates of the instructing body on the touch panel surface. Further, when the character is displayed continuously and the touch panel detects at least contact, the character displayed continuously in the second display region corresponding to the coordinates of the contact is regarded as being confirmed.

According to the above-mentioned configuration, in a case that the character is displayed continuously in the second display region, when contact to the touch panel by the instructing body is detected, the character displayed continuously in the second display region is confirmed. Thus, the selected character can be confirmed easily and hence operability improvement in character selection is achieved.

In the above-mentioned configuration, the second display region corresponding to the coordinates of the contact indicates the second display region closer to the coordinates of the contact.

In the above-mentioned configuration, the second display region corresponding to the coordinates of the contact indicates is the second display region that encompasses the coordinates of the contact.

In the above-mentioned configuration, the display device includes an input region. Then, in the input region, the selected character is inputted.

In the above-mentioned configuration, the three kinds of characters and the predetermined order are successive three kinds and their order selected from at least alphabets consisting of "A", "B", "C", "D", "E", "F", "G", "H", "I", "J", "K", "L", "M", "N", "O", "P", "Q", "R", "S", "T", "U", "V", "W", "X", "Y", "Z", "A", "B".

In the above-mentioned configuration, the three kinds of characters and the predetermined order are successive three kinds and their order selected from at least numeric characters consisting of "1", "2", "3", "4", "5", "6", "7", "8", "9", "0", "1", "2" or alternatively "0", "1", "2", "3", "4", "5", "6", "7", "8", "9", "10", "11".

In the above-mentioned configuration, the three kinds of characters and the predetermined order are successive three kinds and their order selected from at least Japanese characters consisting of "a", "ka", "sa", "ta", "na", "ha", "ma", "ya", "ra", "wa", "n", "a", "ka" or alternatively "i", "ki", "shi", "chi", "ni", "hi", "mi", "i", "ri", "wi", "i", "ki".

In the above-mentioned configuration, the second display regions are provided in a number of at least five.

In the above-mentioned configuration, a housing is provided and the display device is arranged in the housing.

In the above-mentioned configuration, the touch panel is arranged on the outer side of the housing relative to the display device.

The character display method of the present invention is a character display method employable in an electronic device including a display device and a touch panel overlaid on the display device, wherein in response to an increase in a distance between the instructing body and the touch panel, display is performed in a manner of switching at least three kinds of characters in predetermined order.

According to the above-mentioned method, in response to an increase in the distance between the instructing body (e.g., a finger and a pen tip) and the touch panel, display is performed in a manner of switching at least three kinds of characters in predetermined order. Thus, a desired character can be selected by easy operation and hence operability improvement in character selection is achieved.

The electronic device of the present invention is an electronic device comprising: a sensor capable of detecting grasping by a person; and a vibration unit, wherein when the sensor detects grasping, the vibration unit is allowed to vibrate, and wherein when the sensor does not detect grasping, the vibration unit does not vibrate.

According to the above-mentioned configuration, when a situation that the user grasps the electronic device is detected, the vibration unit is brought into a state that vibration is allowed. When a situation that the user grasps the electronic device is not detected, the vibration unit is prevented from vibrating. Thus, in a case that the user grasps and operates the electronic device, when operation is performed, vibration is generated so as to cause the user to recognize the operation. Further, when the electronic device is operated in a state of being placed on a desk or the like, vibration is not generated even when operation is performed. This avoids a situation that recognition at the time of operation becomes difficult. That is, when the electronic device is operated in a state of being placed on a desk or the like, vibration could be generated on the desk or the like and hence recognition at the time of operation could become difficult. Thus, in such a case, in a case that vibration is prevented even when operation is performed, the situation that recognition at the time of operation becomes difficult is avoided.

In the above-mentioned configuration, a touch panel is provided. Then, when contact is detected in the touch panel, the vibration unit vibrates for a predetermined time.

According to the above-mentioned configuration, when contact to the touch panel is detected, the vibration unit is caused to vibrate for a predetermined time. This allows the user to reliably recognize that operation to the touch panel has been performed.

In the above-mentioned configuration, the sensor is the touch panel.

In the above-mentioned configuration, the vibration unit is at least one of a vibrator, a piezo actuator, and a vibration actuator.

In the above-mentioned configuration, a display device is provided. Then, when the sensor detects grasping and contact is detected in the touch panel, the vibration unit vibrates for a predetermined time. Further, when the sensor does not detect grasping and contact is detected in the touch panel, the vibration unit does not vibrate and the display device performs predetermined display.

According to the above-mentioned configuration, when a situation that the user grasps the electronic device is detected and contact to the touch panel is detected, the vibration unit is caused to vibrate for a predetermined time. Further, when a situation that the user grasps the electronic device is not detected and contact to the touch panel is detected, the vibration unit is not caused to vibrate and the display device is caused to perform predetermined display. Thus, when the user grasps the electronic device and performs operation to the touch panel, vibration is generated so as to cause the user to recognize the operation. Further, when the electronic device is placed and operated on a desk or the like, the display device performs predetermined display so as to cause the user to recognize the operation.

In the above-mentioned configuration, a display device is provided. Then, when the sensor detects grasping and contact is detected in the touch panel, the vibration unit vibrates for a predetermined time. Further, when the sensor does not detect grasping and contact is detected in the touch panel, the vibration unit does not vibrate and the display device performs predetermined display for a predetermined time.

According to the above-mentioned configuration, in a case that the electronic device is placed and operated on a desk or the like, when contact to the touch panel is detected, predetermined display in the display device is performed for a predetermined time. Thus, even in a case that the electronic device is placed and operated on a desk or the like, the user is caused to reliably recognize the operation to the touch panel.

In the above-mentioned configuration, a sound emission unit is provided. Then, when the sensor detects grasping and contact is detected in the touch panel, the vibration unit vibrates for a predetermined time. Further, when the sensor does not detect grasping and contact is detected in the touch panel, the vibration unit does not vibrate and the sound emission unit emits predetermined sound.

According to the above-mentioned configuration, in a case that the electronic device is placed and operated on a desk or the like, when contact to the touch panel is detected, the sound emission unit emits predetermined sound. Thus, even in a case that the electronic device is placed and operated on a desk or the like, the user is caused to reliably recognize the operation to the touch panel.

In the above-mentioned configuration, a sound emission unit is provided. Then, when the sensor detects grasping and contact is detected in the touch panel, the vibration unit vibrates for a predetermined time. Further, when the sensor does not detect grasping and contact is detected in the touch panel, the vibration unit does not vibrate and the sound emission unit emits predetermined sound for a predetermined time.

According to the above-mentioned configuration, in a case that the electronic device is placed and operated on a desk or the like, when contact to the touch panel is detected, the sound emission unit emits predetermined sound for a predetermined time. Thus, even in a case that the electronic device is placed and operated on a desk or the like, the user is caused to reliably recognize the operation to the touch panel.

The vibration control method of the present invention is a vibration control method employable in an electronic device including: a sensor capable of detecting grasping by a person; and a vibration unit, wherein when the sensor detects grasping, the vibration unit is allowed to vibrate, and wherein when the sensor does not detect grasping, the vibration unit does not vibrate.

According to the above-mentioned method, when a situation that the user grasps the electronic device is detected, the vibration unit is brought into a state that vibration is allowed. When a situation that the user grasps the electronic device is not detected, the vibration unit is prevented from vibrating. Thus, in a case that the user grasps and operates the electronic device, when operation is performed, vibration is generated so as to cause the user to recognize the operation. Further, when the electronic device is operated in a state of being placed on a desk or the like, vibration is not generated even when operation is performed. This avoids a situation that recognition at the time of operation becomes difficult. That is, when the electronic device is operated in a state of being placed on a desk or the like, vibration could be generated on the desk or the like and hence recognition at the time of operation could become difficult. Thus, in such a case, in a case that vibration is prevented even when operation is performed, the situation that recognition at the time of operation becomes difficult is avoided.

The electronic device of the present invention is an electronic device comprising: a display device; a touch panel overlaid on the display device and including at least a predetermined side; a conductive member provided along the predetermined side; and a variable resistor whose one end is electrically connected to the conductive member and whose the other end is electrically connected to a predetermined potential, wherein a resistance of the variable resistor is switchable.

According to the above-mentioned configuration, the part of the touch panel where the conductive member is provided and its surroundings are shielded. Then, the degree of this shielding varies depending on the resistance of the variable resistor, and increases with decreasing resistance so that the sensitivity in the conductive member periphery decreases in the touch panel. Thus, when the part of the touch panel where the conductive member is provided is grasped with the hand, the resistance of the variable resistor is reduced so that the influence from the hand (i.e., malfunction caused by a response of the touch panel) can be suppressed.

In the above-mentioned configuration, the predetermined side is adopted as a first side, the conductive member is adopted as a first conductive member, the touch panel includes a second side, and the variable resistor is adopted as a first variable resistor. Further, the electronic device is provided with a second conductive member provided along the second side and with a second variable resistor whose one end is electrically connected to the second conductive member and whose the other end is electrically connected to the predetermined potential. Furthermore, a resistance of the first variable resistor and a resistance of the second variable resistor are switchable.

According to the above-mentioned configuration, the part of the touch panel where the first conductive member is provided and its surroundings and the part where the second conductive member is provided and its surroundings can be shielded respectively. Then, the degree of shielding in the part where the first conductive member is provided and its surroundings varies depending on the resistance of the first variable resistor and the degree of shielding in the part where the second conductive member is provided and its surroundings varies depending on the resistance of the second variable resistor. Then, the degree of the shielding increases with decreasing resistance of each of the first and the second variable resistors so that the sensitivity decreases in each part of the touch panel where the first or the second conductive member is provided and the surroundings of each part. Thus, when the part of the touch panel where the first or the second conductive member is provided is grasped with the hand, the resistance of each of the first and the second variable resistors is reduced so that the influence from the hand can be suppressed.

In the above-mentioned configuration, the first side and the second side are opposite to each other.

In the above-mentioned configuration, the touch panel is quadrangular and the first side and the second side are sides opposite to each other in the quadrangle.

In the above-mentioned configuration, the touch panel is rectangular and the first side and the second side are the longer sides opposite to each other in the rectangle.

In the above-mentioned configuration, the resistance of the first variable resistor and/or the resistance of the second variable resistor are switched depending on an operation state.

According to the above-mentioned configuration, for example, in a case that the electronic device is grasped with the left hand and operated with the right hand, when the resistance of each of the first and the second variable resistors is switched to a value of middle magnitude, the influence to the touch panel caused by grasping the device body with a single hand can be suppressed. Further, in a case that the electronic device is grasped with the left hand and the touch panel is operated with the left thumb or the like, when the resistance of the variable resistor connected to the conductive member on the left hand side is switched to a small value, the influence to the touch panel caused by the left thumb can be suppressed. Further, in a case that the electronic device is grasped with the right hand and the touch panel is operated with the right thumb or the like, when the resistance of the variable resistor connected to the conductive member on the right hand side is switched to a small value, the influence to the touch panel caused by the right thumb can be suppressed.

In the above-mentioned configuration, in a predetermined operation state, the resistance of the first variable resistor is set to be a first resistance and the resistance of the second variable resistor is set to be a second resistance greater than the first resistance.

According to the above-mentioned configuration, when the electronic device is grasped with a single hand (the left hand or the right hand) and the touch panel is operated with the thumb or the like of the grasping hand, the influence to the touch panel caused by the thumb or the like can be suppressed.

In the above-mentioned configuration, the predetermined operation state is adopted as a first operation state. Then, in a second operation state, the resistance of the first variable resistor is set to be the second resistance and the resistance of the second variable resistor is set to be the first resistance.

According to the above-mentioned configuration, in response to the switching of the operation state between the first operation state and the second operation state, the resistances of the first variable resistor and the second variable resistor are changed and hence the influence to the touch panel can be suppressed in whichever of the first and the second operation states.

In the above-mentioned configuration, the predetermined operation state is adopted as a first operation state. Then, in a second operation state, the resistance of the first variable resistor is set to be a third resistance and the resistance of the second variable resistor is set to be a fourth resistance smaller than the third resistance.

According to the above-mentioned configuration, when the electronic device is grasped with a single hand (the left hand or the right hand) and the touch panel is operated with the thumb or the like of the grasping hand, the influence to the touch panel caused by the thumb or the like can be suppressed.

In the above-mentioned configuration, the predetermined operation state is adopted as a first operation state. Then, in a third operation state, the resistance of the first variable resistor and the resistance of the second variable resistor are set to be the second resistance.

According to the above-mentioned configuration, when the electronic device is grasped with a single hand (the left hand or the right hand) and the touch panel is operated with the thumb or the like of the other hand of the grasping hand, the influence to the touch panel can be suppressed.

In the above-mentioned configuration, the predetermined operation state is adopted as a first operation state. Then, in a third operation state, the resistance of the first variable resistor is set to be a fifth resistance and the resistance of the second variable resistor is set to be a sixth resistance that is a predetermined magnification of the fifth resistance.

According to the above-mentioned configuration, when the electronic device is grasped with a single hand (the left hand or the right hand) and the touch panel is operated with the thumb or the like of the other hand of the grasping hand, the influence to the touch panel can be suppressed.

In the above-mentioned configuration, in a fourth operation state, the resistance of the first variable resistor is set to be a seventh resistance greater than at least the second resistance and the resistance of the second variable resistor is set to be the seventh resistance.

According to the above-mentioned configuration, the degree of the shielding by the first and the second conductive members is reduced and hence the sensitivity increases in the part where the first and the second conductive members of the touch panel are provided and its periphery. This realizes operability improvement in a placed state of the electronic device.

In the above-mentioned configuration, in a fourth operation state, the resistance of the first variable resistor is set to be a seventh resistance greater than at least the second resistance and the resistance of the second variable resistor is set to be an eighth resistance greater than at least the second resistance.

According to the above-mentioned configuration, the degree of the shielding by the first and the second conductive members is reduced and hence the sensitivity increases in the part where the first and the second conductive members of the touch panel are provided and its periphery. This realizes operability improvement in a placed state of the electronic device.

In the above-mentioned configuration, the operation state is detected on the basis of output from the touch panel.

According to the above-mentioned configuration, the operation state can be detected on the basis of the output from the touch panel.

In the above-mentioned configuration, an acceleration sensor for detecting an attitude of the electronic device body is further provided and the operation state is detected on the basis of output from the acceleration sensor.

According to the above-mentioned configuration, the operation state can be detected on the basis of the output from the acceleration sensor.

In the above-mentioned configuration, the predetermined potential is a ground potential.

The resistance switching method of the present invention is a resistance switching method employable in an electronic device including: a display device; a touch panel overlaid on the display device and including at least a predetermined side; a conductive member provided along the predetermined side; and a variable resistor whose one end is electrically connected to the conductive member and whose the other end is electrically connected to a predetermined potential, wherein a resistance of the variable resistor is switchable.

According to the above-mentioned method, the part of the touch panel where the conductive member is provided and its surroundings are shielded. Then, the degree of this shielding varies depending on the resistance of the variable resistor, and increases with decreasing resistance so that the sensitivity in the conductive member periphery decreases in the touch panel. Thus, when the part of the touch panel where the conductive member is provided is grasped with the hand, the resistance of the variable resistor is reduced so that the influence from the hand (i.e., malfunction caused by a response of the touch panel) can be suppressed.

The electronic device of the present invention is an electronic device comprising: a display device; and a touch panel overlaid on the display device and capable of detecting a distance with an instructing body, wherein when in a predetermined region of the display device, the distance becomes greater than or equal to 0 and smaller than or equal to a predetermined value and, after that, the distance between the touch panel and the instructing body becomes greater than the predetermined value, in response to a change in the distance between the touch panel and the instructing body, the display device changes and displays information relevant to the predetermined region.

According to the above-mentioned configuration, in response to a change in the distance between the touch panel and the instructing body, the information relevant to the predetermined region of the display device is changed and displayed. Thus, desired information can be selected easily and hence operability improvement in character input is achieved.

In the above-mentioned configuration, in response to an increase in the distance between the touch panel and the instructing body, the display device changes and displays information relevant to the predetermined region.

According to the above-mentioned configuration, in response to an increase in the distance between the touch panel and the instructing body, the information relevant to the predetermined region of the display device is changed and displayed. Thus, desired information can be selected easily and hence operability improvement in character input is achieved.

In the above-mentioned configuration, in response to an increase in the distance between the touch panel and the instructing body, the display device enlarges and displays information relevant to the predetermined region.

According to the above-mentioned configuration, in response to an increase in the distance between the touch panel and the instructing body, the information relevant to the predetermined region of the display device is enlarged and displayed. Thus, information in a desired size can be selected easily and hence operability improvement in character input is achieved.

In the above-mentioned configuration, the predetermined value is 0.

In the above-mentioned configuration, the display device is capable of displaying at least one icon and the predetermined region corresponds to the icon.

According to the above-mentioned configuration, the predetermined region of the display device is brought into correspondence to the icon. Thus, the predetermined region becomes clear and hence operability improvement in character input is achieved.

In the above-mentioned configuration, the icon is a cursor key and information relevant to the cursor key is an input character candidate corresponding to the cursor key.

According to the above-mentioned configuration, the icon is adopted as the cursor key and the information relevant to the cursor key is regarded as the input character candidate corresponding to the cursor key. Thus, operability improvement in character input is achieved.

In the above-mentioned configuration, the cursor key displays the kind of input character.

According to the above-mentioned configuration, a kana character, an alphabetical character, a numeric character, and the like are displayed as the kind of input character. Thus, operability improvement in character input is achieved.

In the above-mentioned configuration, the input character candidate is displayed in a form of ten keys.

According to the above-mentioned configuration, the input character candidate is displayed in the form of ten keys. Thus, operability improvement in character input is achieved.

In the above-mentioned configuration, the size of the input character candidate is fixed when the instructing body is moved in a horizontal direction.

According to the above-mentioned configuration, when the instructing body is moved in a horizontal direction, the size of the input character candidate is fixed. Thus, operability improvement in character input is achieved.

In the above-mentioned configuration, the predetermined value is adopted as a first predetermined value and the display device includes an input character display region for displaying a character inputted therein. Then, in the input character candidate whose size has been fixed, when the distance becomes greater than or equal to 0 and smaller than or equal to the second predetermined value, the input character display region displays a character serving as the input character candidate for which the distance has become greater than or equal to 0 and smaller than or equal to the second predetermined value.

According to the above-mentioned configuration, in addition to the predetermined region for displaying the input character candidate, the display device includes the input character display region for displaying the inputted character. Thus, sight line movement for character input and displayed character check is reduced and hence operability improvement in character input is achieved.

In the above-mentioned configuration, the input character display region displays a character string containing a character serving as the input character candidate for which the distance has become greater than or equal to 0 and smaller than or equal to the second predetermined value. Then, in the character string, when the distance becomes greater than or equal to 0 and smaller than or equal to the second predetermined value, the input character display region displays a character of the character string for which the distance has become greater than or equal to 0 and smaller than or equal to the second predetermined value.

According to the above-mentioned configuration, a character string is displayed that contains a character serving as the input character candidate for which the distance between the touch panel and the instructing body has become greater than or equal to 0 and smaller than or equal to the second predetermined value. After that, when the distance between the touch panel and the instructing body has again become greater than or equal to 0 and smaller than or equal to the second predetermined value, the character of a character string for which the distance has become greater than or equal to 0 and smaller than or equal to the second predetermined value is displayed. Thus, a desired character can be selected easily from the character string and hence operability improvement in character input is achieved.

In the above-mentioned configuration, the second predetermined value is equal to the first predetermined value or alternatively 0.

The display method of the present invention is a display method employable in an electronic device including: a display device; and a touch panel overlaid on the display device and capable of detecting a distance with an instructing body, wherein when in a predetermined region of the display device, the distance becomes greater than or equal to 0 and smaller than or equal to a predetermined value and, after that, the distance between the touch panel and the instructing body becomes greater than the predetermined value, in response to a change in the distance between the touch panel and the instructing body, the display device changes and displays information relevant to the predetermined region.

According to the above-mentioned method, in response to a change in the distance between the touch panel and the instructing body, the information relevant to the predetermined region of the display device is changed and displayed. Thus, desired information can be selected easily and hence operability improvement in character input is achieved.

In the above-mentioned method, the predetermined value is 0.

Effect of the Invention

According to the present invention, in a touch panel of capacitive sensing type, the influence of a hand to a hand-held part at the time that the device body is held is suppressed.

BRIEF DESCRIPTION OF THE DRAWINGS

FIG. 30 Diagram showing an example of a method of detecting the holding-hand state of an electronic device of FIG. 27

FIG. 31 Diagram showing an example of the holding-hand state (i.e., the grasping state) and the resistance of each variable resistor in an electronic device of FIG. 27

BEST MODE FOR CARRYING OUT THE INVENTION

Preferred embodiments for implementing the present invention are described below with reference to the drawings.

Embodiment 1

Figure 1:
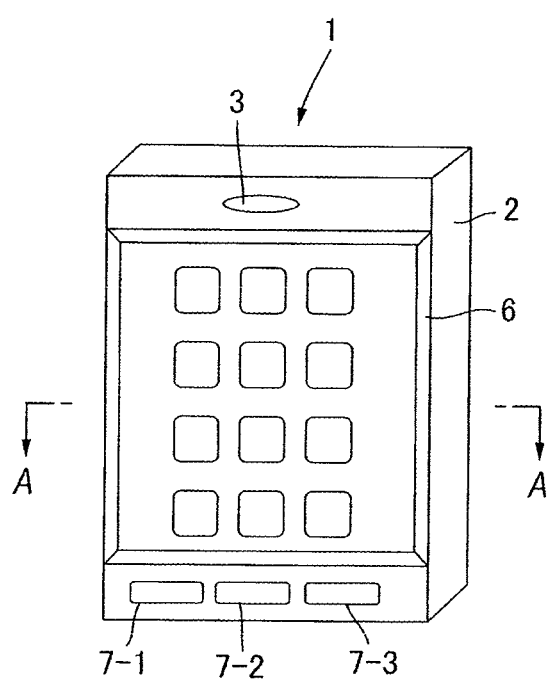
FIG. 1 Perspective view showing an outline of an electronic device according to Embodiment 1 of the present invention FIG. 2 Block diagram showing an outline configuration of an electronic device of FIG. 1

FIG. 1 is a perspective view showing an outline of an electronic device according to Embodiment 1 of the present invention. In this figure, the electronic device 1 according to the present embodiment is a portable wireless device referred to as a smart phone, in which a receiver 3 is provided in an upper part on the front face side of a housing 2 formed in a quadrangular shape, and a touch panel module 6 of capacitive sensing type is provided under the receiver 3. Further, three function buttons 7-1 to 7-3 are provided under the touch panel module 6.

Figure 2:
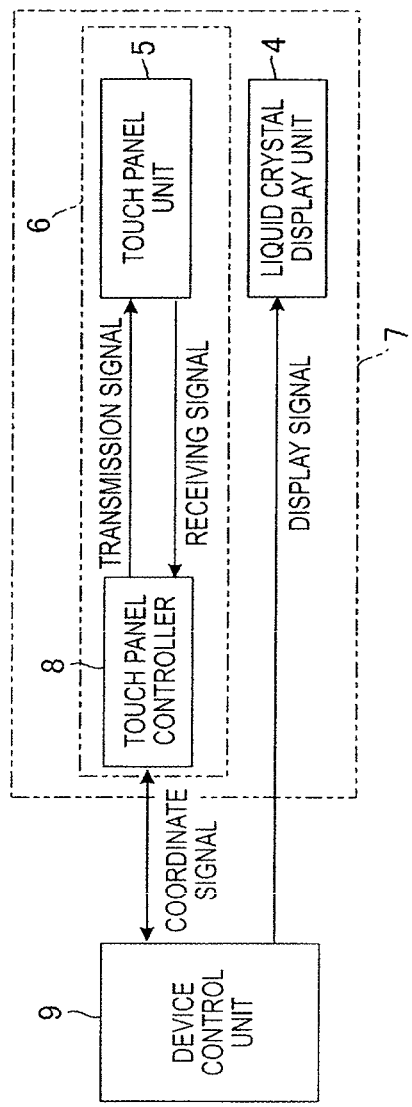

FIG. 2 is a block diagram showing an outline configuration of the electronic device 1 according to the present embodiment. In the electronic device 1 shown in this figure, the touch panel module 6 includes a Touch panel unit 5 and a touch panel controller 8 for exchanging a transmission signal and a receiving signal with the Touch panel unit 5. The device control unit 9 exchanges a coordinate signal with the touch panel controller 8 and provides a display signal to the Liquid crystal display unit 4. The touch panel unit 7 includes the Liquid crystal display unit 4 and the touch panel module 6.

The Liquid crystal display unit 4 of the touch panel unit 7 has a quadrangular shape and is used for display for the purpose of operation of the electronic device 1 and for display of an image or the like. The Touch panel unit 5 has approximately the same quadrangular shape as the Liquid crystal display unit 4 and is overlaid on the Liquid crystal display unit 4. The shape of the Liquid crystal display unit 4 and the Touch panel unit 5 is set to be quadrangular. However, the shape may be rectangular or square.

Figure 3:
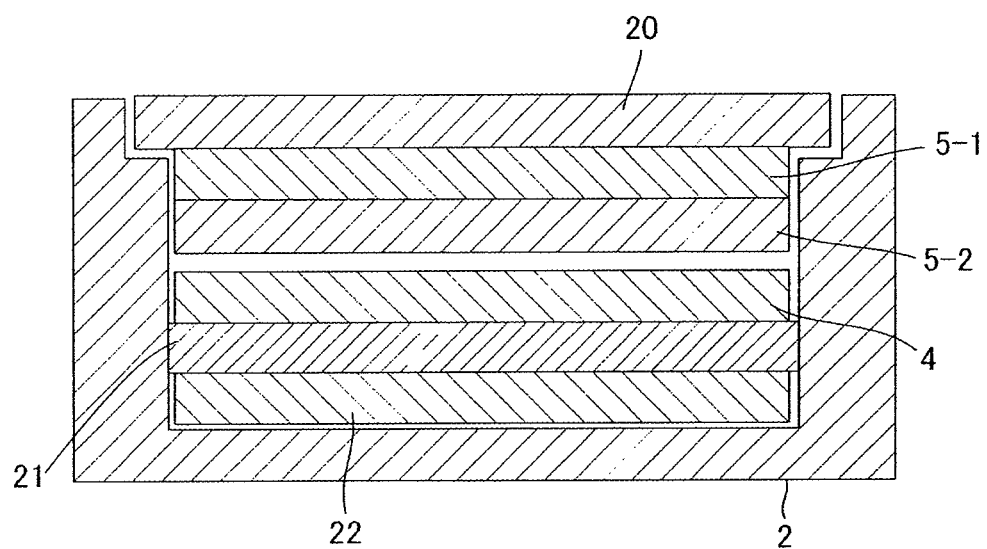
FIG. 3 Sectional view of an electronic device of FIG. 1 taken along line A-A

FIG. 3 is a sectional view of FIG. 1 taken along line A-A. This figure shows the cross section of a center portion of the touch panel unit 7. The Touch panel unit 5 of the touch panel unit 7 includes a receiving sensor panel (a first sensor panel) 5-1 and a transmission sensor panel (a second sensor panel) 5-2. A cover panel 20 fabricated from glass material is arranged immediately above the receiving sensor panel 5-1 and the Liquid crystal display unit 4 is arranged immediately under the transmission sensor panel 5-2. Further, a Back light unit 21 is arranged immediately under the Liquid crystal display unit 4 and a Battery unit 22 is arranged immediately under the Back light unit 21.

Figure 4:
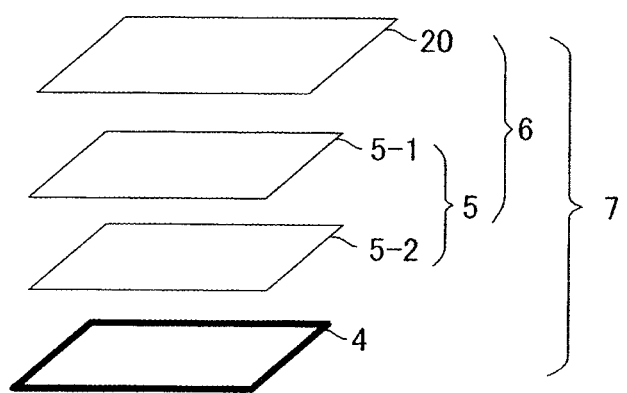
FIG. 4 Perspective view showing arrangement relation between a cover panel, a receiving sensor panel, a transmission sensor panel, and a Liquid crystal display unit in a Touch panel unit of an electronic device of FIG. 1

FIG. 4 is a perspective view showing arrangement relation between the cover panel 20, the Touch panel unit 5, the receiving sensor panel 5-1 and the transmission sensor panel 5-2, and the Liquid crystal display unit 4. As shown in the figure, the cover panel 20, the receiving sensor panel 5-1, the transmission sensor panel 5-2, the Liquid crystal display unit 4 are is arranged in this order.

Figure 5:
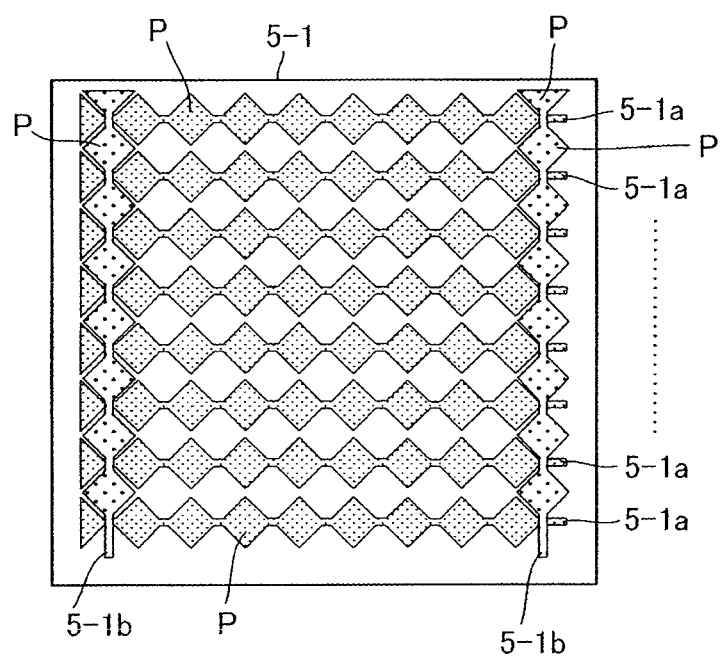
FIG. 5 Plan view diagram showing a receiving sensor panel of a Touch panel unit of an electronic device of FIG. 1

FIG. 5 is a plan view diagram showing the receiving sensor panel 5-1 of the Touch panel unit 5. As shown in the figure, the receiving sensor panel 5-1 is formed in a quadrangular shape and includes: a plurality of receiving electrodes 5-1a arranged in a horizontal direction in parallel from the upper end toward the lower end; and two transmission electrodes 5-1b arranged in a vertical direction respectively on the left end side and the right end side. Each receiving electrode 5-1a and each transmission electrode 5-1b are constructed from a plurality of electrode pieces P having a rhombus shape. The electrode piece P located at the tip of each of the two transmission electrodes 5-1b has a triangular shape.

Figure 6:
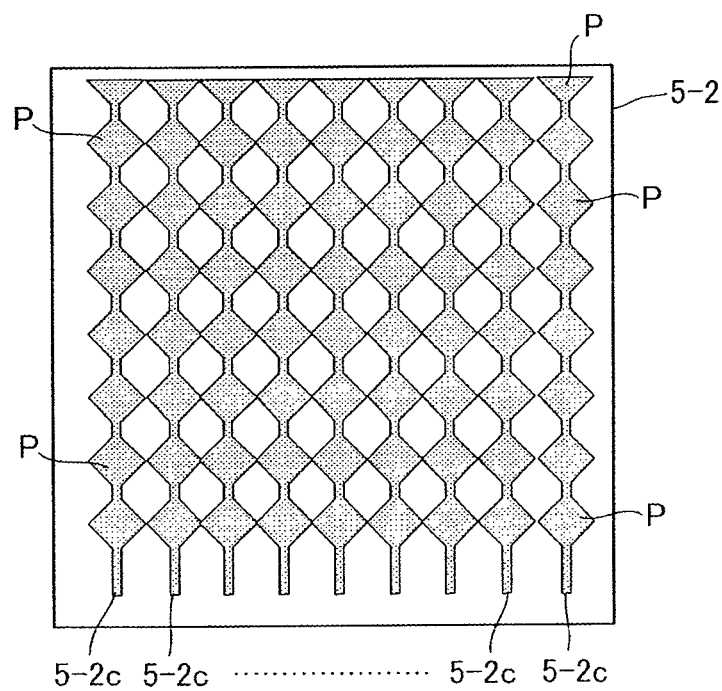
FIG. 6 Plan view diagram showing a transmission sensor panel of a Touch panel unit of an electronic device of FIG. 1

FIG. 6 is a plan view diagram showing the transmission sensor panel 5-2 of the Touch panel unit 5. As shown in the figure, the transmission sensor panel 5-2 is formed in a quadrangular shape similarly to the receiving sensor panel 5-1 and includes: a plurality of transmission electrodes 5-2c arranged in a vertical direction in parallel from the left end toward the right end (the reverse direction may be employed). Similarly to each receiving electrode 5-1a and each transmission electrode 5-1b of the receiving sensor panel 5-1, each transmission electrode 5-2c includes a plurality of electrode pieces P having a rhombus shape. Here, the electrode piece P located at the tip of each of the transmission electrodes 5-2c has a triangular shape.

Figure 7:
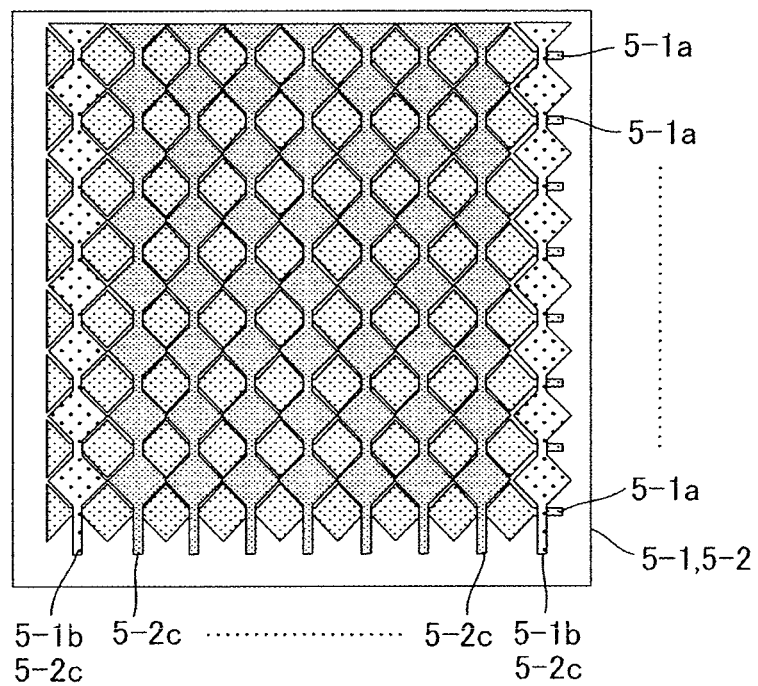
FIG. 7 Plan view diagram showing a state that a receiving sensor panel and a transmission sensor panel of an electronic device of FIG. 1 are overlaid with each other FIG. 8 Timing chart showing operation of a touch panel controller of an electronic device of FIG. 1

FIG. 7 is a plan view diagram showing a state that the receiving sensor panel 5-1 and the transmission sensor panel 5-2 are overlaid with each other. As shown in the figure, when the receiving sensor panel 5-1 and the transmission sensor panel 5-2 are overlaid with each other, the transmission electrodes 5-1b on the left end side and the right end side of the receiving sensor panel 5-1 and the transmission electrodes 5-2c on the left end side and the right end side of the transmission sensor panel 5-2 overlap with each other, while the other electrodes do not overlap with each other and arranged alternately in vertical and horizontal directions.

Here, in the electronic device 1 according to the present embodiment, 90% or more of the area of the receiving sensor panel 5-1 overlaps with the transmission sensor panel 5-2. Further, the region where the receiving sensor panel 5-1 and the transmission sensor panel 5-2 overlap with each other serves as the response region of the touch panel module 6. The two transmission electrodes 5-1b of the receiving sensor panel 5-1 are arranged in the outermost periphery of the response region. In this case, when the shape of the Touch panel unit 5 is rectangular, the two transmission electrodes 5-1b are arranged respectively along the two sides opposite to each other. The number of the transmission electrodes 5-1b of the receiving sensor panel 5-1 may be one or alternatively three or more.

Returning to FIG. 2, the touch panel controller 8 applies a transmission signal on all the transmission electrodes 5-2c of the transmission sensor panel 5-2. In this application, order of application may be changed arbitrarily under the control of the touch panel controller 8. Thus, all the transmission signals may be sent out in synchronization. The transmission signal is applied sequentially one by one from the transmission electrode 5-2c arranged at the left end to the transmission electrode 5-2c arranged at the right end. Further, when applying the transmission signal on the transmission electrode 5-2c arranged at the left end and the transmission electrode 5-2c arranged at the right end, at the same timing, the touch panel controller 8 applies the transmission signal also on the transmission electrode 5-1b arranged on the left end side of the receiving sensor panel 5-1 and the transmission electrode 5-1b arranged on the right end side. That is, at the same time that the transmission signal is applied on the transmission electrode 5-2c arranged at the left end, the same transmission signal is applied also on the transmission electrode 5-1b arranged on the left end side. Further, at the same time that the transmission signal is applied on the transmission electrode 5-2c arranged at the right end, the same transmission signal is applied also on the transmission electrode 5-1b arranged at the right end.

Further, at the same time that the transmission signal is applied on the transmission electrode 5-2c of the transmission sensor panel 5-2, the touch panel controller 8 detects the transmission signal in all the receiving electrodes 5-1a of the receiving sensor panel 5-1. That is, at the same time that the transmission signal is applied on one of the transmission electrodes 5-2c, the transmission signal is detected sequentially from the receiving electrode 5-1a arranged on the upper end side and to the receiving electrode 5-1a arranged at the lower end. The transmission signal having been detected is referred to as a receiving signal, hereinafter.

Figure 8:
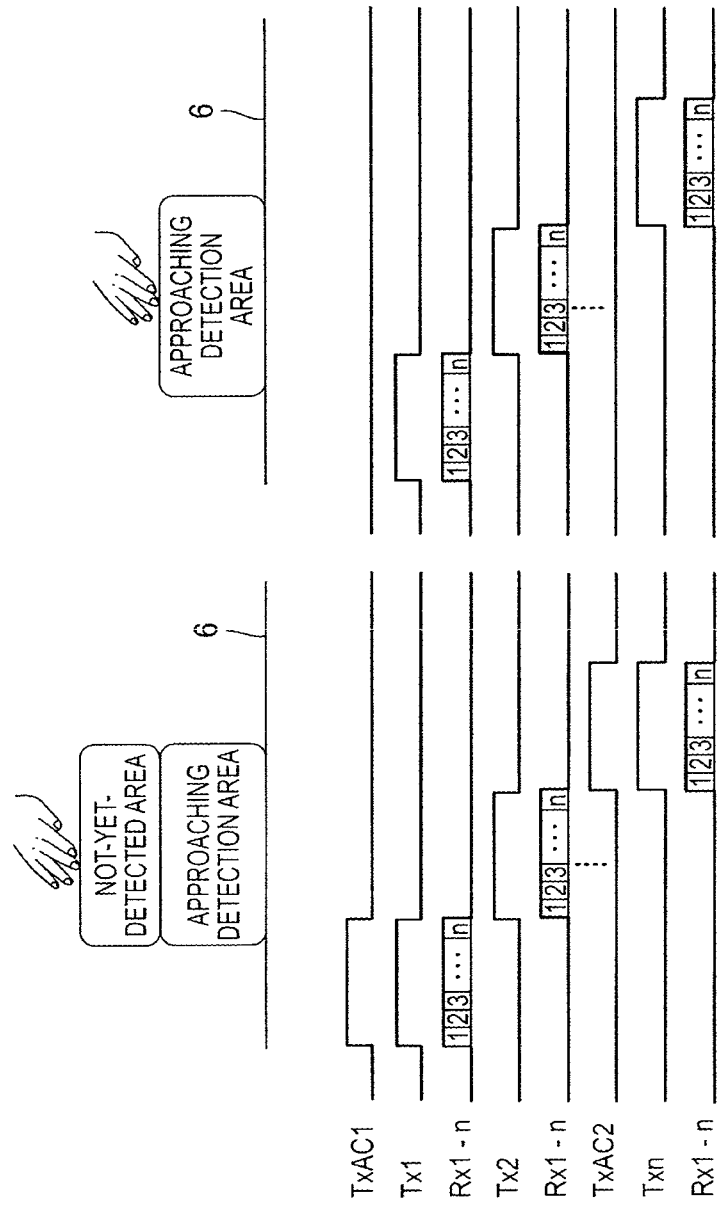

FIG. 8 is a timing chart showing the operation of the touch panel controller 8. In this figure, "TxAC1" indicates a transmission signal to be applied on the transmission electrode 5-1b arranged on the left end side of the receiving sensor panel 5-1, "Tx1" indicates a transmission signal to be applied on the transmission electrode 5-2c arranged on the left end side of the transmission sensor panel 5-2, and "Rx1 to n" indicates a receiving signal obtained by all the receiving electrodes 5-1a of the receiving sensor panel 5-1. Further, "Tx2" indicates a transmission signal to be applied on the transmission electrode 5-2c arranged at the second position relative to the left end of the transmission sensor panel 5-2, "Txn" indicates a transmission signal to be applied on the transmission electrode 5-2c arranged on the right end side of the transmission sensor panel 5-2, and "TxAC2" indicates a transmission signal to be applied on the transmission electrode 5-1b arranged on the right end side of the receiving sensor panel 5-1.

As shown in FIG. 8, at each time that the transmission signal is applied sequentially one by one on all the transmission electrodes 5-2c of the transmission sensor panel 5-2, receiving is performed by all the receiving electrodes 5-1a of the receiving sensor panel 5-1. Here, when the transmission signal is applied on the transmission electrode 5-2c arranged on the left end side of the transmission sensor panel 5-2, the same transmission signal is applied also on the transmission electrode 5-1b arranged on the left end side of the receiving sensor panel 5-1. Further, when the transmission signal is applied on the transmission electrode 5-2c arranged on the right end side of the transmission sensor panel 5-2, the same transmission signal is applied also on the transmission electrode 5-1b arranged on the right end side of the receiving sensor panel 5-1. However, this case corresponds to operation performed at not-yet-detected time that a person's hand is not detected, that is, at the time that a person's hand is located in a not-yet-detected area. When a person's hand is detected, that is, when a person's hand enters an approaching detection area, the transmission signal is not applied on the two transmission electrodes 5-1b arranged on the left end side and the right end side of the receiving sensor panel 5-1 and hence these electrodes go into a ground potential.

When the transmission signal is applied on both of the transmission electrode 5-2c arranged on the left end side of the transmission sensor panel 5-2 and the transmission electrode 5-1b arranged on the left end side of the receiving sensor panel 5-1, a high sensitivity state in which the electric field becomes strong is established so that approaching of a person's hand can be detected with high sensitivity. On the contrary, when the transmission signal is no longer applied on the transmission electrode 5-1b arranged on the left end side of the receiving sensor panel 5-1, the transmission electrode 5-1b blocks the electric field of the transmission electrode 5-2c arranged on the left end side of the transmission sensor panel 5-2 so that a low sensitivity state is established. In the low sensitivity state, at the time that the electronic device 1 is held with the hand, recognition as operation can be avoided even when fingers touch the left and the right end parts of the Touch panel unit 5. This situation holds similarly in a case that the transmission signal is applied on both of the transmission electrode 5-2c arranged on the right end side of the transmission sensor panel 5-2 and the transmission electrode 5-1b arranged on the right end side of the receiving sensor panel 5-1.

Figure 9:
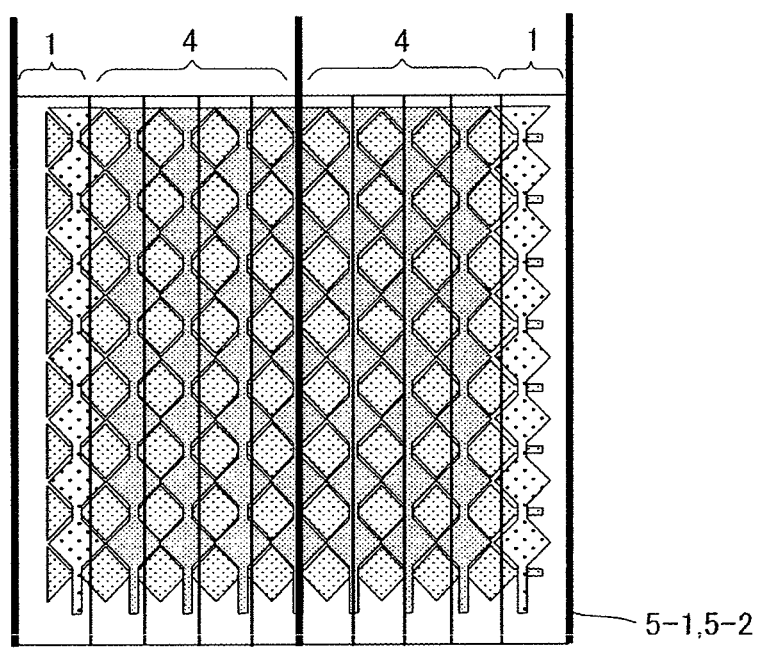
FIG. 9 Diagram used for describing the arrangement position of a transmission electrode in a receiving sensor panel of an electronic device of FIG. 1

As such, the two transmission electrodes 5-1b of the receiving sensor panel 5-1 are provided in order that at the time that the electronic device 1 is held with the hand, the device control unit 9 should be prevented from recognizing as operation even when fingers approach the left and the right end parts of the Touch panel unit 5. Here, it is preferable that as shown in FIG. 9, the two transmission electrodes 5-1b are arranged between an edge of the Touch panel unit 5 and a point that internally divides the edge of the Touch panel unit 5 and the center of the Touch panel unit 5 into a ratio of 1 to 4 along a line passing through the center (e.g., the center of gravity) of the Touch panel unit 5. Further, also the number of the transmission electrodes 5-1b is not limited to one each in the left and the right and may be one or more.

In addition to the processing described above, the device control unit 9 outputs a display signal for causing the Liquid crystal display unit 4 to perform predetermined display at not-yet-detected time that approaching of a person's hand is not detected, and stops the output of the display signal when approaching of a person's hand is detected. This causes the user of the electronic device 1 to recognize that the sensitivity of the peripheral edge part of the Touch panel unit 5 is raised.

Figure 10:
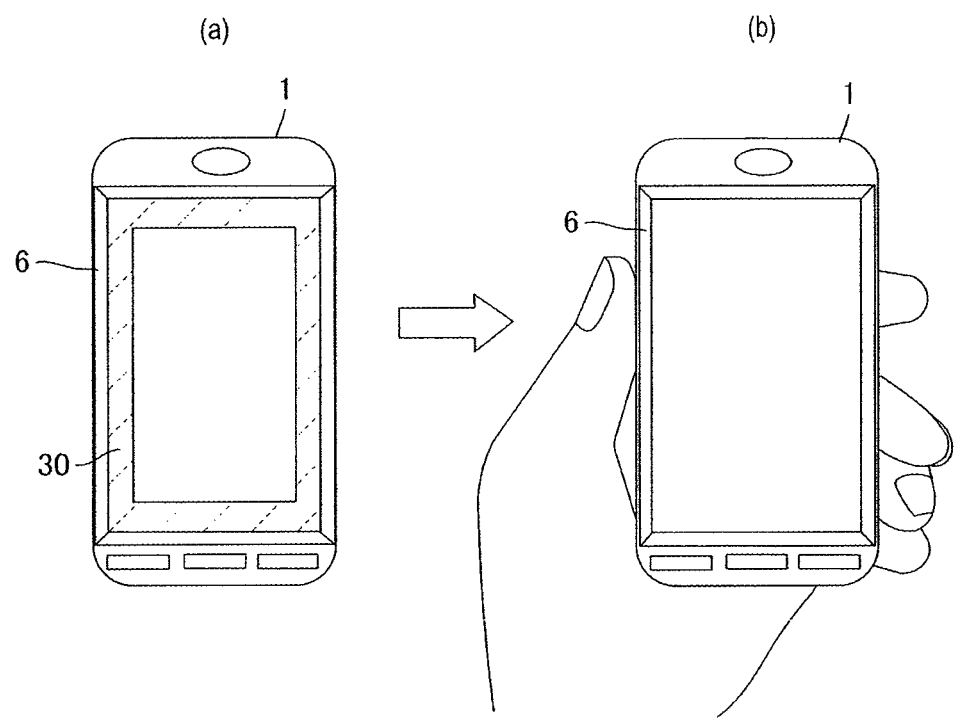
FIG. 10($a$) and FIG. 10($b$): Diagrams showing a change in display of a Liquid crystal display unit at not-yet-detected time that approaching of a person's hand is not detected and at the time that approaching of a person's hand is detected in an electronic device of FIG. 1

FIGS. 10(a) and 10(b) are diagrams showing a change in display of the Liquid crystal display unit 4 at not-yet-detected time that approaching of a person's hand is not detected and at the time that approaching of a person's hand is detected. As shown in FIG. 10(a) of this figure, at not-yet-detected time that approaching of a person's hand is not detected, belted display 30 (e.g., display in orange color) is performed in the peripheral edge part of the Liquid crystal display unit 4. When approaching of a person's hand is detected, as shown in FIG. 10(b) of this figure, the belted display 30 is no longer performed.

When a person's hand approaches the Touch panel unit 5, the receiving signal varies in the receiving electrode 5-1a of the receiving sensor panel 5-1 located in the part of approaching. Thus, from the coordinate signal corresponding to the receiving electrode 5-1a in which the receiving signal has varied, the device control unit 9 identifies the part where the hand approaches.

The touch panel controller 8 and the device control unit 9 are constructed from a CPU (Central Processing Unit), a ROM (Read Only Memory), a RAM (Random Access Memory), and an interface circuit. The ROM stores a program for controlling the CPU. The RAM is used in the operation of the CPU.

Next, the operation of the electronic device 1 according to the present embodiment is described below.

Figure 11:
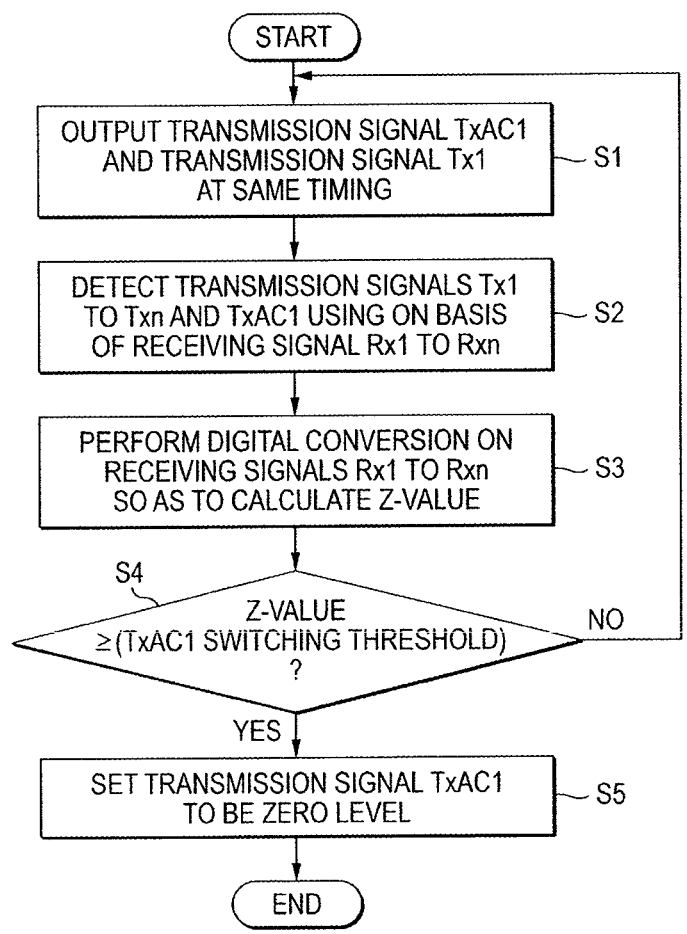
FIG. 11 Flow chart used for describing operation of a touch panel controller of an electronic device of FIG. 1

FIG. 11 is a flow chart used for describing the operation of the touch panel controller 8 of the electronic device 1 according to the present embodiment. The flow chart shown in this figure shows the operation of a case that a transmission signal is applied on each of the transmission electrode 5-1b arranged on the left end side of the receiving sensor panel 5-1 and the transmission electrode 5-2c arranged on the left end side of the transmission sensor panel 5-2.

First, the touch panel controller 8 applies the transmission signals TxAC1 and Tx1 at the same timing onto the transmission electrode 5-1b arranged on the left end side of the receiving sensor panel 5-1 and the transmission electrode 5-2c of the transmission sensor panel 5-2 (step S1). After the application of the transmission signals TxAC1 and Tx1, on the basis of receiving signals Rx1 to Rxn received by all the receiving electrodes 5-1a of the receiving sensor panel 5-1, transmission signals Tx1 to Txn and TxAC1 are detected (step S2). After the detection of the transmission signals Tx1 to Txn and TxAC1, the receiving signals Rx1 to Rxn undergo digital conversion so that a Z-value is calculated (step S3). Then, it is judged whether the calculated Z-value is greater than or equal to a TxAC1 switching threshold (step S4). Here, the TxAC1 switching threshold indicates a value corresponding to the Z-value of a case that the electronic device 1 is grasped by a person.

When the calculated Z-value is less than the TxAC1 switching threshold (i.e., in case of "NO" in the judgment at step S4), the procedure returns to step S1. In case of being greater than or equal to the TxAC1 switching threshold (i.e., in case of "YES" in the judgment at step S4), the transmission electrode 5-1b arranged on the left end side of the receiving sensor panel 5-1 is set at a ground potential so that the transmission signal TxAC1 is set to be zero level (step S5). After that, the present processing is terminated.

Here, in a case that the transmission signal is applied on each of the transmission electrode 5-1b arranged on the right end side of the receiving sensor panel 5-1 and the transmission electrode 5-2c arranged on the right end side of the transmission sensor panel 5-2, it is sufficient that the left end side is replaced by the right end side and the transmission signal TxAC1 is replaced by TxAC2.

As such, according to the electronic device 1 according to the present embodiment, the electronic device includes: the touch panel unit 7 having the Liquid crystal display unit 4 and the Touch panel unit 5 of capacitive sensing type; the touch panel controller 8 for exchanging a transmission signal and a receiving signal with the Touch panel unit 5 of the touch panel module 6; and the device control unit 9 for exchanging a coordinate signal with the touch panel controller 8 and providing a display signal to the Liquid crystal display unit 4. Then, the Touch panel unit 5 includes: the receiving sensor panel 5-1 including the plurality of receiving electrodes 5-1a arranged in a horizontal direction in parallel and the two transmission electrodes 5-1b arranged respectively on the left end side and the right end side in a vertical direction; and the transmission sensor panel 5-2 including the plurality of transmission electrodes 5-2c arranged in a vertical direction in parallel from the left end toward the right end. Then, an identical transmission signal is applied on both of the transmission electrode 5-2c of the transmission sensor panel 5-2 and the transmission electrode 5-1b of the receiving sensor panel 5-1 so that approaching of a person's hand is detected with high sensitivity. After the detection of approaching of a person's hand, the transmission electrode 5-1*b* of the receiving sensor panel 5-1 is set at a ground potential so that the sensitivity is reduced. Thus, the influence of the hand to the hand-held part at the time that the electronic device 1 is held is suppressed.

Here, in the electronic device 1 according to the present embodiment, the receiving sensor panel 5-1 has been constructed from the plurality of receiving electrodes 5-1*a* and the two transmission electrodes 5-1*b*. However, the two transmission electrodes 5-1*b* may be constructed on a panel (a third sensor panel) other than the receiving sensor panel 5-1. Further, it is preferable that 90% or more of the area of the third sensor panel overlaps with the transmission sensor panel 5-2.

That is, in the electronic device 1 according to the present embodiment, the plurality of receiving electrodes 5-1*a* and the two transmission electrodes 5-1*b* are formed on the surface (the surface on the outer side in the electronic device 1) of the receiving sensor panel 5-1 (the first sensor panel), and the plurality of transmission electrodes 5-2*c* are formed on the surface (the surface on the outer side in the electronic device 1) of the transmission sensor panel 5-2 (the second sensor panel). However, the two transmission electrodes 5-1*b* may be formed on the surface (the surface on the outer side in the electronic device 1) of a panel (the third sensor panel) other than the receiving sensor panel 5-1.

Further, it is sufficient that the plurality of receiving electrodes 5-1*a*, the two transmission electrodes 5-1*b*, and the plurality of transmission electrodes 5-2*c* are arranged on any of the surface (the surface on the outer side in the electronic device 1) or the rear face (the surface on the inner side in the electronic device 1) of one or more sensor panels. For example, at least one of the transmission electrodes 5-1*b* may be arranged on the surface (the first surface) of the receiving sensor panel 5-1 (the first sensor panel), the receiving electrodes 5-1*a* may be arranged on the rear face (the second surface) of the receiving sensor panel 5-1, and the transmission electrodes 5-2*c* may be arranged on the rear face (the third surface) of the transmission sensor panel 5-2 (the second sensor panel).

Figure 12:
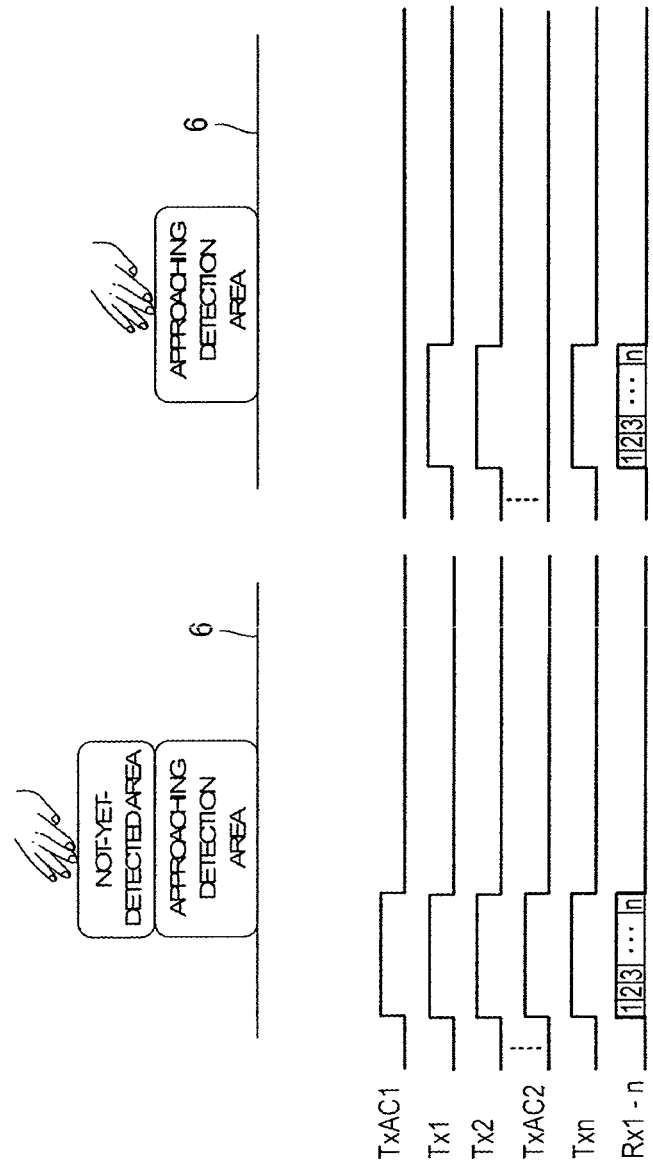
FIG. 12 Timing chart showing operation of a touch panel controller in an application example of an electronic device of FIG. 1

Further, in the electronic device 1 according to the present embodiment, as shown in the timing chart of FIG. 8, the transmission signal are applied sequentially one by one on the plurality of transmission electrodes 5-2*c* of the transmission sensor panel 5-2. However, as shown in the timing chart of FIG. 12, the transmission signal may be applied at the same timing to all of the plurality of transmission electrodes 5-2*c* of the transmission sensor panel 5-2.

Further, in the electronic device 1 according to the present embodiment, the program describing the processing shown in the flow chart of FIG. 11 has been stored in the ROM. However, the program may be stored in a storage medium such as a magnetic disc, an optical disc, a magneto-optical disc, and a flash memory and then distributed. Alternatively, the program may be saved in a server (not shown) on a network such as the Internet and then downloaded through a telecommunication line.

Embodiment 2

Figure 13:
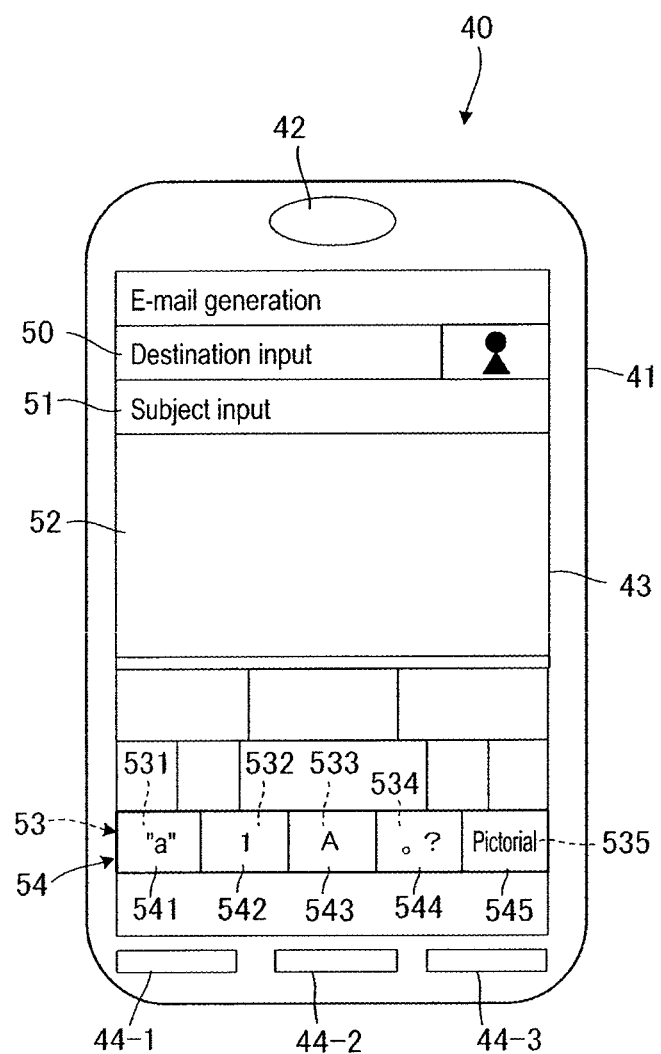
FIG. 13 Front view showing an outline of an electronic device according to Embodiment 2 of the present invention FIG. 14 Block diagram showing an outline configuration of an electronic device of FIG. 13

FIG. 13 is a front view showing an outline of an electronic device according to Embodiment 2 of the present invention. In this figure, the electronic device 40 according to the present embodiment is a portable wireless device referred to as a smart phone similar to the electronic device 1 according to Embodiment 1 described above. Then, a receiver 42 is provided in an upper part on the front face side of a housing 41 formed in a quadrangular shape, and a touch panel module 43 of capacitive sensing type is provided under the receiver 42. Further, three function buttons 44-1 to 44-3 are provided under the touch panel module 43.

Figure 14:
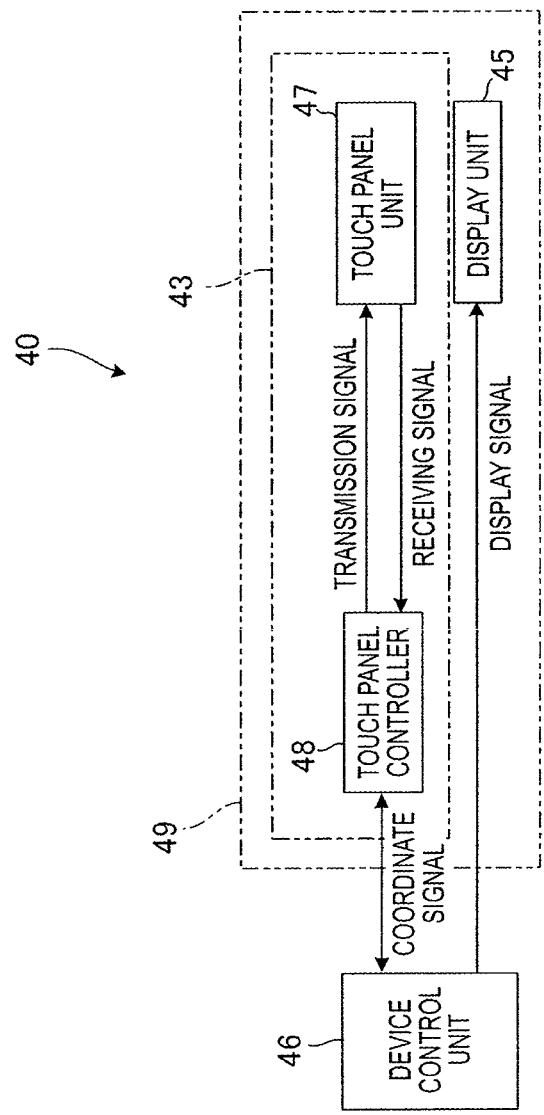

FIG. 14 is a block diagram showing an outline configuration of the electronic device 40 according to the present embodiment. In this figure, the electronic device 40 according to the present embodiment includes the touch panel module 43 described above, a Display unit 45, and a device control unit 46. The touch panel module 43 includes a Touch panel unit 47 and a touch panel controller 48 for exchanging a transmission signal and a receiving signal with the Touch panel unit 47. The device control unit 46 exchanges a coordinate signal with the touch panel module 43 and provides a display signal to the Display unit 45. The Display unit 45 and the touch panel module 43 constitute a touch panel unit 49. The device control unit 46 and the touch panel controller 48 are constructed from a CPU, a ROM, a RAM, and an interface circuit. The ROM stores a program for controlling the CPU. The RAM is used in the operation of the CPU.

The Display unit 45 has a quadrangular shape and is used for display for the purpose of operation of the electronic device 40 and for display of an image or the like. In the Display unit 45, an LCD (Liquid Crystal Display), an organic EL (Electro Luminescence), or an electronic paper is employed. The Touch panel unit 47 has a quadrangular shape approximately the same as the Display unit 45 and is overlaid on the Display unit 45. Here, the Display unit 45 and the Touch panel unit 47 may be arranged in the inside of the housing 41 or alternatively in the outside. However, in whichever case, the Touch panel unit 47 is arranged on the outer side relative to the Display unit 45. Further, in the electronic device 40 according to the present embodiment, the shape of the Display unit 45 and the Touch panel unit 47 is set to be quadrangular. However, the shape may be rectangular or square.

The electronic device 40 according to the present embodiment is capable of character input. For example, when an application for generating an E-mail is started, a mail screen as shown in FIG. 13 is displayed and then character input is allowed in this mail screen. The mail screen shown in FIG. 13 contains a destination input display region 50, a subject input display region 51, an input display region 52, and a character kind selection key display region 53. These display regions 50 to 53 are set up in the Touch panel unit 47. The display position of the input display region 52 may be fixed or alternatively may be variable. The character kind selection key display region 53 includes a kana character input key display region 531, a numeric character input key display region 532, an alphabetical character input key display region 533, a symbol input key display region 534, and a pictorial symbol input key display region 535. The display positions of the individual display regions 531 to 535 may be fixed or alternatively may be variable. In the Touch panel unit 47, a character kind selection key 54 is set up in correspondence to the character kind selection key display region 53. Here, the kana character input key display region 531, the numeric character input key display region 532, the alphabetical character input key display region 533, the symbol input key display region 534, and the pictorial symbol input key display region 535 individually correspond to a predetermined display region and a first display region.

Figure 44:
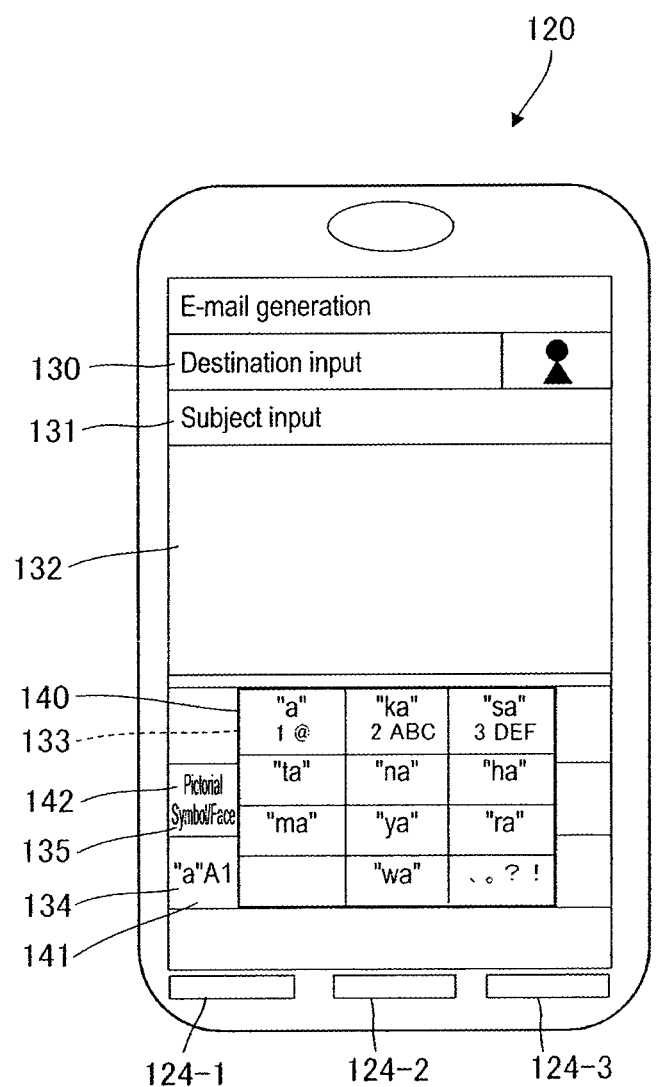

The character kind selection key 54 includes a kana character input key 541, a numeric character input key 542, an alphabetical character input key 543, a symbol input key 544, and a pictorial symbol input key 545. When each key is operated, a kana character, a numeric character, an alphabetical character, a symbol, and a pictorial symbol can be inputted. In this case, characters inputted as a subject name are displayed in the subject input display region 51 of the Display unit 45 and characters inputted for generating a text are displayed in the input display region 52 of the Display unit 45. The character kind selection key 54 serves as ten keys and hence a larger area is ensured for the input display region 52 in comparison with an electronic device provided with ten keys. Here, FIG. 44 is a diagram showing an example of a mail screen in an electronic device 120 provided with ten keys. In the mail screen shown in this figure, a destination input display region 130, a subject input display region 131, an input display region 132, a ten-key input display region 133, a character kind selection key display region 134, a pictorial symbol/symbol/face mark selection key display region 135, and the like are set up. Then, for these display regions, character input is performed by using ten keys 140, a character kind selection key 141, and a pictorial symbol/symbol/face mark selection key 142. The area of the input display region 132 is reduced by an amount corresponding to the ten keys 140.

In FIG. 13, in the electronic device 40 according to the present embodiment, in each of the kana character input key display region 531, the numeric character input key display region 532, the alphabetical character input key display region 533, the symbol input key display region 534, and the pictorial symbol input key display region 535 of the character kind selection key display region 53, when an instructing body such as a user's finger and a pen tip is brought close or apart, display can be performed in a manner of switching at least three kinds of characters (including a kana character, a numeric character, an alphabetical character, a symbol, and a pictorial symbol) in predetermined order. The three kinds of characters and the predetermined order are successive three kinds and their order selected from at least alphabets consisting of "A", "B", "C", "D", "E", "F", "G", "H", "I", "J", "K", "L", "M", "N", "O", "P", "Q", "R", "S", "T", "U", "V", "W", "X", "Y", "Z", "A", "B". Alternatively, they are successive three kinds and their order selected from at least numeric characters consisting of "1", "2", "3", "4", "5", "6", "7", "8", "9", "0", "1", "2" or alternatively "0", "1", "2", "3", "4", "5", "6", "7", "8", "9", "10", "11". Alternatively, they are successive three kinds and their order selected from at least Japanese characters consisting of "a", "ka", "sa", "ta", "na", "ha", "ma", "ya", "ra", "wa", "n", "a", "ka" or alternatively "i", "ki", "shi", "chi", "ni", "hi", "mi", "i", "ri", "wi", "i", "ki".

When display is performed in a manner of switching at least three kinds of characters in predetermined order, the user can select a desired character. After selecting a desired character, when the user goes into contact with (i.e., touches) this character, the character is confirmed. Selection and confirmation of a character is described below with reference to an example.

(A Case of Alphabetical Character Input)

Figure 15:
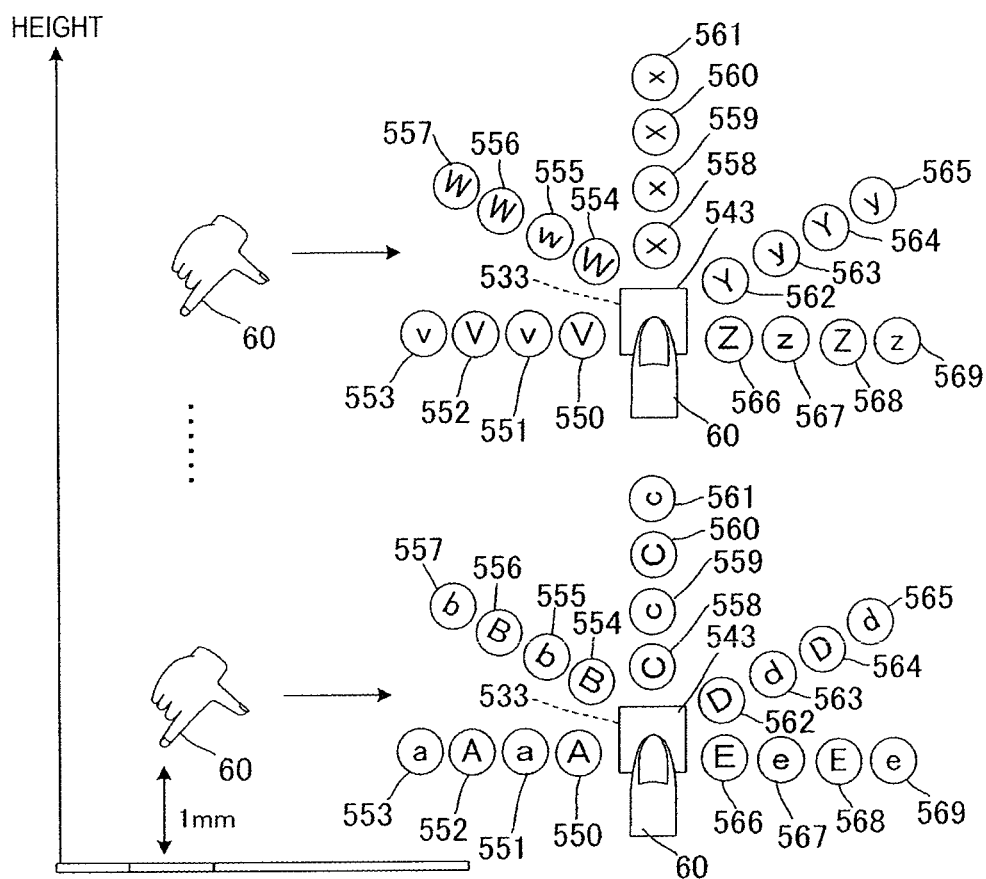
FIG. 15 Diagram schematically showing alphabetical character input operation in an electronic device of FIG. 13
Figure 16:
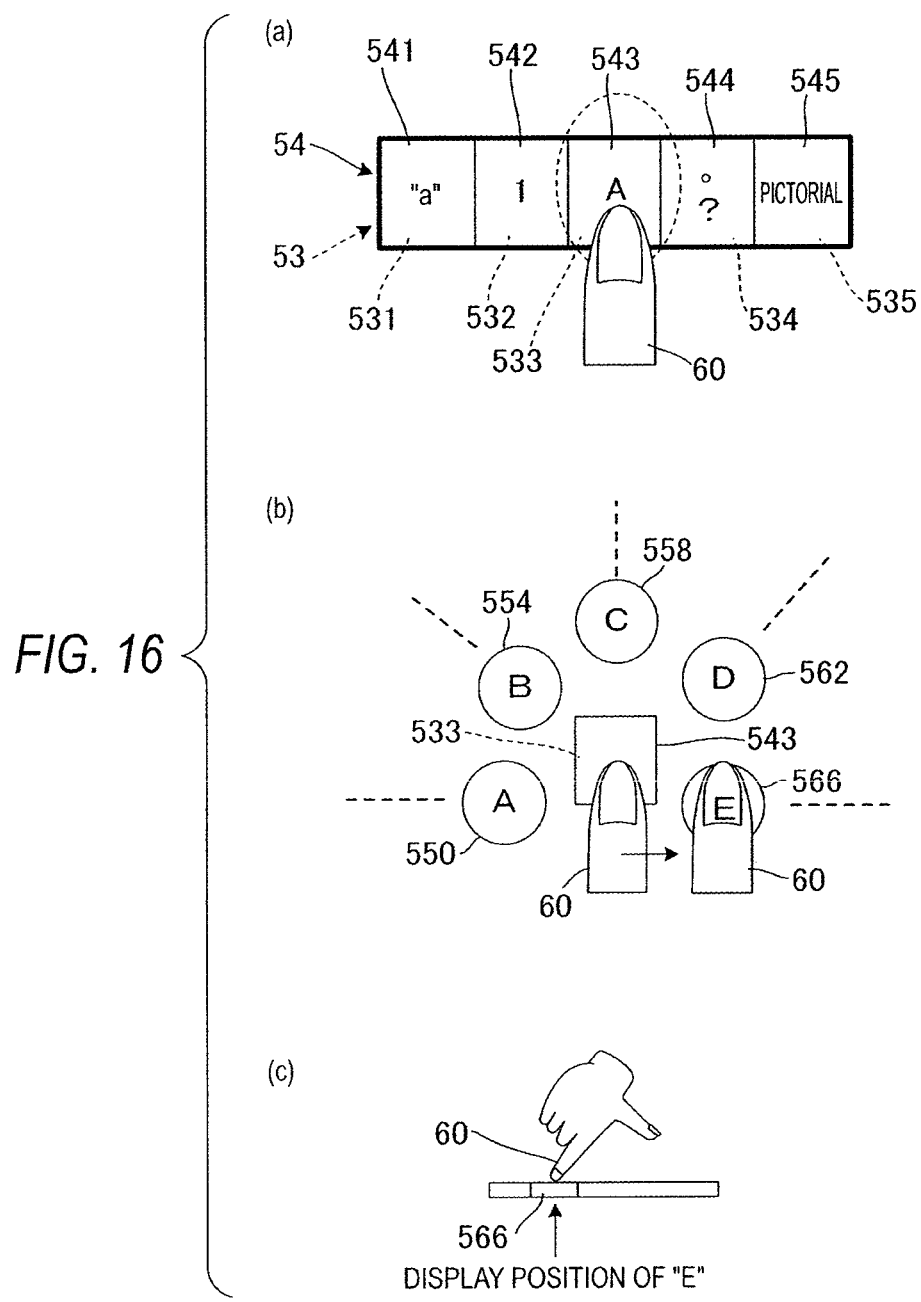
FIG. 16(*a*) to FIG. 16(*c*): Diagrams schematically showing alphabetical character input operation in an electronic device of FIG. 13

FIGS. 15 and 16(a) to 16(c) are diagrams schematically showing alphabetical character input operation. As shown in FIGS. 15 and 16(a), when a fingertip 60 is brought close to the alphabetical character input key display region (the first display region) 533 of the character kind selection key display region 53 to an extent of not going into contact (e.g., 1-mm immediately above the alphabetical character input key display region 533), each character of the string "'A', 'a', A, a" (translator's note: single quotes (') are used for explicitly indicating a full-size character) is displayed in each of the display regions (the second display regions) 550 to 553 on the left side in a horizontal direction from the alphabetical character input key display region 533. Further, each character of the string "B', 'b', B, b" is displayed in each of the display regions (the second display regions) 554 to 557 in an oblique upper left direction, each character of the string "C', 'c', C, c" is displayed in each of the display regions (the second display regions) 558 to 561 in an upward direction, each character of the string "D', 'd', D, d" is displayed in each of the display regions (the second display regions) 562 to 565 in an oblique upper right direction, and each character of the string "E', 'e', E, e" is displayed in each of the display regions (the second display regions) 566 to 569 on the right side in a horizontal direction. Here, each character string includes a "full-size upper-case character", a "full-size lower-case character", a "half-width upper-case character", and a "half-width lower-case character". Here, in FIGS. 15 and 16(a) to 16(c), the alphabetical character input key display region 533 serving as the first display region and the second display regions 550 to 569 are close to each other. However, they may be apart from each other.

In a state that alphabetical character candidates with beginning characters "'A', 'B', 'C', 'D', 'E'" are displayed, when the fingertip 60 is brought apart upward, the displayed alphabetical character candidates vary successively and, finally, alphabetical character candidates with beginning characters "'V', 'W', 'X', 'Y', 'Z'" are displayed. In this position, each character of the string "'V', 'v', V, v" is displayed in each of the display regions 550 to 553 on the left side in a horizontal direction from the alphabetical character input key display region 533. Further, each character of the string "'W', 'w', W, w" is displayed in each of the display regions 554 to 557 in an oblique upper left direction, each character of the string "'X', 'x', X, x" is displayed in each of the display regions 558 to 561 on in an upward direction, each character of the string "'Y', 'y', Y, y" is displayed in each of the display regions 562 to 565 in an oblique upper right direction, and each character of the string "'Z', 'z', Z, z" is displayed in each of the display regions 566 to 569 on the right side in a horizontal direction.

In a state that alphabetical character candidates with beginning characters "'V', 'W', 'X', 'Y', 'Z'" are displayed, when the fingertip 60 is moved in the opposite direction, that is, brought close to the alphabetical character input key display region 533, the displayed alphabetical character candidates vary successively in the opposite direction. That is, the display varies in reverse order to the previous one. As such, when the fingertip 60 is brought apart or close relative to the alphabetical character input key display region 533, the displayed alphabetical character candidates vary successively and hence a desired alphabetical character candidate can be selected.

Here, the distance between the fingertip 60 and the alphabetical character input key display region 533 is the distance to the Touch panel unit 47. However, the distance to the Display unit 45 may be employed. Alternatively, the distance to the housing 41 may be employed.

Further, the order of the alphabetical character candidates varying successively in response to the operation of the fingertip 60 is not changed.

Further, after the fingertip 60 is brought apart until alphabetical character candidates with beginning characters "'V', 'W', 'X', 'Y', 'Z'" are displayed, when the fingertip 60 is brought apart further, circulation may be performed such that alphabetical character candidates "'A', 'B', 'C', 'D', 'E'" are displayed again. However, the distance need be such that the fingertip 60 can be detected.

After a desired alphabetical character candidate is selected, when the display region (the second display region) of the selected alphabetical character candidate is brought into contact (i.e., touched), the selected alphabetical character candidate is confirmed. For example, when "'E'" of full-size upper-case character is to be confirmed, as shown in FIG. 16(b), the fingertip 60 is moved horizontally to the display region (the second display region) where "'E'" is displayed. After that, as shown in FIG. 16(c), the fingertip 60 is brought into contact with (i.e., caused to touch) the display region 566 where "'E'" is displayed. As a result, "'E'" of full-size upper-case character is confirmed. When the fingertip 60 exits the alphabetical character input key display region 533 and then enters the display region 566 where the selected alphabetical character candidate is displayed, the selected alphabetical character candidate is displayed continuously. That is, even when the distance from the display region to the fingertip 60 is changed (i.e., even when the fingertip is changed up and down), the alphabetical character candidate is not switched.

Here, when the selected alphabetical character candidate is to be confirmed, the fingertip 60 need not go into contact with the entirety of the display region (the second display region). That is, contact to a certain extent is sufficient.

Further, the display regions (the second display regions) for displaying alphabetical characters in the surroundings of the fingertip 60 have been provided in the number of five characters (e.g., 'A', 'B', 'C', 'D', 'E') (20 pieces). Instead, the regions may be provided in the number of more than five characters.

(A Case of Kana Character Input)

Figure 17:
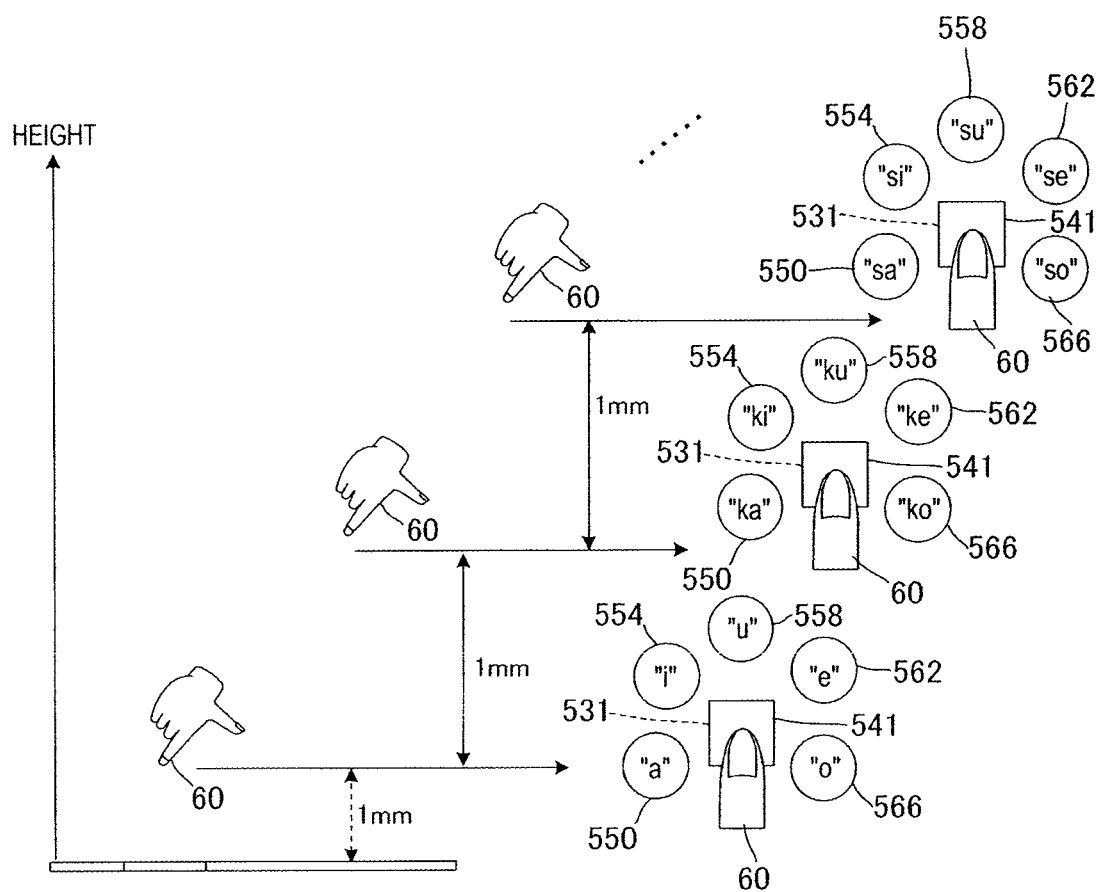
FIG. 17 Diagram schematically showing kana character input operation in an electronic device of FIG. 13
Figure 18:
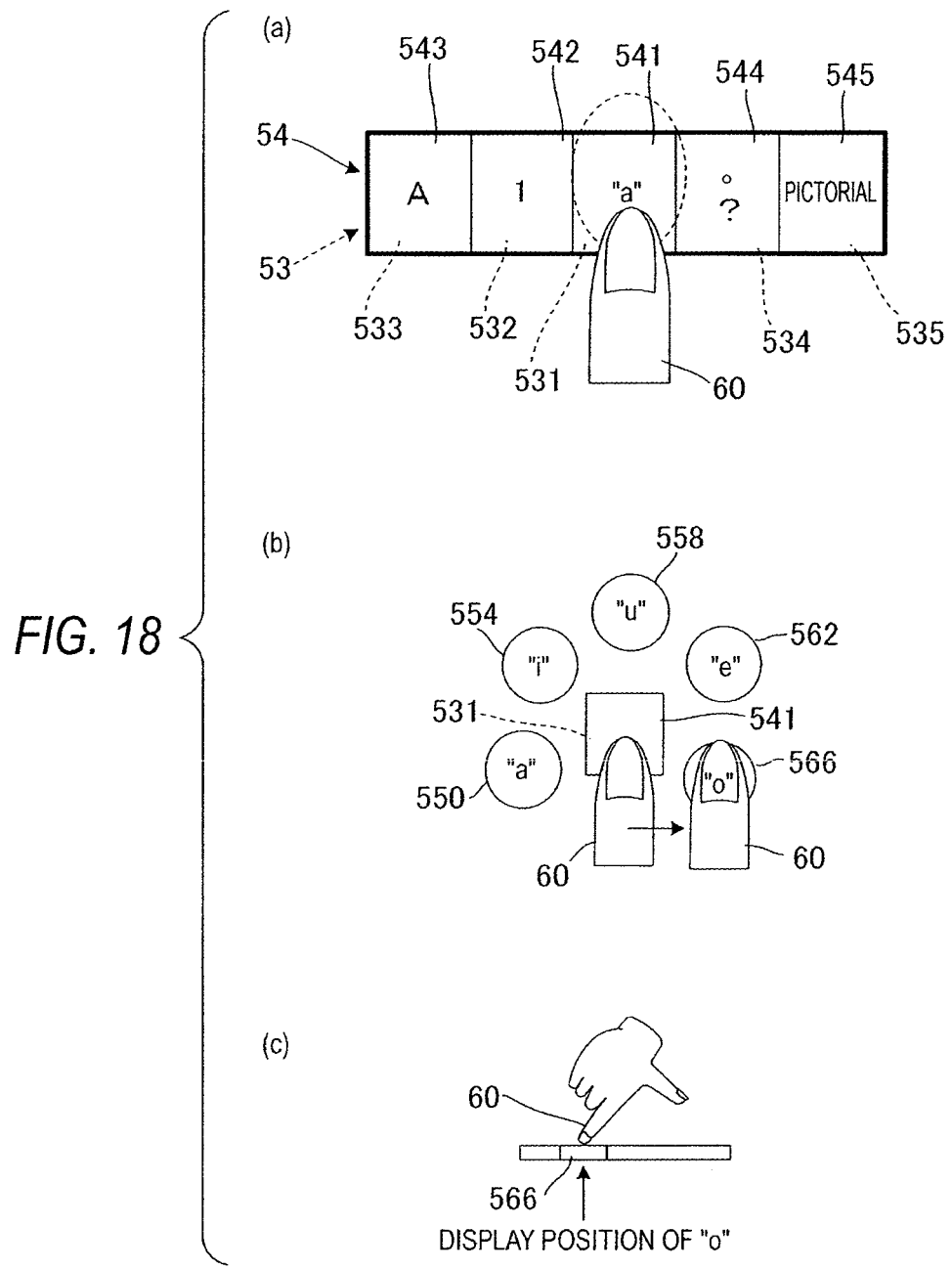
FIG. 18 FIG. 18(*a*) to FIG. 18(*c*): Diagrams schematically showing kana character input operation in an electronic device of FIG. 13

FIGS. 17 and 18(a) to 18(c) are diagrams schematically showing kana character input operation. As shown in FIGS. 17 and 18(a), when the fingertip 60 is brought close to the kana character input key display region (the predetermined display region and the first display region) 531 of the character kind selection key display region 53 (in this example, the kana character input key display region 531 is premised to be located in the center of the character kind selection key display region 53) to an extent of not going into contact (e.g., 1-mm immediately above the kana character input key display region 531), "a" (translators note: double quotes (") are used for indicating Japanese kana characters when kana characters are mentioned) is displayed in the display region 550 adjacent on the left of the kana character input key display region 531. Further, "i" is displayed in the display region 554 on the oblique upper left side, "u" is displayed in the display region 558 on the upper side, "e" is displayed in the display region 562 on the oblique upper right side, and "o" is displayed in the display region 566 adjacent on the right.

In a state that kana character candidates "a, i, u, e, o" are displayed, when the fingertip 60 is brought apart upward (e.g., brought apart upward by 1 mm), kana character candidates "ka, ki, ku, ke, ko" are displayed. From this position, when the fingertip 60 is further brought apart upward (e.g., brought apart upward by 1 mm), kana character candidates "sa, shi, su, se, so" are displayed. After that, when the fingertip 60 is continued to be brought apart upward, the displayed kana character candidates vary successively. Then, after kana character candidates "wa, wi, u, we, wo" are displayed, at last, kana character candidates "n, a, i, u, e" are displayed ("a, i, u, e" except for "n" are re-used).

In a state that kana character candidates "n, a, i, u, e, o" are displayed, when the fingertip 60 is moved in the opposite direction, that is, the fingertip 60 is brought close to the kana character input key display region (the predetermined display region and the first display region) 531, the displayed kana character candidates vary successively in the opposite direction. That is, the display varies in reverse order to the previous one. As such, when the fingertip 60 is brought apart or close relative to the kana character input key display region (the predetermined display region and the first display region) 531, the displayed kana character candidates vary successively and hence a desired kana character candidate can be selected.

Here, the distance between the fingertip 60 and the kana character input key display region 531 is the distance to the Touch panel unit 47. However, the distance to the Display unit 45 may be employed. Alternatively, the distance to the housing 41 may be employed.

Further, the order of the kana character candidates varying successively in response to the operation of the fingertip 60 is not changed.

Further, after the fingertip 60 is brought apart until kana character candidates "n, a, i, u, e" are displayed, when the fingertip 60 is brought apart further, circulation may be performed such that kana character candidates "a, i, u, e, o" are displayed again. However, the distance need be such that the fingertip 60 can be detected.

After a desired kana character candidate is selected, when the display region (the second display region) of the selected kana character candidate is brought into contact (i.e., touched), the selected kana character candidate is confirmed. For example, when "o" is to be confirmed, as shown in FIG. 18(b), the fingertip 60 is moved horizontally to the display region 566 where "o" is displayed. After that, as shown in FIG. 18(c), the fingertip 60 is brought into contact with (i.e., caused to touch) the display region 566 where "o" is displayed. As a result, "o" is confirmed. When the fingertip 60 exits the kana character input key display region 531 and then enters the display region (the second display region) where the selected kana character candidate is displayed, the selected kana character candidate is displayed continuously. That is, even when the distance from the display region to the fingertip 60 is changed (i.e., even when the fingertip is changed up and down), the kana character candidate is not switched.

Here, when the selected kana character candidate is to be confirmed, the fingertip 60 need not go into contact with the entirety of the display region (the second display region). That is, contact to a certain extent is sufficient.

Further, the display regions (the second display regions) for displaying kana characters in the surroundings of the fingertip 60 have been provided in the number of five characters (e.g., "a", "i", "u", "e", "o") (five pieces). Instead, the regions may be provided in the number of more than five characters.

Further, in addition to the above-mentioned hiragana (hirakana) notation, kata-kana notation and Roman character notation may be employed.

Further, display, selection, and confirmation can be performed similarly for Roman numerals and Chinese numerals.

Further, even for any language other than English, display, selection, and confirmation can be performed in the language.

Next, finger detection in the electronic device 40 according to the present embodiment is described below.

Figure 19:
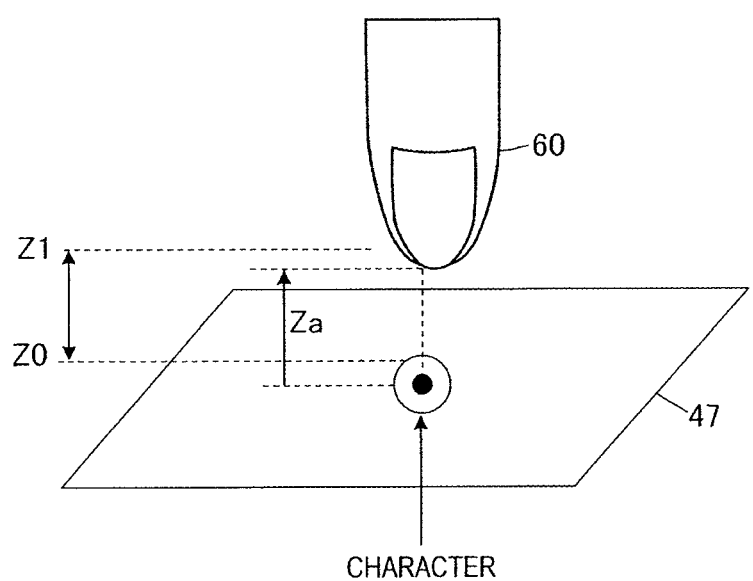
FIG. 19 Diagram showing positional relation between a fingertip and a Touch panel unit at the time of character input in an electronic device of FIG. 13
Figure 20:
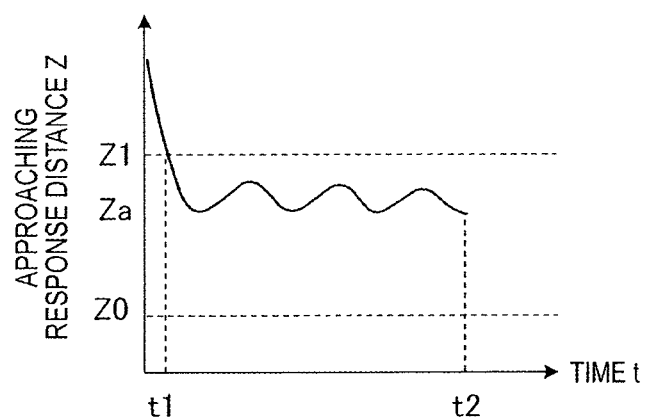
FIG. 20 Diagram showing a time-dependent change in the distance between a fingertip and a Touch panel unit at the time of character input in an electronic device of FIG. 13

FIG. 19 is a diagram showing the positional relation between the fingertip 60 and the Touch panel unit 47 at the time of character input. As shown in the figure, when the distance Za from the fingertip 60 to the Touch panel unit 47 falls between Z0 and Z1, the fingertip 60 is detected. In this case, with taking into consideration the blur of the fingertip 60, the distance is calculated as the average within a predetermined time. FIG. 20 is a diagram showing a time-dependent change in the distance between the fingertip 60 and the Touch panel unit 47 at the time of character input. As shown in the figure, between Z0 and Z1, the average of the distance is calculated between time t1 and time t2. When the average of the distance falls between Z0 and Z1, the fingertip 60 is detected.

Next, character input processing of the electronic device 40 according to the present embodiment is described below.

Figure 21:
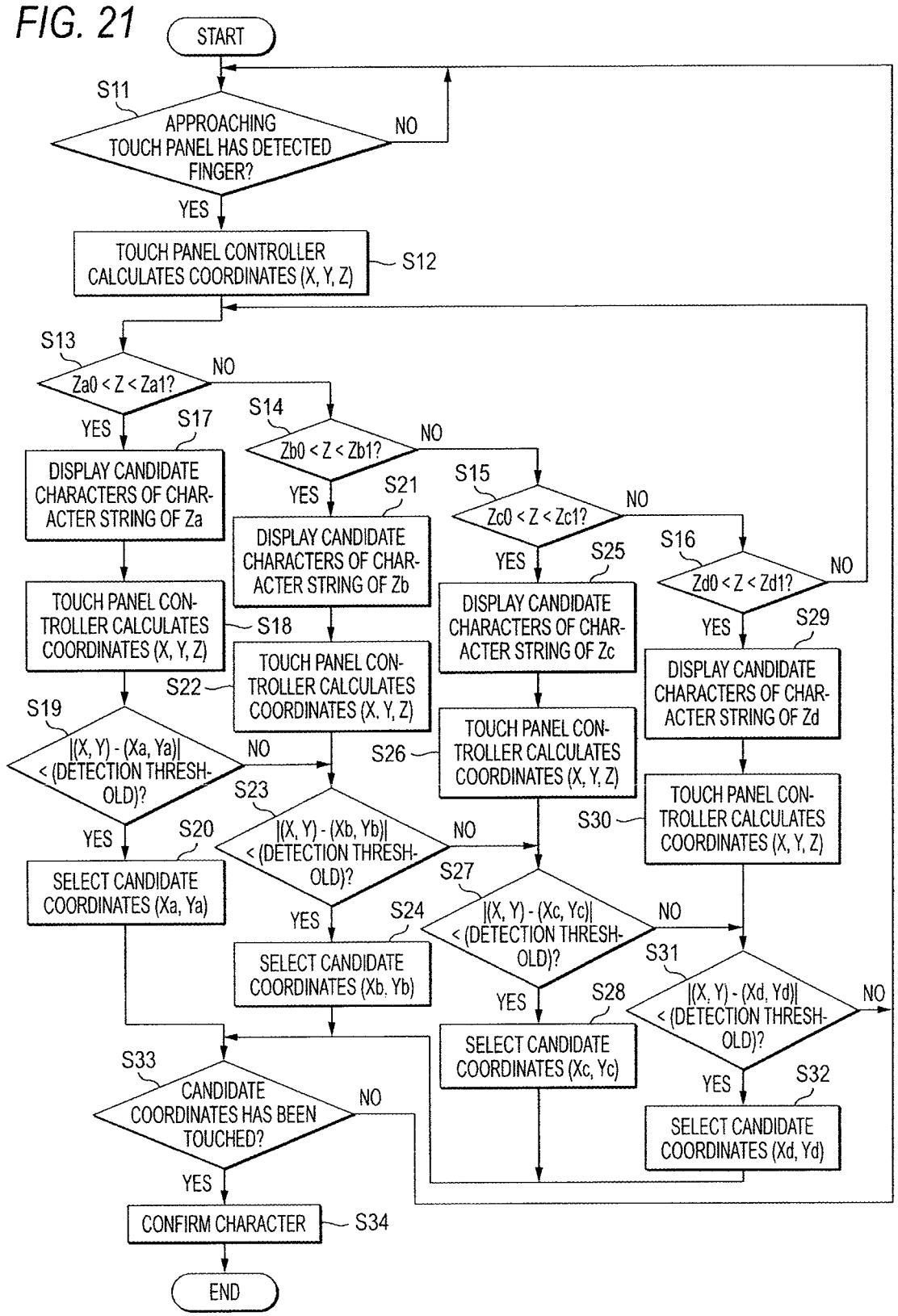
FIG. 21 Flow chart showing character input processing of an electronic device of FIG. 13

FIG. 21 is a flow chart showing the character input processing of the electronic device 40 according to the present embodiment. Here, the present processing is performed mainly by the device control unit 46 and the touch panel controller 48. In this figure, the touch panel controller 48 judges whether the Touch panel unit 47 has detected a finger (step S11). When a finger is not detected (i.e., when "No" is concluded in the judgment at step S11), the present judgment is repeated until a finger is detected. In contrast, when a finger has been detected (i.e., when "Yes" is concluded in the judgment at step S11), the coordinates (X,Y,Z) of the detected finger are calculated (step S12). Then, the calculated coordinates (X,Y,Z) are outputted as the coordinate signal to the device control unit 46.

The device control unit 46 compares the signal value of the Z-coordinate of the coordinate signal outputted from the touch panel controller 48. Here, comparison with four ranges of signal value is premised to be performed. A first range of signal value is "Za0<Z<Za1", a second range of signal value is "Zb0<Z<Zb1", a third range of signal value is "Zc0<Z<Zc1", and a fourth range of signal value is "Zd0<Z<Zd1". Further, the magnitude relations between these ranges are such that the first range of signal value<the second range of signal value<the third range of signal value<the fourth range of signal value. In the case of kana character input, the first range of signal value is a range in which "a, i, u, e, o" are to be selected. Further, the second range of signal value is a range in which "ka, ki, ku, ke, ko" are to be selected, the third range of signal value is a range in which "sa, shi, su, se, so" are to be selected, and the fourth range of signal value is a range in which "ta, chi, tsu, te, to" are to be selected. Since, the kana characters consist of 50 characters, for the remaining characters, up to a tenth range of signal value for the "wa" row becomes necessary. However, there is "n" in addition. When "i, u, e, o" is re-used, an eleventh range of signal value need be added.

When the device control unit 46 judges that the signal value of the Z-coordinate of the coordinate signal outputted from the touch panel controller 48 falls within the first signal value range "Za0<Z<Za1" (i.e., when "Yes" is concluded in the judgment at step S13), among the candidate characters ("a, i, u, e, o") of the character string for Za, "a" is displayed in the display region 550 adjacent on the left of the kana character input key display region 531 of the character kind selection key display region 53. Further, "i" is displayed in the display region 554 on the oblique upper left side, "u" is displayed in the display region 558 on the upper side, "e" is displayed in the display region 562 on the oblique upper right side, and "o" is displayed in the display region 566 adjacent on the right (step S17).

On the other hand, when judging that the signal value of the Z-coordinate of the coordinate signal outputted from the touch panel controller 48 falls within the second signal value range "Zb0<Z<Zb1" (i.e., when "Yes" is concluded in the judgment at step S14), the device control unit 46 displays the candidate characters ("ka, ki, ku, ke, ko") of the character string for Zb into each of the display regions 550, 554, 558, 562, 566 around the kana character input key display region 531 (step S21).

Further, when judging that the signal value of the Z-coordinate of the coordinate signal outputted from the touch panel controller 48 falls within the third signal value range "Zc0<Z<Zc1" (i.e., when "Yes" is concluded in the judgment at step S15), the device control unit 46 displays the candidate characters ("sa, shi, su, se, so") of the character string for Zc into each of the display regions 550, 554, 558, 562, 566 around the kana character input key display region 531 (step S25).

Further, when judging that the signal value of the Z-coordinate of the coordinate signal outputted from the touch panel controller 48 falls within the fourth signal value range "Zd0<Z<Zd1" (i.e., when "Yes" is concluded in the judgment at step S16), the device control unit 46 displays the candidate characters ("ta, chi, tsu, te, to") of the character string for Zd into each of the display regions 550, 554, 558, 562, 566 around the kana character input key display region 531 (step S29).

After the device control unit 46 displays the candidate characters of the character string for Za, the touch panel controller 48 re-calculates the coordinates (X,Y) of the finger (step S18). This processing is performed for judging which character candidate has been selected among the candidate characters of the character string for Za. After the re-calculation of the coordinates (X,Y) of the finger, it is judged whether the absolute value |(X,Y)−(Xa,Ya)| of the deviation from the candidate character coordinates is smaller than a detection threshold set up in advance, that is, whether the absolute value of the deviation from the candidate character coordinates |(X,Y)−(Xa,Ya)|<the detection threshold (step S19). In this judgment, when the absolute value |(X,Y)−(Xa,Ya)| of the deviation from the candidate character coordinates is smaller than the detection threshold, the candidate coordinates (Xa, Ya) are selected (step S20). For example, as shown in FIG. 18(b), when the fingertip 60 is premised to be located at a position corresponding to the position for the character "o" or its adjacent position, this position is selected as the candidate coordinates (Xa,Ya). At that time, (X,Y) are the coordinates of the second display region 566. When the absolute value |(X,Y)−(Xa,Ya)| of the deviation from the candidate character coordinates is greater than or equal to the detection threshold, the procedure goes to step S23.

On the other hand, when the touch panel controller 48 has re-calculated the coordinates (X,Y) of the finger (step S22), the device control unit 46 judges whether the absolute value |(X,Y)−(Xb,Yb)| of the deviation from the candidate character coordinates is smaller than the detection threshold, that is, whether the absolute value of the deviation from the candidate character coordinates |(X,Y)−(Xb,Yb)|<the detection threshold (step S23). In this judgment, when the absolute value |(X,Y)−(Xb,Yb)| of the deviation from the candidate character coordinates is smaller than the detection threshold, the candidate coordinates (Xb,Yb) are selected (step S24). When the absolute value |(X,Y)−(Xb,Yb)| of the deviation from the candidate character coordinates is greater than or equal to the detection threshold, the procedure goes to step S27.

Further, when the touch panel controller 48 has re-calculated the coordinates (X,Y) of the finger (step S26), the device control unit 46 judges whether the absolute value |(X,Y)−(Xc,Yc)| of the deviation from the candidate character coordinates is smaller than the detection threshold, that is, whether the absolute value of the deviation from the candidate character coordinates |(X,Y)−(Xc,Yc)|<the detection threshold (step S27). In this judgment, when the absolute value |(X,Y)−(Xc,Yc)| of the deviation from the candidate character coordinates is smaller than the detection threshold, the candidate coordinates (Xc,Yc) are selected (step S28). When the absolute value |(X,Y)−(Xc,Yc)| of the deviation from the candidate character coordinates is greater than or equal to the detection threshold, the procedure goes to step S31.

Further, when the touch panel controller 48 has re-calculated the coordinates (X,Y) of the finger (step S30), the device control unit 46 judges whether the absolute value |(X,Y)−(Xd,Yd)| of the deviation from the candidate character coordinates is smaller than the detection threshold, that is, whether the absolute value of the deviation from the candidate character coordinates |(X,Y)−(Xd,Yd)|<the detection threshold (step S31). In this judgment, when the absolute value |(X,Y)−(Xd,Yd)| of the deviation from the candidate character coordinates is smaller than the detection threshold, the candidate coordinates (Xd,Yd) are selected (step S32). When the absolute value |(X,Y)−(Xd,Yd)| of the deviation from the candidate character coordinates is greater than or equal to the detection threshold, the procedure returns to step S11.

After selecting any one of the candidate coordinates (Xa, Ya), the candidate coordinates (Xb,Yb), the candidate coordinates (Xc,Yc), and the candidate coordinates (Xd,Yd), the device control unit 46 judges whether the selected candidate coordinates have been touched (step S33). When the candidate coordinates are not touched, the procedure returns to step S11. When the candidate coordinates have been touched, the character of the candidate coordinates is confirmed (step S34). After the confirmation of the character, the present processing is terminated.

As such, according to the electronic device 40 according to the present embodiment, when the fingertip 60 is not in contact with the Touch panel unit 47, the distance between the fingertip 60 and a predetermined display region (the first display region; e.g., the alphabetical character input key display region 533) of the character kind selection key display region 53 is detected. Then, in response to an increase in the distance between the fingertip 60 and the predetermined display region of the character kind selection key display region 53, plural kinds of character candidates are displayed in a manner of being switched in predetermined order. Further, in response to a decrease in the distance between the fingertip 60 and the predetermined display region of the character kind selection key display region 53, plural kinds of character candidates are displayed in a manner of being switched in reverse order to the predetermined order adopted in the case of increasing distance. Then, after the characters are switched and displayed, when the coordinates of the fingertip 60 exit the predetermined display region of the character kind selection key display region 53, the operation is performed that the character switched and displayed is selected. Thus, a desired character can be selected by easy operation like the fingertip 60 is brought close to or apart from the predetermined display region of the character kind selection key display region 53 of the Touch panel unit 47 or alternatively brought outside the predetermined region so as to be moved to the second display region. Thus, operability improvement in character selection is achieved.

Here, the electronic device 40 according to the present embodiment has been a portable wireless device referred to as a smart phone, however, is not limited to an electronic device of this kind. For example, an electronic device of floor-standing type such as an ATM (Automated Teller Machine) may be employed.

Further, in the electronic device 40 according to the present embodiment, the program describing the processing shown in the flow chart of FIG. 21 has been stored in the ROM. However, the program may be stored in a storage medium such as a magnetic disc, an optical disc, a magneto-optical disc, and a flash memory and then distributed. Alternatively, the program may be saved in a server (not shown) on a network such as the Internet and then downloaded through a telecommunication line.

Embodiment 3

Figure 22:
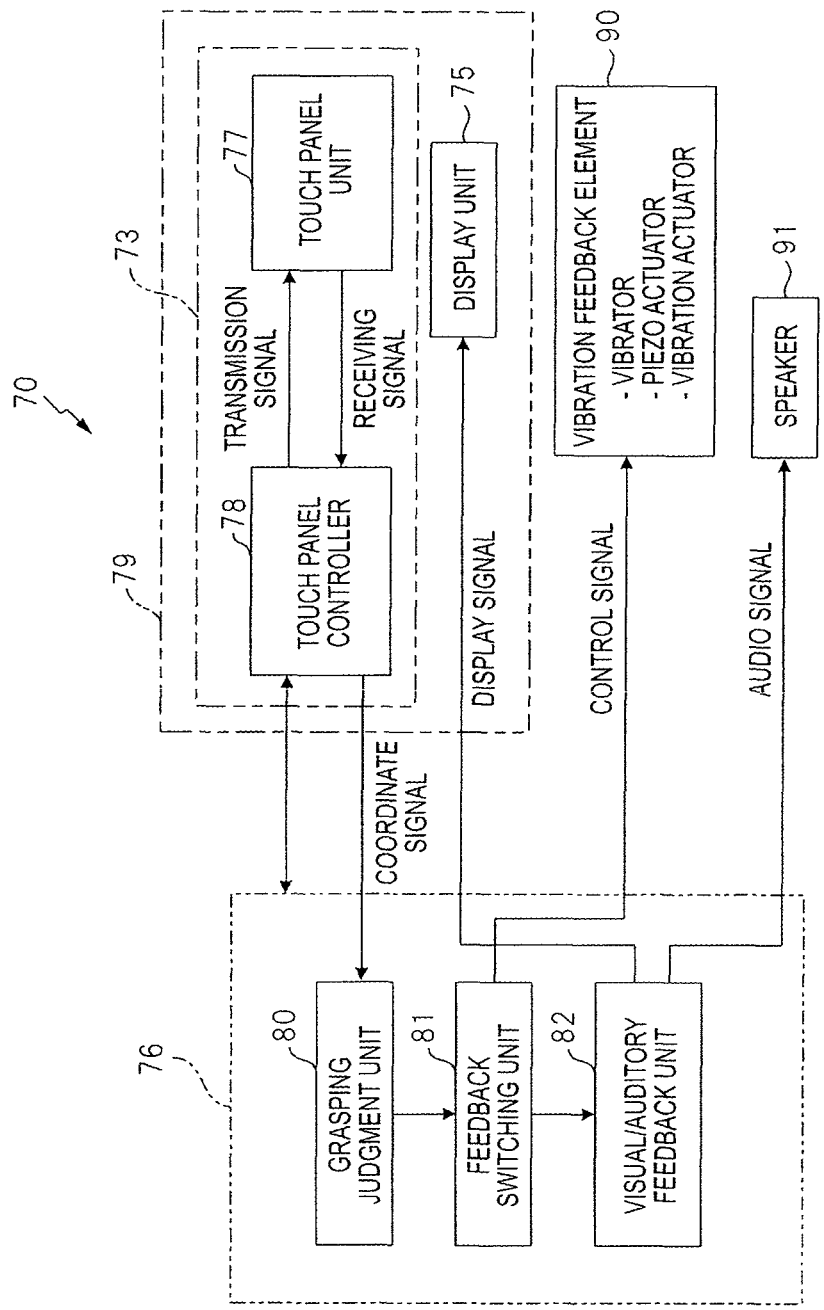
FIG. 22 Block diagram showing an outline configuration of an electronic device according to Embodiment 3 of the present invention FIG. 23 Diagram showing a situation that an electronic device of FIG. 22 is held and operated with the hand FIG. 24 Diagram showing a situation that an electronic device of FIG. 22 is placed and operated on a desk FIG. 25 Sectional view showing an example of arrangement of a vibration feedback element in an electronic device of FIG. 22

FIG. 22 is a block diagram showing an outline configuration of an electronic device according to Embodiment 3 of the present invention. Here, the electronic device 70 according to the present embodiment is a portable wireless device referred to as a smart phone similar to the electronic device 1 according to Embodiment 1 and the electronic device 40 according to Embodiment 2 described above. Thus, the outline is similar to these and hence an outline diagram is omitted. Then, FIG. 1 is referred to when necessary in description.

In FIG. 22, the electronic device 70 according to the present embodiment includes a touch panel module 73, a Display unit 75, a device control unit 76, a vibration feedback element 90, and a speaker 91. The touch panel module 73 includes a Touch panel unit 77 and a touch panel controller 78 for exchanging a transmission signal and a receiving signal with the Touch panel unit 77. The Display unit 75 includes an LCD, an organic EL, or an electronic paper and thereby performs display for the purpose of operation of the electronic device 70 and display of an image or the like. The device control unit 76 performs processing (i.e., exchange of a coordinate signal with the touch panel controller 78 and provision of a display signal to the Display unit 75) similar to that of the device control unit 9 of the electronic device 1 according to Embodiment 1 described above. Further, in addition to this basic processing, the device control unit 76 performs also the processing of performing display, vibration, and sound emission for causing the user to recognize that the user has operated the electronic device 70. As means for realizing this new processing, the device control unit 76 includes a Grasping judgment unit 80, a Feedback switching unit 81, and a visual/auditory feedback unit 82.

Here, the Touch panel unit 77 corresponds to a sensor. Further, the vibration feedback element 90 corresponds to a vibration unit. Further, the Display unit 75 and the visual/auditory feedback unit 82 constitute a display device. Further, the speaker 91 and the visual/auditory feedback unit 82 constitute a sound emission unit. Further, the device control unit 76 and the touch panel controller 78 are constructed from a CPU, a ROM, a RAM, and an interface circuit. The ROM stores a program for controlling the CPU. The RAM is used in the operation of the CPU.

On the basis of the coordinate signal obtained by the approaching detection by the touch panel module 73, the Grasping judgment unit 80 judges whether the electronic device 70 is grasped by the user. In this case, when the user grasps the electronic device 70, a coordinate signal of the peripheral edge part of the Touch panel unit 77 is outputted from the touch panel controller 78. When receiving this coordinate signal, the Grasping judgment unit 80 judges that the electronic device 70 is grasped by the user. In a case that the electronic device 70 is judged as being grasped by the user, when contact is detected in the Touch panel unit 77, the Grasping judgment unit 80 outputs a switching signal for using the vibration feedback element 90, to the Feedback switching unit 81. Further, in a case that the electronic device 70 is judged as not being grasped by the user, when contact is detected in the Touch panel unit 77, the Grasping judgment unit 80 outputs a switching signal for using the Display unit 75 and the speaker 91, to the Feedback switching unit 81.

Here, the contact in the Touch panel unit 77 indicates contact performed when an icon or the like on the touch panel is selected.

As such, when the electronic device 70 is grasped by the user, the Grasping judgment unit 80 selects the vibration feedback element 90. Then, in this state, when an icon or the like on the touch panel is selected, the Grasping judgment unit 80 starts the vibration feedback element 90. Further, when the electronic device 70 is not grasped by the user, the Grasping judgment unit 80 selects the Display unit 75 and the speaker 91. Then, in this state, when an icon or the like on the touch panel is selected, the Grasping judgment unit 80 causes the Display unit 75 to perform predetermined display and causes the speaker 91 to emit predetermined sound.

When a switching signal for using the vibration feedback element 90 is inputted, the Feedback switching unit 81 continues, for a predetermined time, outputting a control signal for causing the vibration feedback element 90 to operate. Further, when a switching signal for using the Display unit 75 and the speaker 91 is inputted, the Feedback switching unit 81 outputs the switching signal to the visual/auditory feedback unit 82. For example, the vibration feedback element 90 is composed of a vibrator, a piezo actuator, or a vibration actuator and vibrates during the time that the control signal is outputted from the Feedback switching unit 81. When the switching signal outputted from the Feedback switching unit 81 is inputted, the visual/auditory feedback unit 82 continues, for a predetermined time, outputting a display signal for causing the Display unit 75 to perform predetermined display and continues, for a predetermined time, outputting an audio signal for causing the speaker 91 to output predetermined sound.

Figure 23:
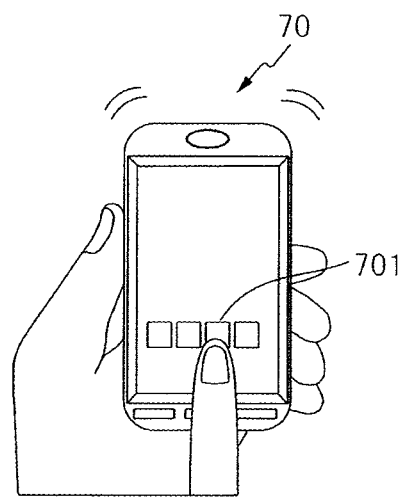

As such, when the user grasps the electronic device 70 and the Touch panel unit 77 is brought into contact, the vibration feedback element 90 vibrates. This vibration allows the user to recognize that operation has been performed. FIG. 23 is a diagram showing a situation that the electronic device 70 is held with the hand and operated by the user. As shown in the figure, when the icon 701 is touched, vibration is generated.

Figure 24:
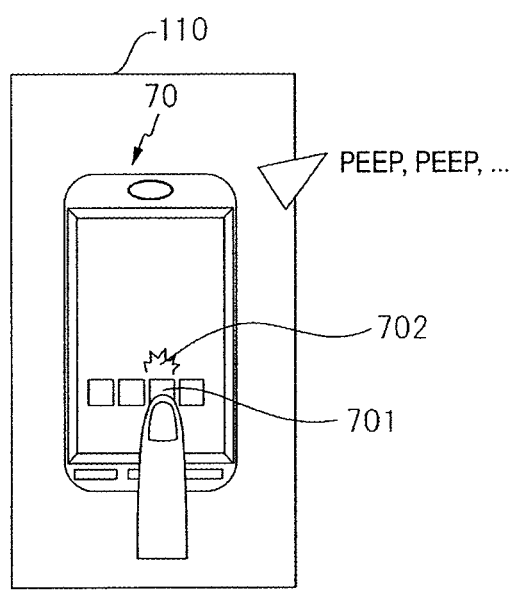

On the other hand, in a state that the electronic device 70 is placed on a desk or the like, when the Touch panel unit 77 is brought into contact, the vibration feedback element 90 does not vibrate. Instead, predetermined display is performed by the Display unit 75 and predetermined sound is emitted from the speaker 91. The predetermined display and the predetermined sound emission allows the user to recognize that the operation is performed in a state that the electronic device 70 is placed on a desk or the like. FIG. 24 is a diagram showing a situation that the electronic device 70 is placed and operated on a desk 110. As shown in the figure, When the icon 701 is touched, predetermined display 702 is displayed in the Display unit 75 and predetermined sound (peep, peep, . . . ) is emitted from the speaker 91.

Figure 25:
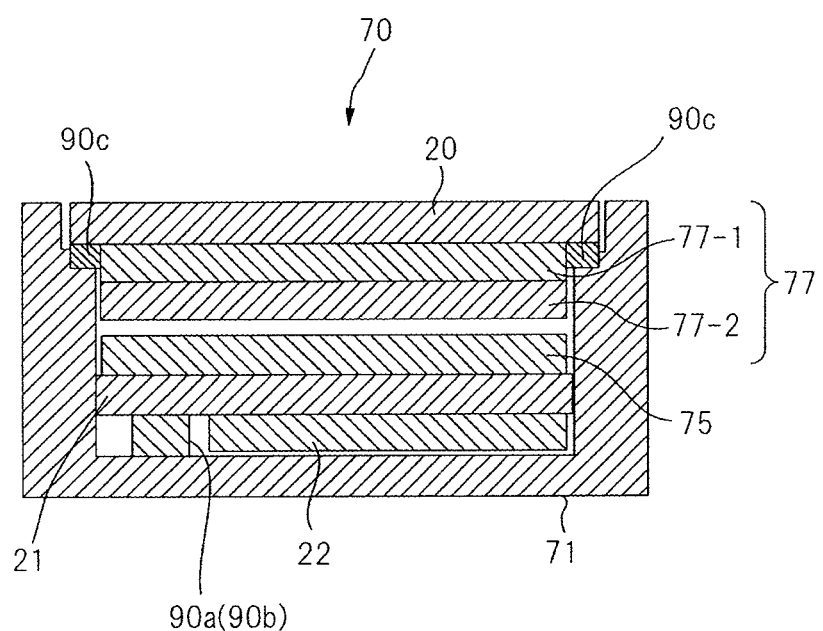

FIG. 25 is a sectional view showing an example of arrangement of the vibration feedback element 90 in the electronic device 70 according to the present embodiment. Here, the sectional view shown in this figure shows the cross section of a center portion of the touch panel unit 79 similarly to the sectional view of the touch panel unit 7 of the electronic device 1 of Embodiment 1 shown in FIG. 3. The Touch panel unit 77 of the touch panel unit 79 includes a receiving sensor panel 77-1 and a transmission sensor panel 77-2. A cover panel 20 fabricated from glass material is arranged immediately above the receiving sensor panel 77-1 and the Display unit 75 is arranged immediately under the transmission sensor panel 77-2. Further, a Back light unit 21 is arranged immediately under the Display unit 75 and a Battery unit 22 is arranged immediately under the Back light unit 21. A vibrator 90*a* (or a vibration actuator 90*b*) serving as the vibration feedback element 90 is arranged adjacent to the Battery unit 22 and a piezo actuator 90*c* is arranged immediately under the peripheral edge part of the cover panel 20. These members are accommodated in a housing 71. Here, the arrangement of the vibrator 90*a* (the vibration actuator 90*b*) and the piezo actuator 90*c* given above is merely exemplary. Further, all of the vibrator 90*a*, the vibration actuator 90*b*, and the piezo actuator 90*c* may be arranged. Alternatively, any one of these may be arranged.

Figure 26:
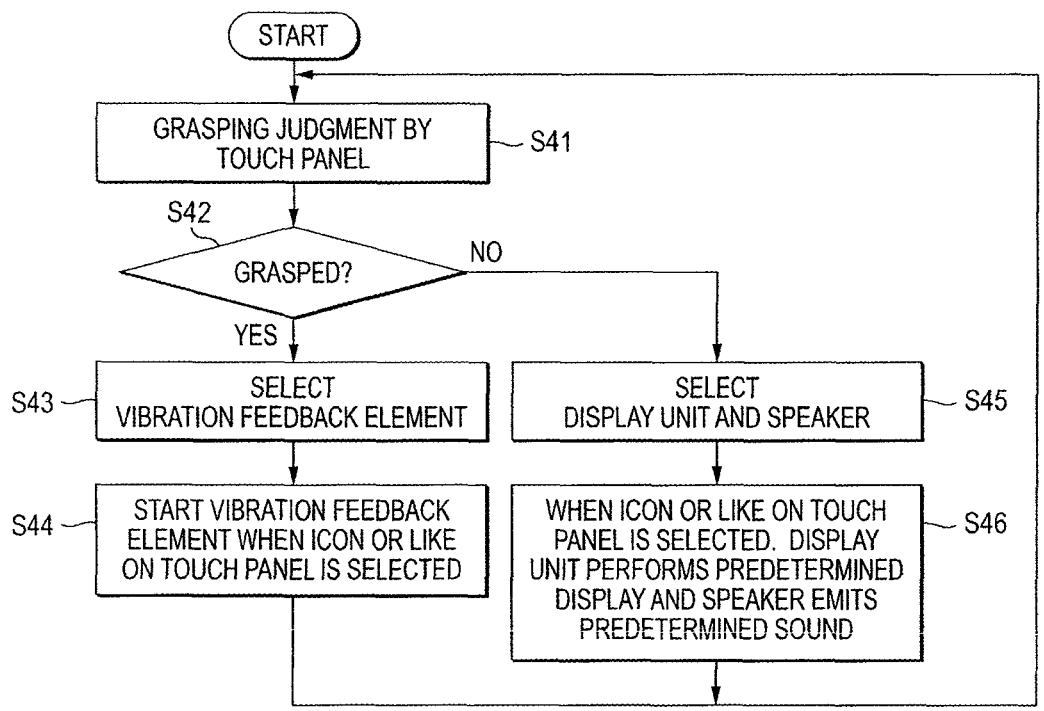
FIG. 26 Flow chart showing operation notification processing of an electronic device of FIG. 22

FIG. 26 is a flow chart showing the operation notification processing of the electronic device 70 according to the present embodiment. In this figure, the Grasping judgment unit 80 performs grasping judgment on the basis of approaching detection by the touch panel module 73 (step S41) and then judges whether the electronic device 70 is grasped by the user (step S42). In this judgment, when the electronic device 70 is judged as being grasped by the user (i.e., when "YES" is concluded in the judgment at step S42), the vibration feedback element 90 is selected (step S43). Then, when an icon or the like on the touch panel is selected, the Grasping judgment unit 80 outputs to the Feedback switching unit 81 a switching signal for using the vibration feedback element 90 and thereby starts the vibration feedback element 90 (step S44).

On the other hand, in the judgment at step S42, when the electronic device 70 is judged as not being grasped by the user (i.e., when "NO" is concluded in the judgment at step S42), the Grasping judgment unit 80 selects the Display unit 75 and the speaker 91 (step S45). Then, when an icon or the like on the touch panel is selected, the Grasping judgment unit 80 outputs to the Feedback switching unit 81 a switching signal for using the Display unit 75 and the speaker 91 and thereby causes the Display unit 75 to perform the predetermined display and causes the speaker 91 to emit the predetermined sound (step S46).

As such, according to the electronic device 70 according to the present embodiment, when the user grasps the electronic device 70 and goes into contact with the Touch panel unit 77, the vibration feedback element 90 is caused to vibrate. Further, in a state that the electronic device 70 is placed on a desk or the like, when the Touch panel unit 77 is brought into contact, the vibration feedback element 90 is not caused to vibrate, instead, the Display unit 75 is caused to perform the predetermined display and the speaker 91 is caused to emit the predetermined sound. Thus, the user can recognize operation performed in a state that the electronic device 70 is held with the hand as well as operation performed in a state of being placed on a desk or the like. In particular, since the vibration, the display, and the sound emission are performed continuously for a predetermined time, reliable recognition is achieved.

Here, in the electronic device 70 according to the present embodiment, in case of operation in a state of being placed on a desk or the like, both of the predetermined display and the predetermined sound emission have been performed. However, any one alone of these may be performed. Further, the vibration, the display, and the sound emission have been performed continuously for a predetermined time. However, this continuation for a predetermined time is not indispensable. However, it cannot be overemphasized that continuation for a predetermined time improves the recognition rate. Further, the time of continuation may be the same for all of the vibration, the display, and the sound emission. Alternatively, the time of continuation may be different for each of these. In particular, a longer display time improves the visibility.

Further, in the electronic device 70 according to the present embodiment, the program describing the processing shown in the flow chart of FIG. 26 has been stored in the ROM. However, the program may be stored in a storage medium such as a magnetic disc, an optical disc, a magneto-optical disc, and a flash memory and then distributed. Alternatively, the program may be saved in a server (not shown) on a network such as the Internet and then downloaded through a telecommunication line.

Embodiment 4

Figure 27:
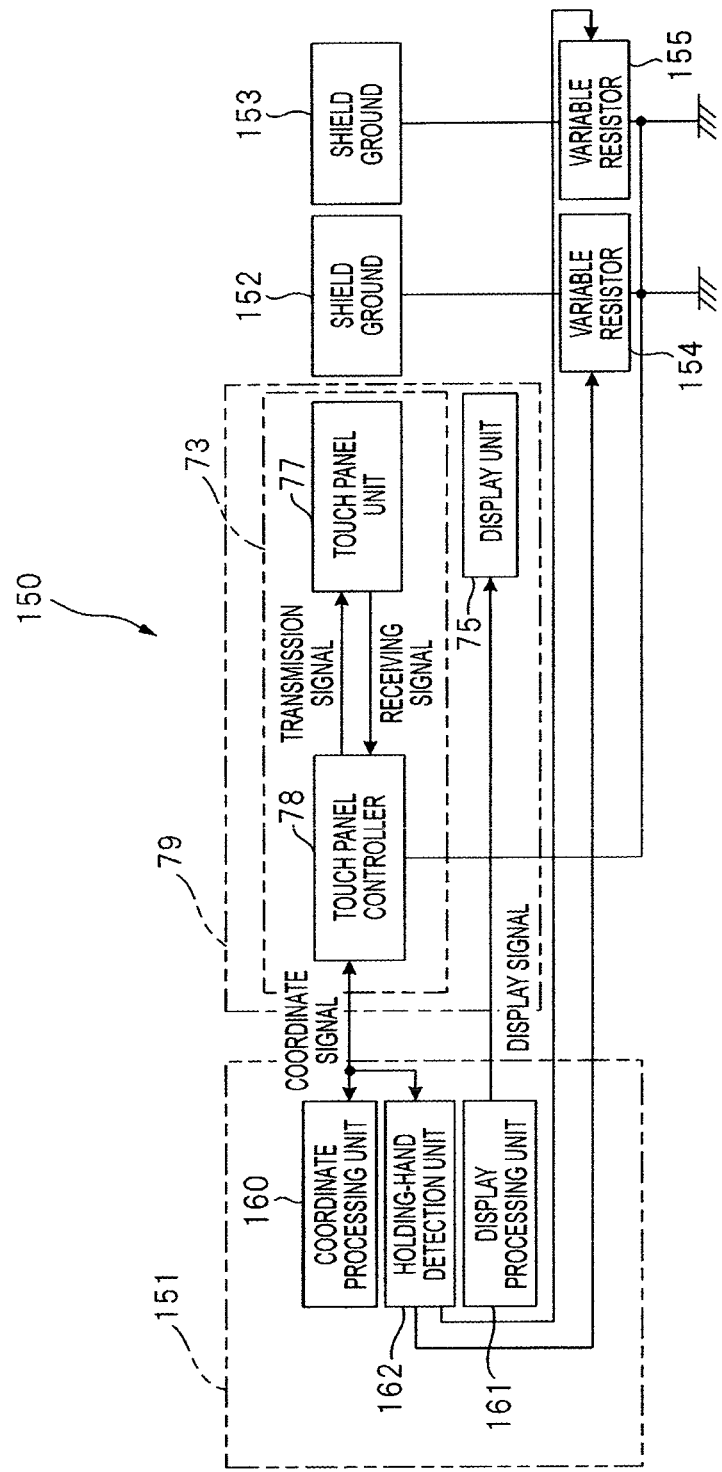
FIG. 27 Block diagram showing an outline configuration of an electronic device according to Embodiment 4 of the present invention FIG. 28 Perspective view showing the fixing positions of two shield grounds and connection between the two shield grounds and variable resistors in an electronic device of FIG. 27

FIG. 27 is a block diagram showing an outline configuration of an electronic device according to Embodiment 4 of the present invention. Here, the electronic device 150 according to the present embodiment is a portable wireless device referred to as a smart phone similar to the electronic device 1 according to Embodiment 1, the electronic device 40 according to Embodiment 2, and the electronic device 70 according to Embodiment 3 described above. Thus, the outline is similar to these and hence an outline diagram is omitted. Then, FIG. 1 is referred to when necessary in description.

In FIG. 27, the electronic device 150 according to the present embodiment includes a touch panel module 73, a Display unit 75, a device control unit 151, shield grounds 152 and 153, and variable resistors 154 and 155. The touch panel module 73 includes a Touch panel unit (a touch panel) 77 and a touch panel controller 78 for exchanging a transmission signal and a receiving signal with the Touch panel unit 77. The Display unit (a display device) 75 includes an LCD, an organic EL, or an electronic paper and thereby performs display for the purpose of operation of the electronic device 150 and display of an image or the like.

The device control unit 151 performs processing (i.e., exchange of a coordinate signal with the touch panel controller 78 and provision of a display signal to the Display unit 75) similar to that of the device control unit 9 of the electronic device 1 according to Embodiment 1 described above. Further, in addition to this basic processing, the device control unit 151 performs the processing of suppressing, by way of varying the impedances of the shield grounds 152 and 153, malfunction that could be caused by the hand at the time of hovering operation. As means for executing such processing, the device control unit 151 includes: a coordinate processing unit 160 for exchanging a coordinate signal with the touch panel controller 78 and then performing coordinate processing; a display processing unit 161 for providing a display signal to the Display unit 75; and a holding hand detection unit 162 for detecting the user's holding hand for the electronic device 150 and then switching the resistances of the variable resistors 154 and 155.

Figure 28:
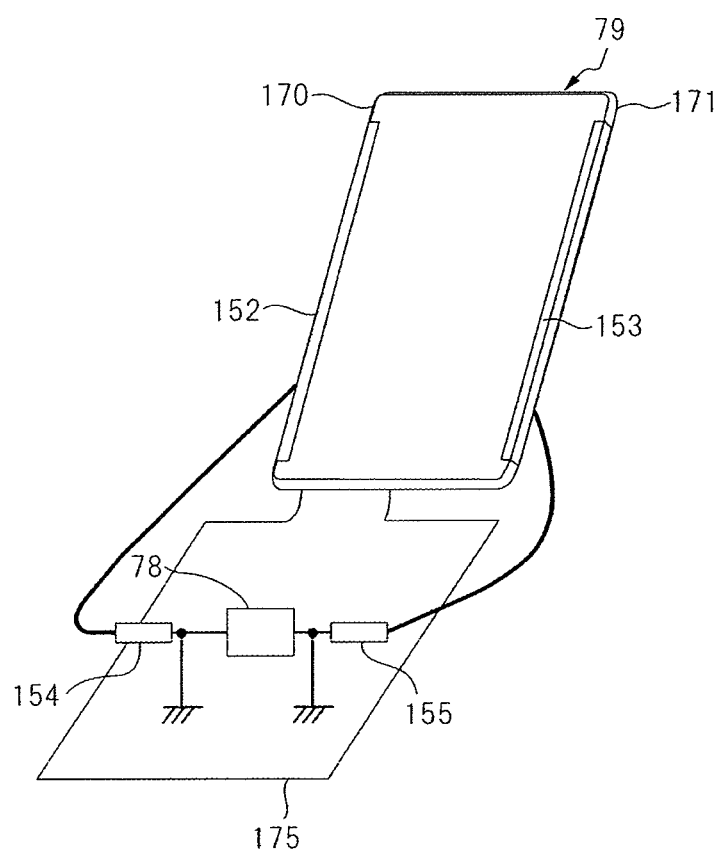

The shield grounds 152 and 153 are provided on two opposite sides in the Touch panel unit 77. FIG. 28 is a perspective view showing the fixing positions of the shield grounds 152 and 153 and connection between the shield grounds 152 and 153 and the variable resistors 154 and 155. In this figure, the shield grounds 152 and 153 are provided on opposite two sides 170 and 171 in the touch panel unit 79. That is, the shield ground (the first conductive member) 152 is provided on one (a first side) 170 of the two sides in the longitudinal direction of the touch panel unit 79 formed in a rectangular shape. Further, the shield ground (a second conductive member) 153 is provided on the other (a second side) 171 of the two sides.

The shield ground 152 is connected to one end of the variable resistor (the first variable resistor) 154 and the shield ground 153 is connected to one end of the variable resistor (the second variable resistor) 155. Each of the other ends of the variable resistors 154 and 155 is electrically connected to a predetermined potential. In the present embodiment, the predetermined potential is set to be a potential (a ground potential) in a ground pattern on the circuit board 175. When each of the other ends of the variable resistors 154 and 155 is grounded to the same ground as the touch panel controller 78, stabilization of operation is achieved.

Figure 29:
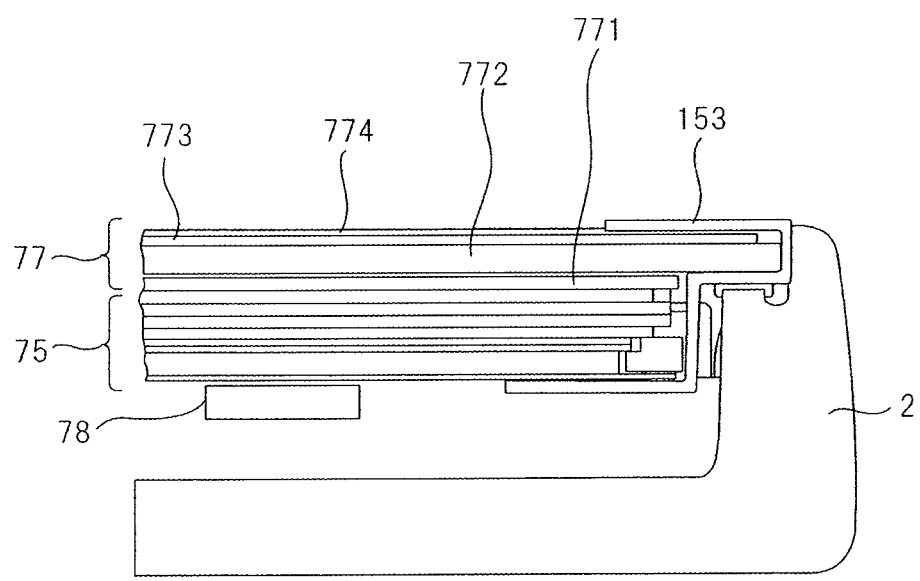
FIG. 29 Diagram showing a cross section of a part where a shield ground is arranged in a housing of an electronic device of FIG. 27

FIG. 29 is a diagram showing the cross section of a part where the shield ground 153 is arranged in the housing 2. In this figure, the shield ground 153 has a cross section of a shape pinching the peripheral edge parts of the Display unit 75 and the Touch panel unit 77 from up and down. The shield ground 153 is arranged in the inside of the housing 2 in order that a person's finger should not touch directly. Similarly to the shield ground 153, the shield ground 152 also has a cross section of a shape pinching the peripheral edge parts of the Display unit 75 and the Touch panel unit 77 from up and down and is arranged in the inside of the housing 2.

When the shield grounds 152 and 153 are provided in the Touch panel unit 77, the parts where these are provided and their peripheries can be shielded individually. Then, the degree of the shielding in the parts where the shield grounds 152 and 153 are provided and the peripheries of these parts varies depending on the resistances of the variable resistors 154 and 155. Then, the degree of the shielding increases with decreasing resistance of each of the variable resistors 154 and 155 so that the sensitivity becomes small in each of the parts where the shield grounds 152 and 153 are provided and the peripheries of these parts. Thus, when the part of the Touch panel unit 77 where the shield grounds 152 and 153 are provided is grasped with the hand, the resistance of each of the variable resistors 154 and 155 is reduced so that the influence from the hand can be suppressed.

Here, in FIG. 29, the touch panel controller 78 is arranged immediately under the Display unit 75. The Touch panel unit 77 includes an approaching touch panel sensor 771, a protection glass 772, adhesive 773, and a scattering prevention film 774.

The device control unit 151 and the touch panel controller 78 are constructed from a CPU, a ROM, a RAM, and an interface circuit. The ROM stores a program for controlling the CPU. The RAM is used in the operation of the CPU.

Returning to FIG. 27, on the basis of the coordinate signal obtained by the approaching detection by the touch panel module 73, the holding-hand detection unit 162 judges whether the electronic device 150 is grasped by the user. In this case, when the user grasps the electronic device 150, a coordinate signal of the peripheral edge part of the Touch panel unit 77 is outputted from the touch panel controller 78. Then, the holding hand detection unit 162 receives this coordinate signal and thereby judges that the electronic device 150 is grasped by the user.

FIG. 30 is a diagram showing an example of the method of detecting a holding-hand state. In this figure, detection of a holding-hand state can be achieved by using an acceleration sensor in place of the approaching detection by the touch panel module 73. The approaching detection by the touch panel module 73 is based on a capacitance change. When a capacitance change caused by contact of the finger occurs symmetrically in left and right, two-hand operation is concluded. When the capacitance on the left side is greater than the capacitance on the right side, left hand operation is concluded. When the capacitance on the right side is greater than the capacitance on the left side, right hand operation is concluded. When no capacitance change occurs in left and right, being placed is concluded.

When judging that the electronic device 150 is grasped by the user, the holding hand detection unit 162 sets up the resistances of the variable resistors 154 and 155. FIG. 31 is a diagram showing an example of the holding-hand state (i.e., the grasping state) of the electronic device 150 and the resistances of the variable resistors 154 and 155. In this figure, in the case of two-hand operation, the variable resistors 154 and 155 are individually set to be 1 MΩ. In the case of left hand operation, the variable resistor 154 is set to be 0Ω and the variable resistor 155 is set to be 1 MΩ. In the case of right hand operation, the variable resistor 154 is set to be 1 MΩ and the variable resistor 155 is set to be 0Ω. In the case of being placed (when the electronic device 150 is not grasped and is placed on a desk or the like), the variable resistors 154 and 155 are set to be a high impedance.

When the resistances of the variable resistors 154 and 155 are set small, the shield grounds 152 and 153 become close to the ground level. Thus, the shielding effect increases and hence the response of the Touch panel unit 77 becomes low. That is, when the resistances of the variable resistors 154 and 155 are set small, the shielding effect by the shield grounds 152 and 153 increases and hence the hovering distance (a distance between the Touch panel unit 77 and the finger) becomes short.

In the case of left hand operation, since the left thumb affects the Touch panel unit 77, the resistance of the variable resistor 154 on the left side is set small (e.g., 0Ω) in order that the hovering distance of the left part of the Touch panel unit 77 is suppressed. That is, the response of the left part of the Touch panel unit 77 is lowered. In the variable resistor 155 on the right side, the resistance is set to be middle (e.g., 1 MΩ) in order that operation with the left thumb tip part is allowed to a certain extent. In the case of right hand operation, since the right thumb affects the Touch panel unit 77, the resistance of the variable resistor 155 on the right side is set small (e.g., 0Ω) in order that the hovering distance of the right part of the Touch panel unit 77 is suppressed. That is, the response of the right part of the Touch panel unit 77 is lowered. In the variable resistor 154 on the left side, the resistance is set to be middle (e.g., 1 MΩ) in order that operation with the right thumb tip part is allowed to a certain extent. In the case of two-hand operation, the resistances of the variable resistors 154 and 155 on both sides are individually set to be middle (e.g., 1 MΩ) so that the influence caused by grasping of the electronic device 150 is avoided. In the case of being placed, no influence is caused by the finger grasping the electronic device 150. Thus, the resistances of the variable resistors 154 and 155 on both sides are individually set to be a high impedance so that the hovering distance is increased in the shield grounds 152 and 153 and their periphery.

Preferably, the resistances of the variable resistors 154 and 155 in various modes of holding hand are set up as follows.

(1) In a predetermined operation state, the resistance of the variable resistor 154 is set to be a first resistance and the resistance of the variable resistor 155 is set to be a second resistance greater than the first resistance.

This is an operation state that the electronic device 150 is grasped with the right hand and then the Touch panel unit 77 is operated with the thumb or the like of the right hand or alternatively an operation state that the electronic device 150 is grasped with the left hand and then the Touch panel unit 77 is operated with the thumb or the like of the left hand. The first resistance is "small" and may be 0Ω. The second resistance is "medium" and is, for example, 1 MΩ.

(2) The predetermined operation state is adopted as a first operation state. Then, in a second operation state, the resistance of the variable resistor 154 is set to be the second resistance and the resistance of the variable resistor 155 is set to be the first resistance.

In response to switching of the operation state between the first operation state and the second operation state, the resistances of the variable resistor 154 and the variable resistor 155 are changed and hence the influence to the Touch panel unit 77 can be suppressed in whichever of the first and the second operation states. Here, at the time that the resistance of the variable resistor 154 is set to be the second resistance, slight deviation from the second resistance is allowed. Further, at the time that the resistance of the variable resistor 155 is set to be the first resistance, slight deviation from the first resistance is allowed.

(3) The predetermined operation state is adopted as a first operation state. Then, in a second operation state, the resistance of the variable resistor 154 is set to be a third resistance and the resistance of the variable resistor 155 is set to be a fourth resistance smaller than the third resistance.

The third resistance is "medium" and is, for example, 1.1 MΩ. Here, the second resistance and the third resistance may be substantially the same resistance. Further, the fourth resistance is "small" and is, for example, 0.1 MΩ. Here, the first resistance and the fourth resistance may be substantially the same resistance.

(4) The predetermined operation state is adopted as a first operation state. Then, in a third operation state, the resistance of the variable resistor 154 and the resistance of the variable resistor 155 are set to be the second resistance.

This is an operation state that the electronic device 150 is grasped with the right hand and then the Touch panel unit 77 is operated with the left hand or alternatively the reverse operation state to this.

(5) This is a variation of (4). The predetermined operation state is adopted as a first operation state. Then, in a third operation state, the resistance of the variable resistor 154 is set to be a fifth resistance and the resistance of the variable resistor 155 is set to be a sixth resistance that is a predetermined magnification of the fifth resistance.

The fifth resistance is, for example, 0.9 MΩ and the sixth resistance is, for example, 0.98 MΩ. Thus, these are substantially the same as the second resistance. However, a slight difference is expected and, obviously, the fifth resistance and the sixth resistance are individually greater than the first resistance. For example, the predetermined magnification is a value between 0.5 and 2.

(6) In a fourth operation state, the resistance of the variable resistor 154 is set to be a seventh resistance greater than at least the second resistance and the resistance of the variable resistor 155 is set to be the seventh resistance.

This is for a placed state. The seventh resistance includes also "large" which is a high impedance (blocking).

The magnitude relations between the second resistance, the third resistance, the fourth resistance, the fifth resistance, the sixth resistance, and the seventh resistance described above are such that the second resistance<the seventh resistance, the third resistance<the seventh resistance, the fourth resistance<the seventh resistance, the fifth resistance<the seventh resistance, and the sixth resistance<the seventh resistance.

A slight deviation from the seventh resistance is allowed as long as the impedance is as high as being recognizable as a high impedance.

(7) In a fourth operation state, the resistance of the variable resistor 154 is set to be the seventh resistance greater than at least the second resistance and the resistance of the variable resistor 155 is set to be an eighth resistance greater than at least the second resistance.

The seventh and the eighth resistances are "large" and are, for example, 10 GΩ. The magnitude relations between the second resistance, the third resistance, the fourth resistance, the fifth resistance, the sixth resistance, and the eighth resistance described above are such that the second resistance<the eighth resistance, the third resistance<the eighth resistance, the fourth resistance<the eighth resistance, the fifth resistance<the eighth resistance, and the sixth resistance<the eighth resistance.

Next, the operation of the electronic device 150 according to the present embodiment is described below.

Figure 32:
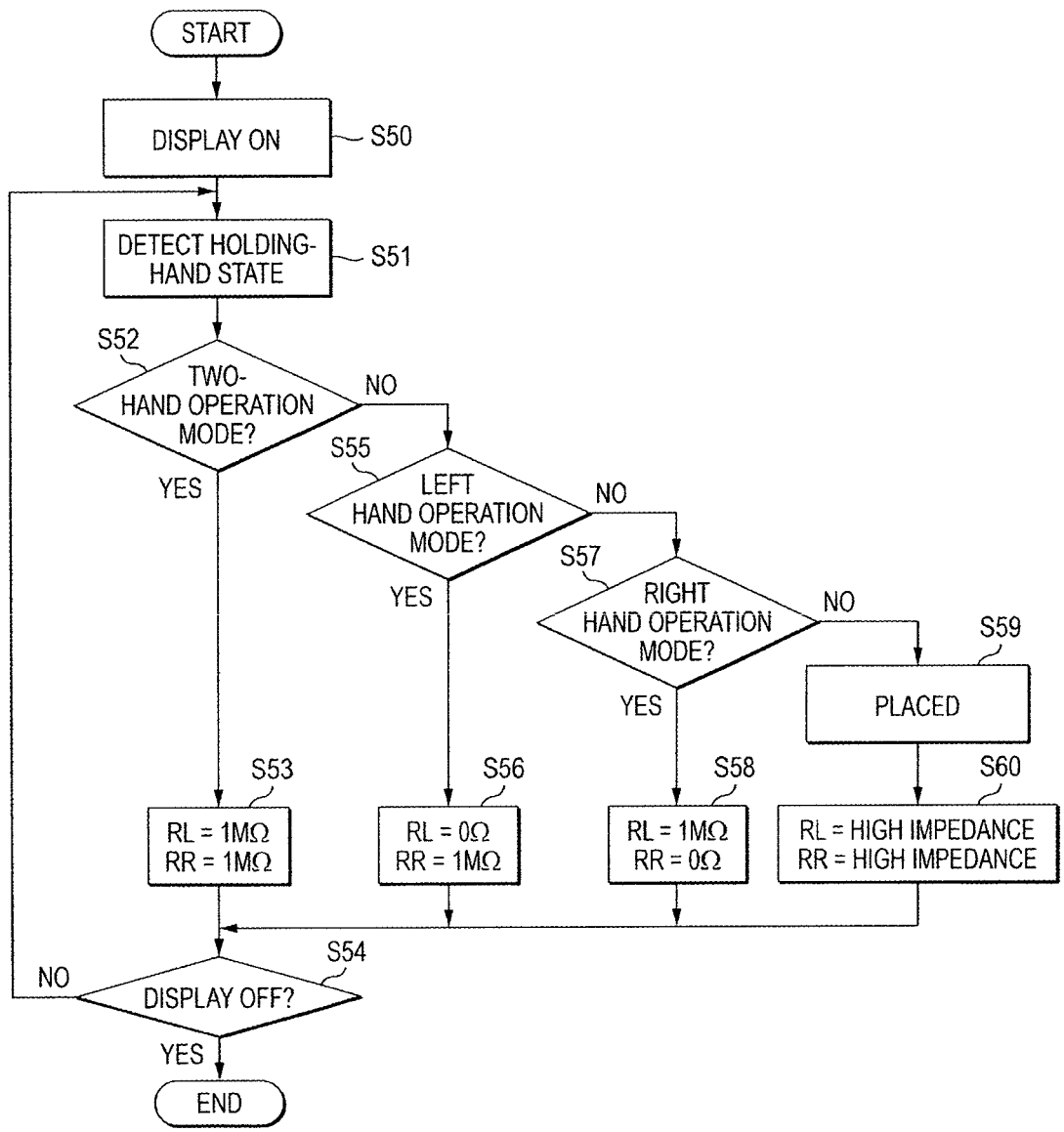
FIG. 32 Flow chart showing holding-hand detection processing of an electronic device of FIG. 27

FIG. 32 is a flow chart showing the holding-hand detection processing of the electronic device 150 according to the present embodiment. The present processing is performed during the time that the display of the electronic device 150 is in an ON state. Specifically, this processing is performed during the time after the power is turned ON and hence the display becomes ON until the power saving mode is started so that the display becomes OFF. The ON-OFF control of the display is premised to be performed by the display processing unit 161.

In FIG. 32, first, the display processing unit 161 turns ON the display (step S50). After the display ON, the holding hand detection unit 162 detects the holding-hand state (step S51) and then judges whether the mode is the two-hand operation mode (step S52). In case of the two-hand operation mode (when "Yes" is concluded in the judgment at step S52), the holding hand detection unit 162 sets each of the variable resistors 154 and 155 to be 1 MΩ (step S53). After the holding hand detection unit 162 has set each of the variable resistors 154 and 155 to be 1 MΩ, the display processing unit 161 judges whether the state is display OFF (step S54). When the state is display OFF, the present processing is terminated. When the state is not display OFF, the procedure returns to step S51.

In the judgment at step S52, when having judged as not being the two-hand operation mode (when "No" is concluded in the judgment at step S52), the holding hand detection unit 162 judges whether the mode is the left hand operation mode (step S55). In case of the left hand operation mode (when "Yes" is concluded in the judgment at step S55), the holding hand detection unit 162 sets the variable resistor 154 to be 0Ω and sets the variable resistor 155 to be 1 MΩ(step S56). After the variable resistor 154 is set to be 0Ω and then the variable resistor 155 is set to be 1 MΩ, the display processing unit 161 judges whether the state is display OFF (step S54). When the state is display OFF, the present processing is terminated. When the state is not display OFF, the procedure returns to step S51.

In the judgment at step S55, when having judged as not being the left hand operation mode (when "No" is concluded in the judgment at step S55), the holding hand detection unit 162 judges whether the mode is the right hand operation mode (step S57). In case of the right hand operation mode (when "Yes" is concluded in the judgment at step S57), the holding hand detection unit 162 sets the variable resistor 154 to be 1 MΩ and sets the variable resistor 155 to be 0Ω (step S58). After the variable resistor 154 is set to be 1 MΩ and then the variable resistor 155 is set to be 0Ω, the display processing unit 161 judges whether the state is display OFF (step S54). When the state is display OFF, the present processing is terminated. When the state is not display OFF, the procedure returns to step S51.

In the judgment at step S57, when having judged as not being the right hand operation mode (when "No" is concluded in the judgment at step S57), the holding hand detection unit 162 judges as being placed (step S59) and then sets each of the variable resistors 154 and 155 to be a high impedance largely exceeding 1 MΩ (step S60). After the holding hand detection unit 162 has set each of the variable resistors 154 and 155 to be the high impedance, the display processing unit 161 judges whether the state is display OFF (step S54). When the state is display OFF, the present processing is terminated. When the state is not display OFF, the procedure returns to step S51.

As such, according to the electronic device 150 according to the present embodiment, the electronic device includes: the shield grounds 152 and 153 provided on two opposite sides 170 and 171 in the longitudinal direction of the Touch panel unit 77 having a rectangular shape overlaid on the Display unit 75; the variable resistor 154 whose one end is connected to the shield ground 152 and whose the other end is connected to the ground pattern on the circuit board 175; the variable resistor 155 whose one end is connected to the shield ground 153 and whose the other end is connected to the ground pattern on the circuit board 175; and the holding hand detection unit 162 that, on the basis of the coordinate signal obtained by the approaching detection by the touch panel module 73, judges whether the electronic device 150 is grasped by the user and that, when the electronic device 150 is grasped by the user, sets up the resistances of the variable resistors 154 and 155. Then, the holding hand detection unit 162 sets each resistance of the variable resistors 154 and 155 to be "medium" in the case of two-hand operation, sets the resistance of the variable resistor 154 to be "small" and the resistance of the variable resistor 155 to be "medium" in the case of left hand operation, sets the resistance of the variable resistor 154 to be "medium" and the resistance of the variable resistor 155 to be "small" in the case of right hand operation, and setting each resistance of the variable resistors 154 and 155 to be the "high impedance" in the case of being placed. Thus, the influence caused by the hand in the electronic device 150 (i.e., malfunction caused by a response of the Touch panel unit 77) can be suppressed.

Here, in the electronic device 150 according to the present embodiment, the program describing the processing shown in the flow chart of FIG. 32 has been stored in the ROM. However, the program may be stored in a storage medium such as a magnetic disc, an optical disc, a magneto-optical disc, and a flash memory and then distributed. Alternatively, the program may be saved in a server (not shown) on a network such as the Internet and then downloaded through a telecommunication line.

Figure 33:
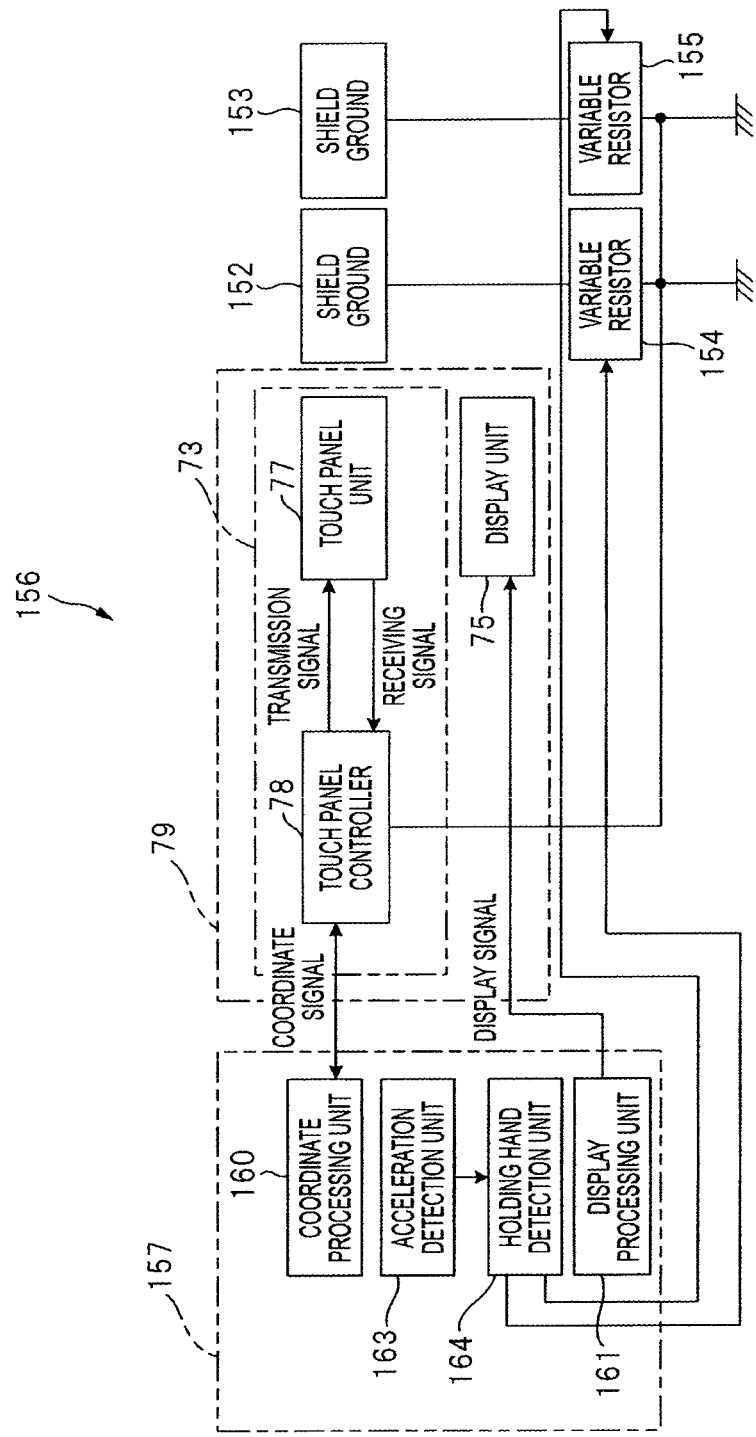
FIG. 33 Block diagram showing an outline configuration of an electronic device which detects a holding-hand state by using an acceleration sensor FIG. 34 Front view showing an outline of an electronic device according to Embodiment 5 of the present invention FIG. 35 Block diagram showing an outline configuration of an electronic device of FIG. 34

FIG. 33 is a block diagram showing an outline configuration of an electronic device 156 which detects a holding-hand state by using an acceleration sensor. Here, in this figure, like parts to those of FIG. 27 are designated by like numerals and hence their description is omitted. The electronic device 156 which detects a holding-hand state on the basis of the acceleration includes a device control unit 157 provided with an acceleration detection unit 163. The device control unit 157 includes the coordinate processing unit 160, the display processing unit 161, the acceleration detection unit 163, and a holding hand detection unit 164. The acceleration detection unit 163 includes an acceleration sensor (not shown) and outputs to the holding hand detection unit 164 the acceleration detected by the acceleration sensor. As for the holding-hand state detection using the acceleration sensor, FIG. 30 described above should be referred to. The holding hand detection unit 164 detects the user's holding hand for the electronic device 150 on the basis of the output from the acceleration detection unit 163 and then switches the resistances of the variable resistors 154 and 155. Setting of the resistances of the variable resistors 154 and 155 in various modes of holding hand is as described above.

Embodiment 5

Figure 34:
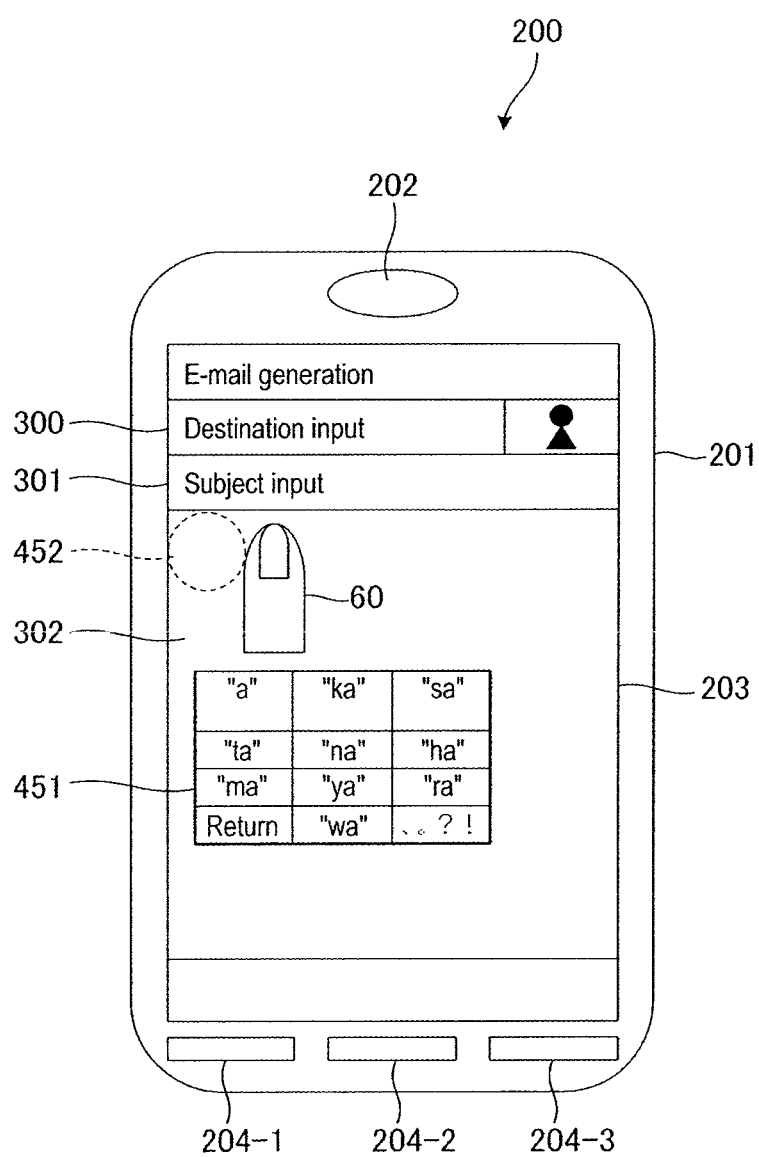

FIG. 34 is a front view showing an outline of an electronic device according to Embodiment 5 of the present invention. In this figure, the electronic device 200 according to the present embodiment is a portable wireless device referred to as a smart phone similar to the electronic device 1 according to Embodiment 1 described above. Then, a receiver 202 is provided in an upper part on the front face side of a housing 201 formed in a quadrangular shape, and a touch panel module (corresponding to a touch panel) 203 of capacitive sensing type is provided under the receiver 202. Further, three function buttons 204-1 to 204-3 are provided under the touch panel module 203.

Figure 35:
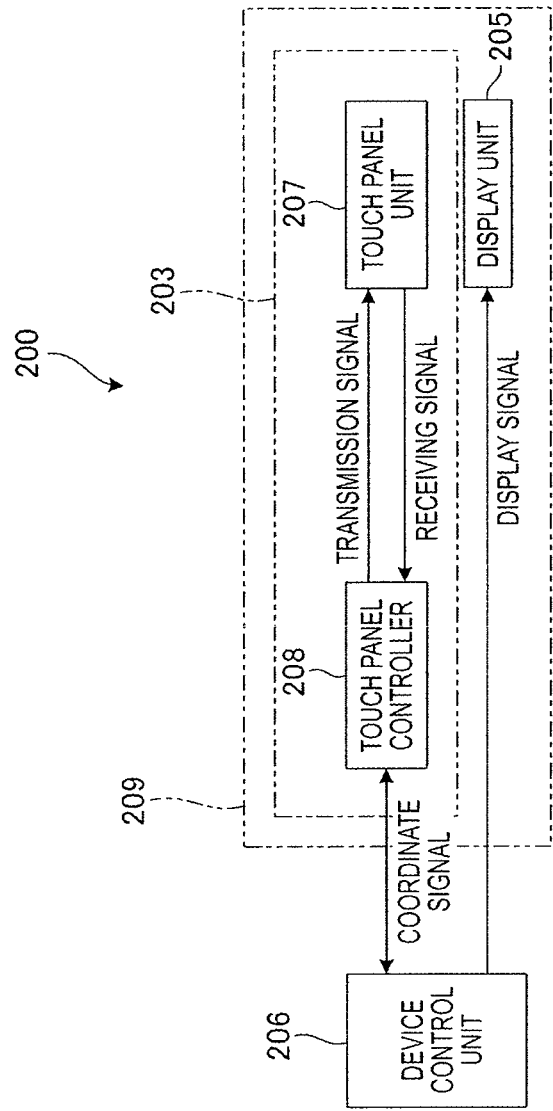

FIG. 35 is a block diagram showing an outline configuration of the electronic device 200 according to the present embodiment. In this figure, the electronic device 200 according to the present embodiment includes the touch panel module 203 described above, a Display unit (corresponding to a display device) 205, and a device control unit 206. The touch panel module 203 includes a Touch panel unit 207 and a touch panel controller 208 for exchanging a transmission signal and a receiving signal with the Touch panel unit 207. The device control unit 206 exchanges with the touch panel module 203 a coordinate signal indicating the position of the instructing body and provides a display signal to the Display unit 205. Here, the Display unit 205 and the touch panel module 203 constitute a touch panel unit 209. The device control unit 206 includes a CPU (Central Processing Unit), a ROM (Read Only Memory), a RAM (Random Access Memory), and an interface circuit (all not shown). The ROM stores a program for controlling the CPU. The RAM is used in the operation of the CPU.

The Display unit 205 has a quadrangular shape and is used for display for the purpose of operation of the electronic device 200 according to the present embodiment and for display of an image or the like. In the Display unit 205, an LCD (Liquid Crystal Display), an organic EL (Electro Luminescence), or an electronic paper is employed. The touch panel module 203 employs a capacitive sensing type that allows operation ("hovering operation") at a height within a predetermined range without the necessity of touching the touch panel surface with a fingertip.

The Touch panel unit 207 has a quadrangular shape approximately the same as the Display unit 205 and is overlaid on the Display unit 205. Here, the Display unit 205 and the Touch panel unit 207 may be arranged in the inside of the housing 201 or alternatively in the outside. However, in whichever case, the Touch panel unit 207 is arranged on the outer side relative to the Display unit 205. Further, in the electronic device 200 according to the present embodiment, the shape of the Display unit 205 and the Touch panel unit 207 is set to be quadrangular. However, the shape may be rectangular or square.

The Touch panel unit 207 includes transmission electrodes and receiving electrodes (not illustrated), which are arranged in a manner of being separated from each other on the lower surface of a plate-shaped dielectric material. A driving pulse based on the transmission signal outputted from the touch panel controller 208 is applied on the transmission electrode. When the driving pulse is applied on the transmission electrode, an electric field is generated from the transmission electrode. When an instructing body (a finger, a pen, or the like; a "finger" is premised in the present embodiment) enters this electric field, the number of lines of electric force between the transmission electrode and the receiving electrode decreases. The change in the number of lines of electric force appears as a change in the electric charge on the receiving electrode. A receiving signal corresponding to a change in the electric charge on the receiving electrode is outputted to the touch panel controller 208. The touch panel controller 208 exchanges a control signal with the device control unit 206 and outputs a transmission signal to the Touch panel unit 207. Further, the touch panel controller 208 receives the receiving signal outputted from the Touch panel unit 207 so as to detect the finger from the inputted receiving signal and then outputs a coordinate signal indicating the position (X,Y,Z) of the detected finger to the device control unit 206.

Figure 36:
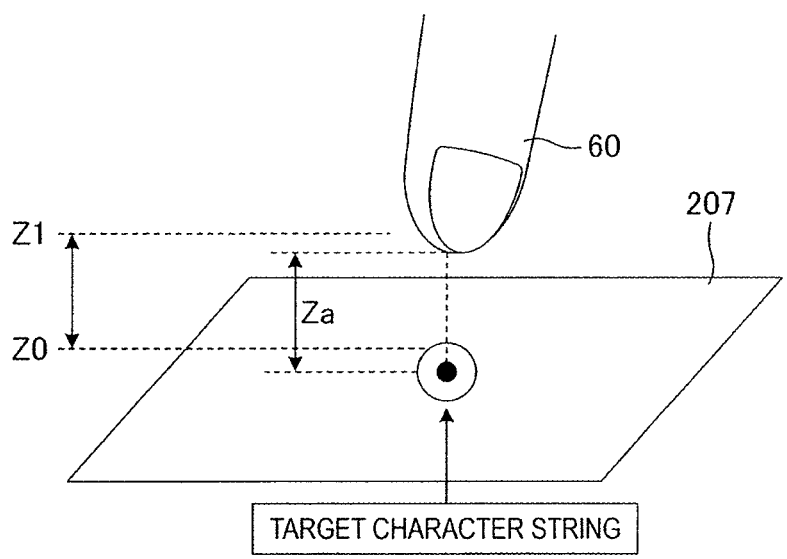
FIG. 36 Diagram showing a method of detecting a finger in a touch panel controller of an electronic device of FIG. 34
Figure 37:
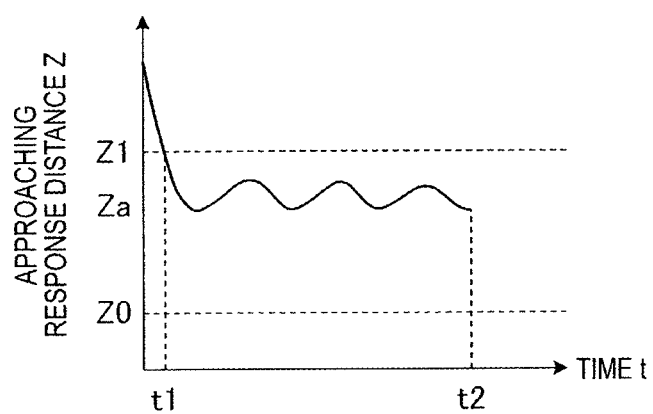
FIG. 37 Diagram showing a time-dependent change in the distance between a finger and a Touch panel unit in a method of detecting a finger of FIG. 36

FIG. 36 is a diagram showing a method of detecting a finger in the touch panel controller 208. In this figure, when the distance corresponding to the level of the receiving signal outputted from the Touch panel unit 207 (i.e., the distance from the Touch panel unit 207 to the fingertip 60) Za falls between the first distance Z0 and the second distance Z1, the touch panel controller 208 detects the fingertip 60. At that time, with taking into consideration the blur of the fingertip 60, the distance is calculated as the average within a predetermined time. FIG. 37 is a diagram showing a time-dependent change in the distance between the fingertip 60 and the Touch panel unit 207. As shown in the figure, between the first distance Z0 and the second distance Z1, the average of the distance is calculated between time t1 and time t2. When this average of the distance falls between the first distance Z0 and the second distance Z1, the fingertip 60 is detected.

Returning to FIG. 35, the device control unit 206 acquires the coordinate signal outputted from the touch panel controller 208 and then performs various processing such as character input processing and character display processing. The result of the character display processing is outputted as a display signal to the Display unit 205. FIG. 34 shows a mail screen at the time that an application for generating an E-mail is started. This mail screen contains a destination input display region 300, a subject input display region 301, and an input display region 302. These display regions 300 to 302 are set up in the Touch panel unit 207. Here, the display position of the input display region 302 may be fixed or alternatively variable.

The Display unit 205 displays ten keys 451, a cursor key 452, and characters ("kana characters", "alphabetical characters", or "numeric characters") inputted through the ten keys 451. The cursor key 452 displays the kind of input character and is displayed at the upper left corner of the Display unit 205. Here, the cursor key 452 corresponds to the predetermined region of the Display unit 205. Further, the cursor key 452 is an icon. When icon display is employed for the cursor key 452, operability improvement in character input is achieved.

The ten keys 451 displays, in the form of ten keys, input character candidates serving as information relevant to the cursor key 452 and are displayed near the cursor key 452. FIG. 34 shows the ten keys 451 of a case that "kana character" is selected as the kind of input character. Thus. "a, ka, sa, ta, . . . " are displayed as input character candidates. Regions corresponding to each of the cursor key 452 and the ten keys 451 are also set up in the Touch panel unit 207. When the region corresponding to the cursor key 452 of the Touch panel unit 207 is touched by the fingertip 60, selection of the kind of input character can be performed. After the selection of the kind of input character, when the fingertip 60 is moved in the immediately upward direction of the cursor key 452, the ten keys 451 are displayed. In this case, as described above, the ten keys 451 are displayed near the cursor key 452. When input character candidates are displayed in the form of ten keys, operability improvement in character input is achieved.

Figure 38:
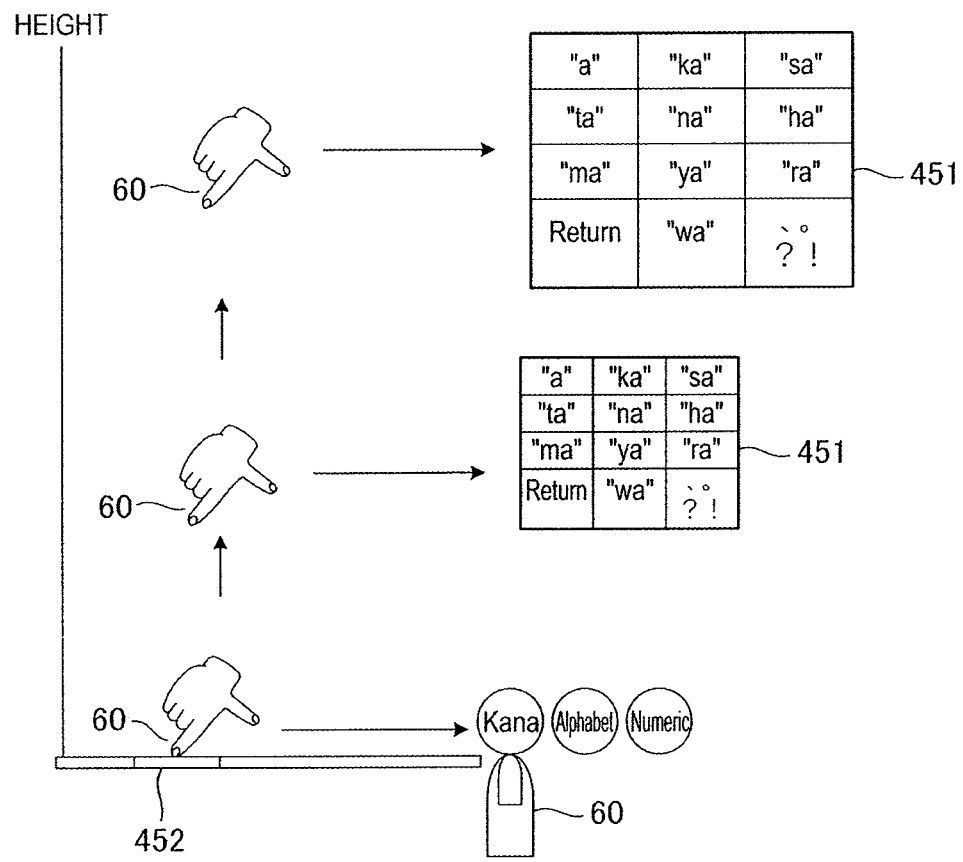
FIG. 38 Diagram showing operation from selection of the kind of input character to selection of a ten-key size in an electronic device of FIG. 34
Figure 39:
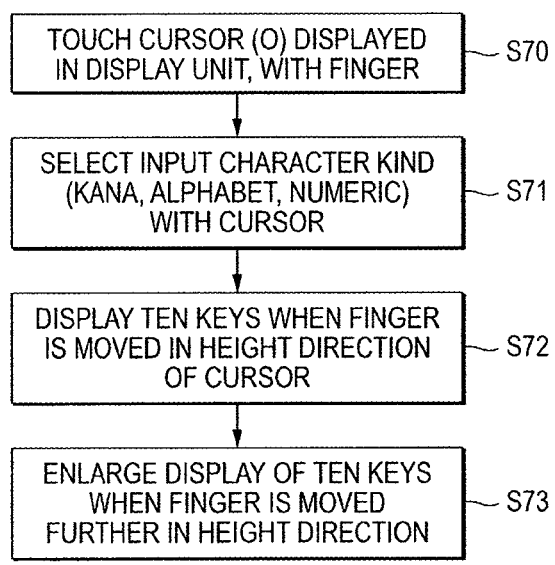
FIG. 39 Flow chart showing a procedure of selection operation for the kind of input character and selection operation for a ten-key size in an electronic device of FIG. 34

FIG. 38 is a diagram showing operation from selection of the kind of input character in the electronic device 200 according to the present embodiment to selection of the ten-key size. Further, FIG. 39 is a flow chart showing the procedure of selection operation for the kind of input character and selection operation for the ten-key size in the electronic device 200 according to the present embodiment. In FIGS. 38 and 39, when the fingertip 60 touches the cursor key 452 (step S70), the kinds of input character such as "kana", "alphabetical character", and "numeric character" are displayed. In this state, the fingertip 60 is moved in a horizontal direction and then touching is performed, a desired kind of input character can be selected (step S71). The kinds of input character such as "kana", "alphabetical character", and "numeric character" are displayed in the immediate vicinity of the cursor key 452. After the selection of the desired kind of input character, when the fingertip 60 is brought apart in the immediately upward direction of the cursor key 452, first, the ten keys 451 of standard size are displayed near the cursor key 452 (step S72). After that, when the fingertip 60 is brought apart further so that the distance Z between the Touch panel unit 207 and the fingertip 60 exceeds the distance Za, display is switched from the ten keys 451 of standard size to the ten keys 451 of enlarged size (step S73).

The ten keys 451 of enlarged size is continued up to the distance Zb. That is, immediately above the cursor key 452, when the distance Z between the Touch panel unit 207 and the fingertip 60 falls within the range of 0<Z≤Za, the ten keys 451 of standard size are displayed. In case of falling within the range of Za<Z≤Zb, the ten keys 451 of enlarged size are displayed. As such, when the fingertip 60 is brought apart in the immediately upward direction of the cursor key 452, the size of the ten keys 451 varies in two steps. After being brought apart from the cursor key 452, when the fingertip 60 is brought close, display is switched from the ten keys 451 of enlarged size to the ten keys 451 of standard size. That is, in response to the up and down movement of the fingertip 60, the size of the ten keys 451 is switched from the enlarged to the standard and from the standard to the enlarged. When the means of changing the size of the ten keys 451 is provided, information in the desired size is easily selected and hence operability improvement in character input is achieved.

Here, after the fingertip 60 is brought apart from the cursor key 452, the fingertip 60 need not be moved accurately in the immediately upward direction of the cursor key 452 and hence deviation is allowed. That is, the fingertip 60 need not be contained in the region of the cursor key 452.

Figure 40:
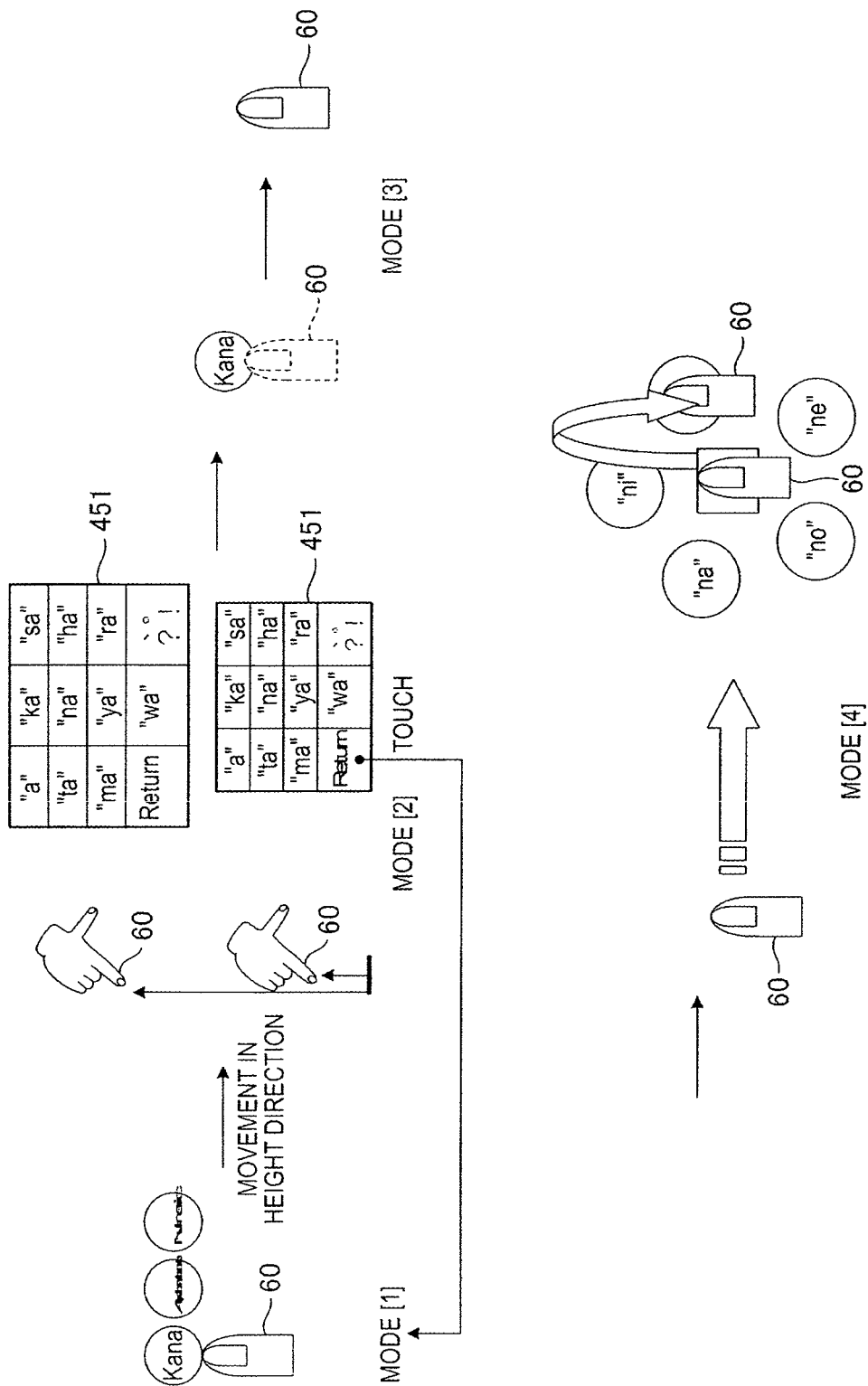
FIG. 40 Diagram showing operation from selection of the kind of input character to character input in an electronic device of FIG. 34

FIG. 40 is a diagram showing operation from selection of the kind of input character to character input in the electronic device 200 according to the present embodiment. In this figure, the operation from selection of the kind of input character to selection of the ten-key size is as described above and hence its description is omitted. Thus, operation after the ten-key size selection is described below. Here, the selection processing for the kind of input character is referred to as mode [1] and the selection processing for ten-key size is referred to as mode [2]. Further, in mode [2], when the "return" key in the ten keys 451 is touched, the procedure returns to mode [1] and hence selection of the kind of input character is allowed again.

Mode [3] that follows mode [2] is the processing of fixing the size of the ten keys 451. FIG. 40 shows a state that kana character is selected. In a state that the cursor key 452 selecting the kana character is seen below, when the fingertip 60 is moved in a horizontal direction, the size of the ten keys 451 is fixed. In this case, in a state that the ten keys 451 of standard size are selected, when the fingertip 60 is moved in a horizontal direction, the ten keys 451 of standard size are fixed. Further, in a state that the ten keys 451 of enlarged size are selected, when the fingertip 60 is moved in a horizontal direction, the ten keys 451 of enlarged size are fixed. After the size of the ten keys 451 is fixed as such, character input is performed through the ten keys 451. The processing of character input is referred to as mode [4]. When the means of fixing the size of the ten keys 451, operability improvement in character input is achieved.

In mode [4], for example, a character "na" of the ten keys 451 is touched by the fingertip 60, display of the ten keys 451 temporarily disappears and the character string ("na", "ni", "nu", "ne", "no") of "na" row is displayed in the periphery around the touch position. In the state that the character string of "na" row is displayed, when a desired character (e.g., "nu") is touched, input of this character is determined. The determined character is displayed in the input display region 302. When additional another character is to be inputted, similar operation is performed. For example, when a character "ma" is to be inputted, when the fingertip 60 is brought apart from the character "nu", the ten keys 451 appear. Thus, the character "ma" in the ten keys 451 is touched. Then, display of the ten keys 451 temporarily disappears and the character string ("ma", "mi", "mu", "me", "mo") of "ma" row is displayed in the periphery around the touch position. In the state that the character string of "ma" row is displayed, when the desired character (e.g., "ma") is touched, input of this character is determined and hence this character is displayed in the input display region 302. Character input is achieved as such.

Figure 41:
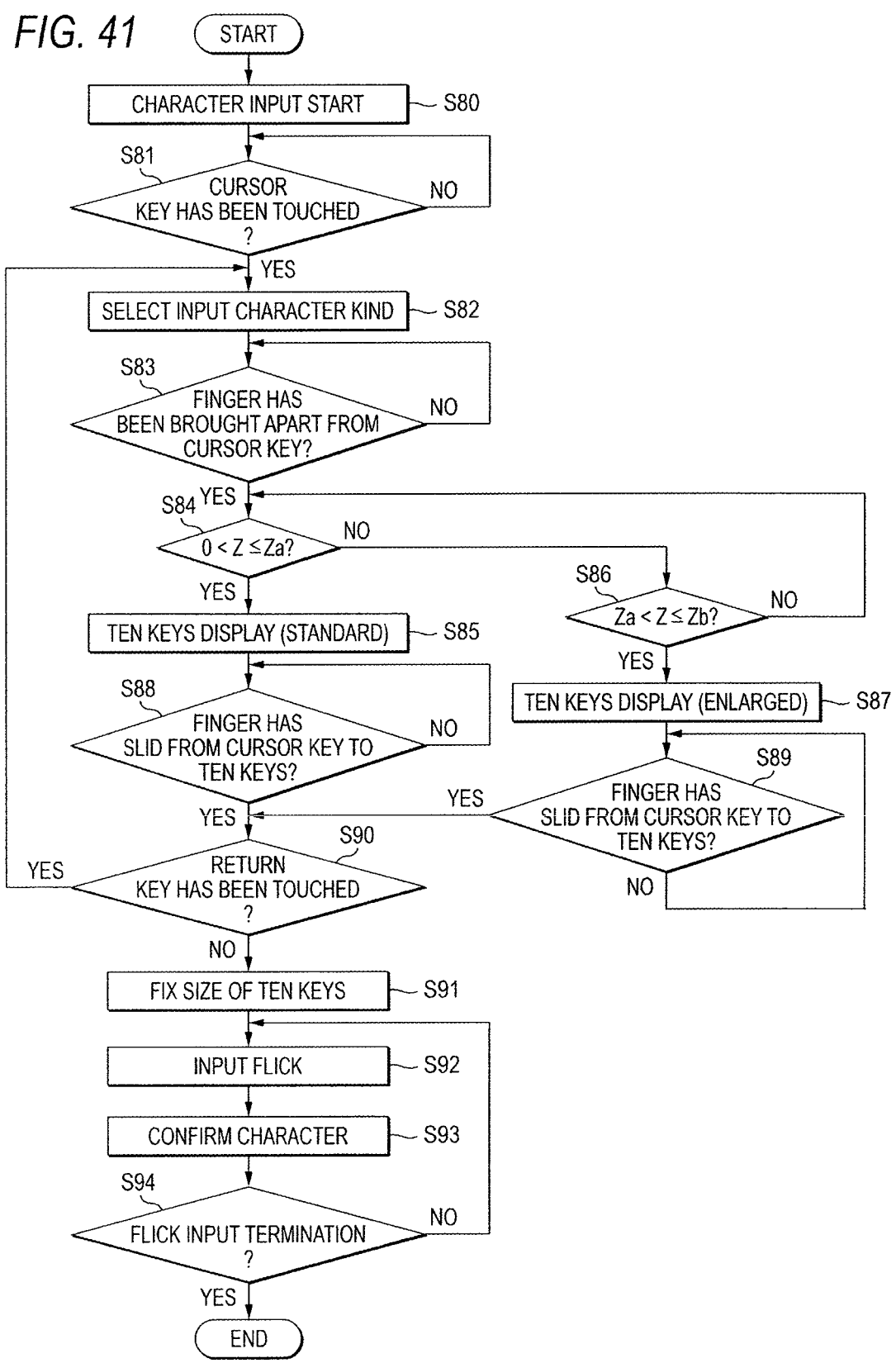
FIG. 41 Flow chart showing character input processing of an electronic device of FIG. 34
Figure 42:
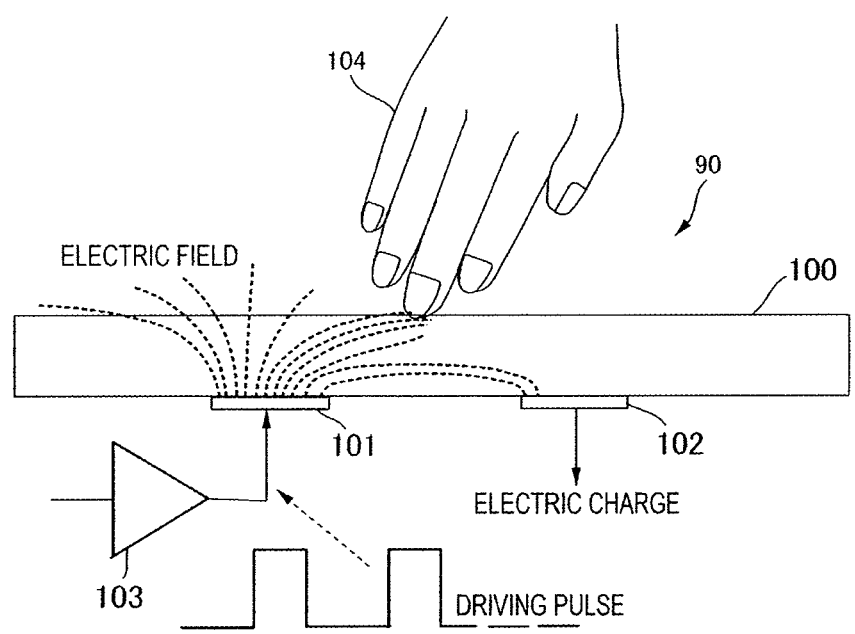
FIG. 42 Diagram showing a touch panel of capacitive sensing type
Figure 43:
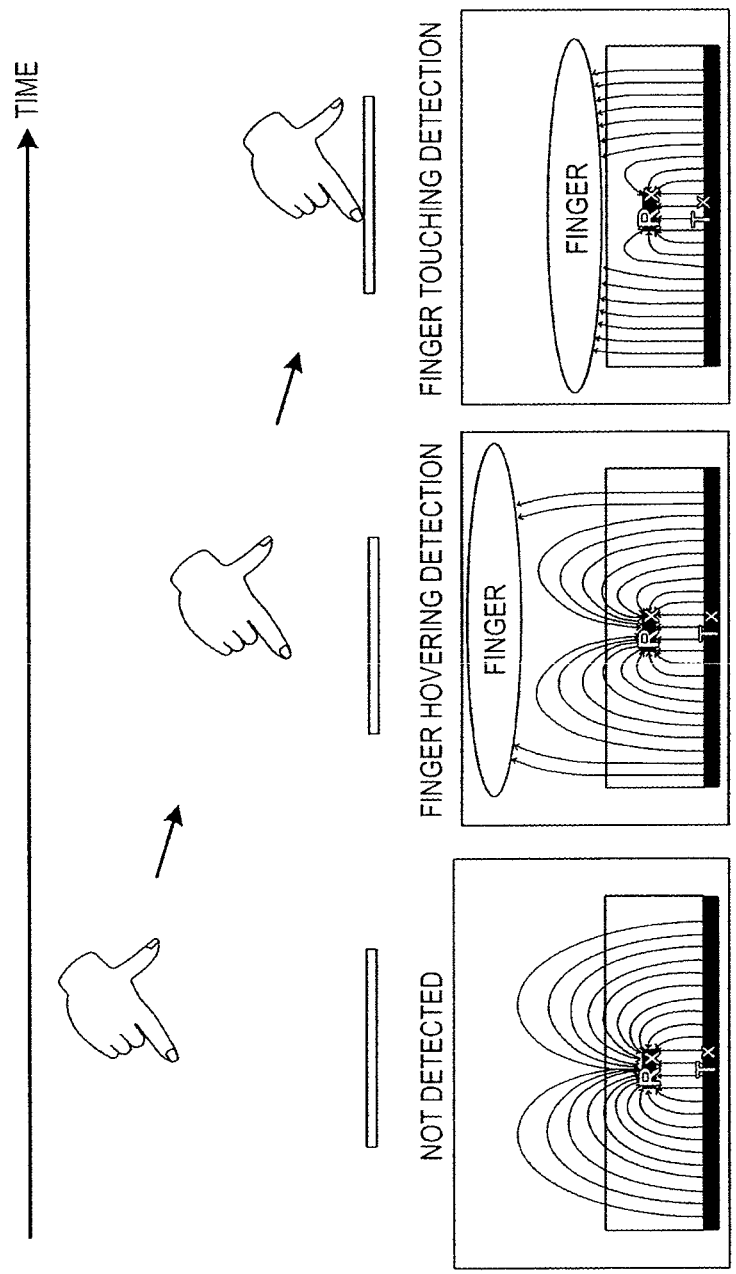
FIG. 43 Diagram showing a situation of detecting a finger when a hand gradually approaches a touch panel FIG. 44 Diagram showing an example of a mail screen in an electronic device provided with ten keys

FIG. 41 is a flow chart showing the character input processing of the electronic device 200 according to the present embodiment. The present processing is performed mainly in the device control unit 206. In this figure, when character input is started (step S80), the device control unit 206 judges whether the cursor key 452 is touched by the fingertip 60 (step S81). When the cursor key 452 is not touched by the fingertip 60 (i.e., when "NO" is concluded in the judgment at step S80), the present judgment is repeated until the cursor key 452 is touched by the fingertip 60. In contrast, when the cursor key 452 is touched by the fingertip 60 (i.e., when "YES" is concluded in the judgment at step S80), the kind of input character is selected (step S82). That is, the kind of input character specified by the user is selected from among "kana character", "alphabetical character", and "numeric character". In this case, which kind of input character has been specified is judged on the basis of the coordinate signal outputted from the touch panel controller 208.

After the selection the kind of input character, the device control unit 206 judges whether the fingertip 60 has been brought apart from the cursor key 452 (step S83). When the fingertip 60 is not brought apart from the cursor key 452 (i.e., when "NO" is concluded in the judgment at step S83), the present judgment is repeated until the fingertip 60 is brought apart from the cursor key 452. In contrast, when the fingertip 60 is brought apart from the cursor key 452 (i.e., when "YES" is concluded in the judgment at step S83), it is judged whether the distance Z from the cursor key 452 to the fingertip 60 satisfies 0<Z≤Za (step S84). That is, the device control unit 206 acquires the distance Z from the cursor key 452 to the fingertip 60 on the basis of the signal value of the Z-coordinate of the coordinate signal outputted from the touch panel controller 208 and then performs distance judgment. In this judgment, when the distance Z satisfies 0<Z≤Za (i.e., when "YES" is concluded in the judgment at step S84, a display signal for displaying the ten keys 451 of standard size is outputted to the Display unit 205 (step S85). In contrast, when the distance Z does not satisfy 0<Z≤Za (i.e., when "No" is concluded in the judgment at step S84), it is judged whether the distance Z from the cursor key 452 to the fingertip 60 satisfies Za<Z≤Zb (step S86). In this judgment, when the distance Z does not satisfy Za<Z≤Zb (i.e., when "NO" is concluded in the judgment at step S86, the procedure returns to step S84 described above. In contrast, when the distance Z satisfies Za<Z≤Zb (i.e., when "YES" is concluded in the judgment at step S86, a display signal for displaying the ten keys 451 of enlarged size is outputted to the Display unit 205 (step S87).

In case that the processing of displaying the ten keys 451 of standard size has been performed, after this processing, the device control unit 206 judges whether the fingertip 60 has slid from the cursor key 452 to the ten keys 451 (step S88). In this judgment, in case of not having slid to the ten keys 451 (i.e., when "NO" is concluded in the judgment at step S88), the present judgment is repeated until sliding to the ten keys 451 is performed. In contrast, when the fingertip 60 has slid to the ten keys 451 (i.e., when "YES" is concluded in the judgment at step S88), the processing at step S90 is performed.

Further, in case that the processing of displaying the ten keys 451 of enlarged size has been performed, after this processing, the device control unit 206 judges whether the fingertip 60 has slid from the cursor key 452 to the ten keys 451 (step S89). In this judgment, in case of not having slid to the ten keys 451 (i.e., when "NO" is concluded in the judgment at step S89), the present judgment is repeated until sliding to the ten keys 451 is performed. In contrast, when the fingertip 60 has slid to the ten keys 451 (i.e., when "YES" is concluded in the judgment at step S89), the processing at step S90 is performed.

At step S90, it is judged whether the "return" key of the ten keys 451 has been touched. In this judgment, when the "return" key of the ten keys 451 has been touched (i.e., when "YES" is concluded in the judgment at step S90), the procedure returns to step S82 so that the processing at and after step S82 is performed. In contrast, when the "return" key of the ten keys 451 is not touched (i.e., when "NO" is concluded in the judgment at step S90, the size of the ten keys 451 is fixed (step S91). That is, the ten keys 451 are fixed to the standard size or the enlarged size.

After fixing the size of the ten keys 451, the device control unit 206 performs flick input processing (step S92). That is, character input is performed in response to flick operation by the user. For example, when the user performs kana character setting, then selects the "na" row, and then selects "nu", character input of "nu" is performed. After the character input, the device control unit 206 confirms this character (step S93). Then, it is judged whether flick input is to be terminated (step S94). When flick input is not to be terminated (i.e., when "NO" is concluded in the judgment at step S94), the procedure returns to step S92 and then flick input processing is performed again. In contrast, when flick input is to be terminated (i.e., when "YES" is concluded in the judgment at step S94), the present processing is terminated.

As such, according to the electronic device 200 according to the present embodiment, the Display unit 205 displays: the cursor key 452 for displaying the kind of input character; and the ten keys 451 for displaying input character candidates in the form of ten keys near the cursor key 452. Then, the ten keys 451 are displayed when after the fingertip 60 has touched the cursor key 452, the fingertip 60 is brought apart from the cursor key 452. Further, when the distance Z between the Touch panel unit 207 and the fingertip 60 satisfies 0<Z≤Za, the ten keys 451 are displayed in the standard size. When the distance Z satisfies Za<Z≤Zb, the ten keys 451 are displayed in the enlarged size. Thus, the ten keys 451 of desired size can be selected arbitrarily and hence operability improvement in character input is achieved. Further, the Display unit 205 displays the ten keys 451 and the character inputted through the ten keys 451. Thus, sight line movement for character input and displayed character check is reduced and hence operability improvement in character input is achieved.

Here, in the electronic device 200 according to the present embodiment, a plurality of characters serving as input character candidates have been displayed in the form of ten keys. Instead, one character alone may be displayed.

Further, in the electronic device 200 according to the present embodiment, the size of information has been changed such that the size of the ten keys 451 is changed in accordance with the distance between the Touch panel unit 207 and the fingertip 60. Instead, the information itself may be changed. For example, "a, i, u, e, o" may be changed into "ka, ki, ku, ke, ko".

Further, in the electronic device 200 according to the present embodiment, in its operation, touching the ten keys 451 and the cursor key 452 is premised (i.e., contact is used as a trigger). However, approaching to an extent that can be regarded as touching may be included. For example, the ten keys 451 have been displayed when after the fingertip 60 has touched the cursor key 452, the fingertip 60 is brought apart from the cursor key 452. However, the ten keys 451 may be displayed when after the fingertip 60 approaches the cursor key 452 to an extent that can be regarded as touching, the fingertip 60 is brought apart from the cursor key 452.

Further, the electronic device 200 according to the present embodiment has been a portable wireless device referred to as a smart phone, however, is not limited to an electronic device of this kind. That is, a game machine, a television receiver, a microwave oven, a washing machine, a refrigerator, a car navigation device, a car provided with a car navigation device, a home energy management system (HEMS) terminal device, a house provided with a home energy management system (HEMS) terminal device, an ATM (Automated Teller Machine), and the like may be employed.

Further, in the electronic device 200 according to the present embodiment, the program describing the processing shown in the flow chart of FIG. 41 has been stored in the ROM. However, the program may be stored in a storage medium such as a magnetic disc, an optical disc, a magneto-optical disc, and a flash memory and then distributed. Alternatively, the program may be saved in a server (not shown) on a network such as the Internet and then downloaded through a telecommunication line.

The present invention has been described in detail with reference to particular embodiments. However, it is clear for the person skilled in the art that various modifications and corrections can be made without departing from the spirit and the scope of the present invention.

This application is based on a Japanese patent application (Japanese Patent Application No. 2011-276175) filed on Dec. 16, 2011, a Japanese patent application (Japanese Patent Application No. 2012-074721) filed on Mar. 28, 2012, a Japanese patent application (Japanese Patent Application No. 2012-085750) filed on Apr. 4, 2012, a Japanese patent application (Japanese Patent Application No. 2012-095879) filed on Apr. 19, 2012, and a Japanese patent application (Japanese Patent Application No. 2012-127290) filed on Jun. 4, 2012. The contents of which are incorporated herein by reference.

INDUSTRIAL APPLICABILITY

The present invention is a touch panel of capacitive sensing type, which has an effect that when the device body is held, the influence of the hand to the hand-held part is suppressed and which is applicable to an electronic device such as a smart phone employing a touch panel of capacitive sensing type.

DESCRIPTION OF REFERENCE NUMERALS

1 Electronic device
2 Housing
3 Receiver
4 Liquid crystal display unit
5 Touch panel unit
5-1 Receiving sensor panel
5-1a Receiving electrode
5-1b Transmission electrode
5-2 Transmission sensor panel
5-2c Transmission electrode
6 Touch panel module
7 Touch panel unit
7-1 to 7-3 Function button
8 Touch panel controller
9 Device control unit
20 Cover panel
21 Back light unit
22 Battery unit
30 Display
40 Electronic device
41 Housing
42 Receiver
43 Touch panel module
44-1, 44-2, 44-3 Function button
45 Display unit
46 Device control unit
47 Touch panel unit
48 Touch panel controller
49 Touch panel unit
50 Destination input display region
51 Subject input display region
52 Input display region
53 Character kind selection key display region
54 Character kind selection key
60 Fingertip
531 Kana character input key display region
532 Numeric character input key display region
533 Alphabetical character input key display region
534 Symbol input key display region
535 Pictorial symbol input key display region
541 Kana character input key
542 Numeric character input key
543 Alphabetical character input key
544 Symbol input key
545 Pictorial symbol input key
550 to 569 Second display region
70 Electronic device
71 Housing
73 Touch panel module
75 Display unit
76 Device control unit
77 Touch panel unit
77-1 Receiving sensor panel
77-2 Transmission sensor panel
78 Touch panel controller
79 Touch panel unit
80 Grasping judgment unit
81 Feedback switching unit
82 Visual/auditory feedback unit
90 Vibration feedback element
90a Vibrator
90b Vibration actuator
90c Piezo actuator
91 Speaker
701 Icon
702 Predetermined display
150 The electronic device
151 Device control unit
152, 153 Shield ground
154, 155 Variable resistor
160 Coordinate processing unit
161 Display processing unit
162 Holding-hand detection unit
170 First side
171 Second side
175 Circuit board
771 Approaching touch panel sensor
772 Protection glass
773 Adhesive
774 Scattering prevention film
200 Electronic device
201 Housing
202 Receiver
203 Touch panel module
204-1 to 204-3 Function button
205 Display unit
206 Device control unit
207 Touch panel unit
208 Touch panel controller
209 Touch panel unit
300 Destination input display region
301 Subject input display region
302 Input display region
451 Ten keys
452 Cursor key

What is claimed is:

1. An electronic device comprising:
a display device;
a touch panel overlaid on the display device and including at least a first side and a second side;
a first conductive member provided along the first side;
a first variable resistor having one end which is electrically connected to the first conductive member and an other end which is electrically connected to a predetermined potential;
a second conductive member provided along the second side; and
a second variable resistor having one end which is electrically connected to the second conductive member and an other end which is electrically connected to the predetermined potential,
wherein a resistance of the first variable resistor and a resistance of the second variable resistor are switchable,
wherein the resistance of the first variable resistor is set to be a first resistance and the resistance of the second variable resistor is set to be a second resistance greater than the first resistance.

2. The electronic device according to claim 1, wherein the first side and the second side are opposite to each other.

3. The electronic device according to claim 2, wherein the touch panel is quadrangular; and
   wherein the first side and the second side are opposite sides of the quadrangle.

4. The electronic device according to claim 3, wherein the touch panel is rectangular; and
   wherein the first side and the second side are longer opposite sides of the rectangle.

5. The electronic device according to claim 1, wherein at least one of the resistance of the first variable resistor and the resistance of the second variable resistor are switched depending on an operation state.

6. The electronic device according to claim 1, wherein in a first operation state, the resistance of the first variable resistor is set to be the first resistance and the resistance of the second variable resistor is set to be the second resistance; and
   wherein in a second operation state, the resistance of the first variable resistor is set to be the second resistance and the resistance of the second variable resistor is set to be the first resistance.

7. The electronic device according to claim 1, wherein in a first operation state, the resistance of the first variable resistor is set to be the first resistance and the resistance of the second variable resistor is set to be the second resistance; and
   wherein in a second operation state, the resistance of the first variable resistor is set to be a third resistance and the resistance of the second variable resistor is set to be a fourth resistance smaller than the third resistance.

8. The electronic device according to claim 1, wherein in a first operation state, the resistance of the first variable resistor is set to be the first resistance and the resistance of the second variable resistor is set to be the second resistance; and
   wherein in a third operation state, the resistance of the first variable resistor and the resistance of the second variable resistor are set to be the second resistance.

9. The electronic device according to claim 1, wherein in a first operation state, the resistance of the first variable resistor is set to be the first resistance and the resistance of the second variable resistor is set to be the second resistance; and
   wherein in a third operation state, the resistance of the first variable resistor is set to be a fifth resistance and the resistance of the second variable resistor is set to be a sixth resistance that is a predetermined magnification of the fifth resistance.

10. The electronic device according to claim 6, wherein in a fourth operation state, the resistance of the first variable resistor is set to be a seventh resistance greater than the second resistance and the resistance of the second variable resistor is set to be the seventh resistance.

11. The electronic device according to claim 6, wherein in a fourth operation state, the resistance of the first variable resistor is set to be a seventh resistance greater than the second resistance and the resistance of the second variable resistor is set to be an eighth resistance greater than the second resistance.

12. The electronic device according to claim 5, wherein the operation state is detected on the basis of an output from the touch panel.

13. The electronic device according to claim 5, further comprising
   an acceleration sensor that detects an attitude of a body of the electronic device,
   wherein the operation state is detected on the basis of output from the acceleration sensor.

14. The electronic device according to claim 1, wherein the predetermined potential is a ground potential.

15. A resistance switching method employable in an electronic device including a display device, a touch panel overlaid on the display device and including at least a first side and a second side, a first conductive member provided along the first side, a first variable resistor having one end which is electrically connected to the first conductive member and an other end which is electrically connected to a predetermined potential, a second conductive member provided along the second side, and a second variable resistor having one end which is electrically connected to the second conductive member and an other end which is electrically connected to the predetermined potential,
   the method comprising:
   switching a resistance of the first variable resistor set to be a first resistance; and
   switching a resistance of the second variable resistor set to be a second resistance greater than the first resistance.

\* \* \* \* \*